(12) United States Patent
Do et al.

(10) Patent No.: US 12,490,925 B2
(45) Date of Patent: Dec. 9, 2025

(54) ELECTROCARDIOGRAM DEVICE AND DOCKING STATIONS

(71) Applicant: Welch Allyn, Inc., Skaneateles Falls, NY (US)

(72) Inventors: Tiffany Do, Milwaukee, WI (US); Ryan Donlon, Milton, MA (US); Kelly Bellissimo, Milwaukee, WI (US); Alia Mian, Greendale, WI (US); Ryan Migalla, Milwaukee, WI (US); Alexey Revinski, Milwaukee, WI (US); Vincent Warczak, Milwaukee, WI (US); Jeff Westcott, Mequon, WI (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 451 days.

(21) Appl. No.: 17/657,820

(22) Filed: Apr. 4, 2022

(65) Prior Publication Data

US 2022/0346692 A1 Nov. 3, 2022

Related U.S. Application Data

(60) Provisional application No. 63/181,445, filed on Apr. 29, 2021.

(51) Int. Cl.
*A61B 5/332* (2021.01)
*A61B 5/00* (2006.01)
(Continued)

(52) U.S. Cl.
CPC .............. *A61B 5/332* (2021.01); *A61B 5/276* (2021.01); *A61B 5/28* (2021.01); *A61B 5/303* (2021.01);
(Continued)

(58) Field of Classification Search
CPC .......... A61B 5/332; A61B 5/276; A61B 5/28; A61B 5/303; A61B 5/339; A61B 5/7475; A61B 2560/0214; A61B 2560/0456
See application file for complete search history.

(56) References Cited

U.S. PATENT DOCUMENTS 6,770,028 B1 8/2004 Ali et al.
8,840,549 B2 9/2014 Ali et al.
(Continued)

FOREIGN PATENT DOCUMENTS

WO 2012068568 A2 5/2012
WO 2013169295 A1 11/2013

OTHER PUBLICATIONS

Schiller, "Maximum Performance in a Compact Electrocardiograph Cardiovit FT-1," https://www.schiller.ch/us/us/product/cardiovit-ft-1, Apr. 15, 2021, 3 pages.
(Continued)

*Primary Examiner* — Mark W. Bockelman
(74) *Attorney, Agent, or Firm* — Merchant & Gould P.C.

(57) ABSTRACT

A system for electrocardiography includes a handheld device having a device housing, and a patient cable having a proximal end that connects to the device housing. A distal end of the patient cable breaks out into leads for attachment to a patient. The handheld device generates an electrocardiogram based on electrical signals received from the patient cable. The system further includes a docking station having a dock housing to support the device housing and to recharge a battery of the handheld device.

12 Claims, 50 Drawing Sheets

(51) Int. Cl.
*A61B 5/276* (2021.01)
*A61B 5/28* (2021.01)
*A61B 5/30* (2021.01)
*A61B 5/339* (2021.01)

(52) U.S. Cl.
CPC ............ *A61B 5/339* (2021.01); *A61B 5/7475* (2013.01); *A61B 2560/0214* (2013.01); *A61B 2560/0456* (2013.01)

(56) References Cited

U.S. PATENT DOCUMENTS

| | | | |
|---|---|---|---|
| 9,131,904 | B2 | 9/2015 | Qualey et al. |
| 9,510,755 | B2 | 12/2016 | Fong et al. |
| 9,847,002 | B2 | 12/2017 | Kiani et al. |
| 10,010,287 | B2 | 7/2018 | Perkins et al. |
| 2002/0044059 | A1 | 4/2002 | Reeder et al. |
| 2005/0003312 | A1 | 1/2005 | Mura et al. |
| 2005/0288571 | A1* | 12/2005 | Perkins ................. A61B 5/0002 600/407 |
| 2006/0178041 | A1* | 8/2006 | Lund .................... B65H 75/362 439/501 |
| 2008/0281168 | A1* | 11/2008 | Gibson .............. A61B 5/02438 600/301 |
| 2012/0178991 | A1* | 7/2012 | Clark ....................... A61B 1/24 600/109 |
| 2018/0036544 | A1* | 2/2018 | Delisle ................ A61N 1/3937 |

OTHER PUBLICATIONS

Spaulding Clinical, "Spaulding Electrocardiograph," Apr. 15, 2021, 2 pages.

* cited by examiner

ELECTROCARDIOGRAM DEVICE AND DOCKING STATIONS

BACKGROUND

An electrocardiogram, also called an ECG or EKG, is a painless, noninvasive test that is commonly performed to detect heart problems and monitor heart health by recording electrical signals from the heart. An electrocardiogram can be used to help diagnose many common heart problems such as abnormal heart rhythm (e.g., arrhythmias), blocked or narrowed arteries in the heart (e.g., coronary artery disease), whether a patient has previously experienced a heart attack, and how well certain heart disease treatments, such as a pacemaker, are working.

An electrocardiogram is often recorded by devices that include a set of leads connected to a central unit. These devices also typically include a printer for printing the electrocardiogram, and are typically bulky and heavy. Often these devices are mounted on a mobile cart that can be wheeled around a patient care environment. However, space limitations due to the size of the patient care environment and competition for space with other medical devices, can make this arrangement inconvenient and cumbersome.

SUMMARY

In general terms, the present disclosure relates to electrocardiography. In one possible configuration, a handheld electrocardiogram device is configured for interchangeable use between a plurality of different docking stations. Various aspects are described in this disclosure, which include, but are not limited to, the following aspects.

One aspect relates to a system for electrocardiography. The system comprises a handheld device including a device housing; a patient cable having a proximal end that connects to the device housing, and a distal end that breaks out into leads for attachment to a patient, the leads configured to receive electrical signals from the patient; at least one processing unit inside the device housing, the at least one processing unit configured to generate an electrocardiogram based on the electrical signals received from the patient cable; and a battery configured to power the at least one processing unit; and a docking station including a dock housing configured to support the device housing and to recharge the battery of the handheld device.

Another aspect relates to a handheld device for electrocardiography. The handheld device comprises a device housing shaped for fitting inside a pocket of a dock housing; a patient cable having a proximal end that connects to the device housing, and a distal end that breaks out into leads for attachment to a patient; at least one processing unit housed inside the device housing and configured to generate an electrocardiogram based on electrical signals received from the patient cable; and a battery configured to power the at least one processing unit and to recharge when the device housing is held inside the pocket of the dock housing.

Another aspect relates to a docking station for a handheld device used for electrocardiography. The docking station comprises a dock housing including: a base configured to support the dock housing on a support surface; a pocket for holding the handheld electrocardiogram device in an upright position relative to the support surface, the pocket including: an open end; front and rear interior surfaces; first and second lateral interior surfaces; and a bottom interior surface; and electrical contacts for connecting with corresponding electrical contacts on the handheld electrocardiogram device to recharge a battery of the handheld electrocardiogram device when the handheld electrocardiogram device is held inside the pocket.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
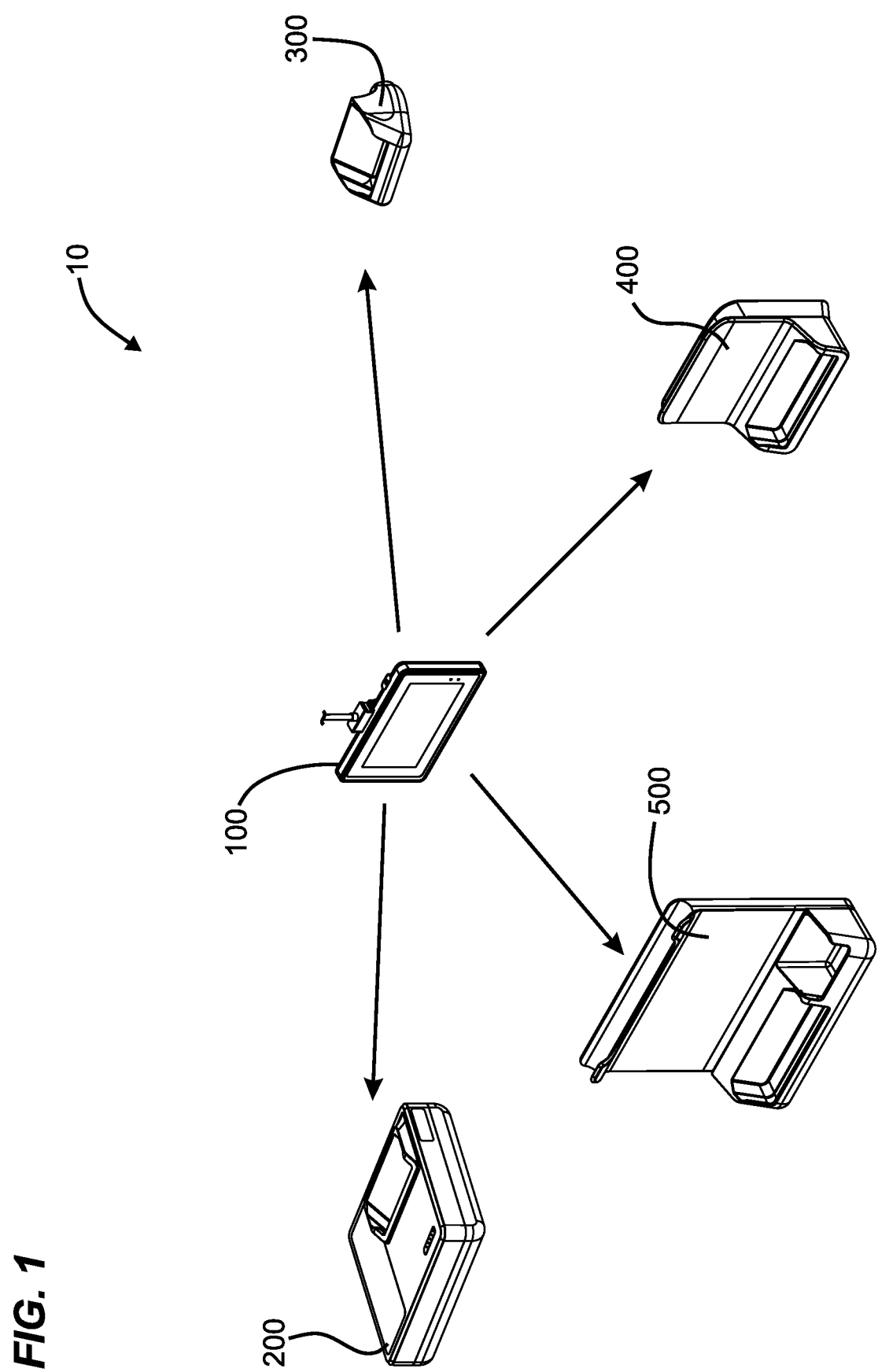
FIG. 1 illustrates an electrocardiography system that includes a handheld device that is compatible with a plurality of docking stations.
Figure 2:
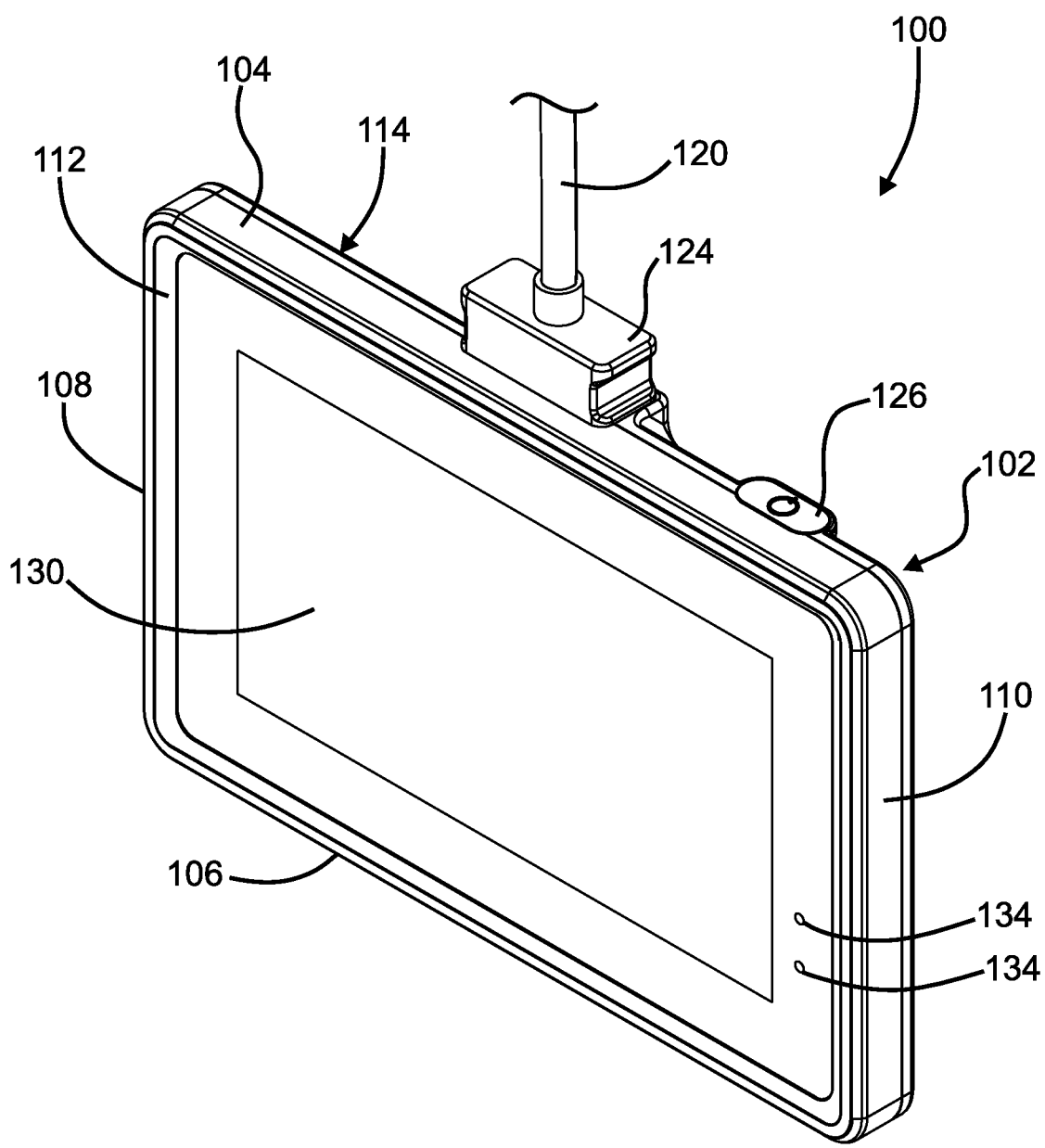
FIG. 2 is a front isometric view of the handheld device of FIG. 1.
Figure 3:
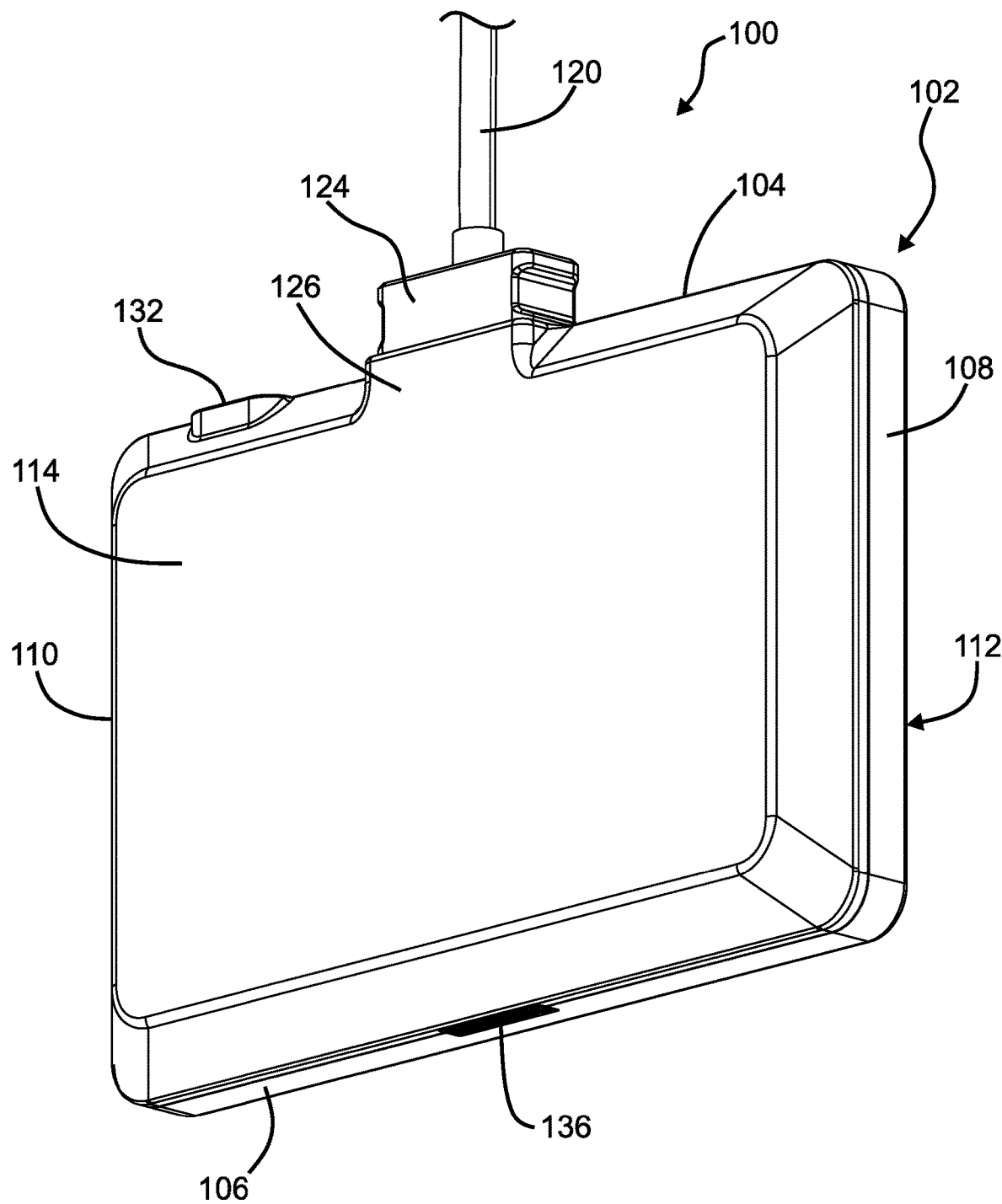
FIG. 3 is a rear isometric view of the handheld device of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 illustrates an electrocardiography system 10 that includes a handheld device 100 that is configured for interchangeable use between a plurality of docking stations. For example, the handheld device 100 is configured for use with a docking station 200 that includes a printer, and that is configured to be supported on horizontal surfaces such as a tabletop surface or on a mobile cart. The handheld device 100 is further configured for use with a docking station 300 that does not include a printer, and that is configured to be supported on a horizontal surface such as a tabletop surface. Also, the handheld device 100 is configured for use with docking stations 400, 500 that are each configured to be supported on a vertical wall. Advantageously, the handheld device 100 is portable relative to each of the docking stations 200, 300, 400, 500.

Each docking station 200, 300, 400, 500 is configured to support the handheld device 100 and to recharge a battery 1022 (see FIG. 55) of the handheld device 100. Each docking station 200, 300, 400, 500 defines a pocket configured to receive and support the handheld device 100 in an upright position, and includes a base configured to support the docking station on a support surface. Illustrative examples of support surfaces include a mobile cart, a tabletop surface, and a vertical wall. In some examples, the upright position is angled relative to the base to enhance the view of the handheld device 100 when supported inside the pocket.

FIGS. 2-9 are front isometric, rear isometric, front, rear, right side, left side, top, and bottom views, respectively, of the handheld device 100. Referring now to FIGS. 2-9, the handheld device 100 includes a device housing 102 that is shaped and sized for placement inside the pockets defined by the docking stations 200, 300, 400, 500.

The device housing 102 includes first and second longitudinal sides 104, 106, first and second lateral sides 108, 110, and front and rear sides 112, 114. In some examples, the first and second longitudinal sides 104, 106, the first and second lateral sides 108, 110, and the front and rear sides 112, 114 provide the device housing 102 with a rectangular prism shape.

Figure 4:
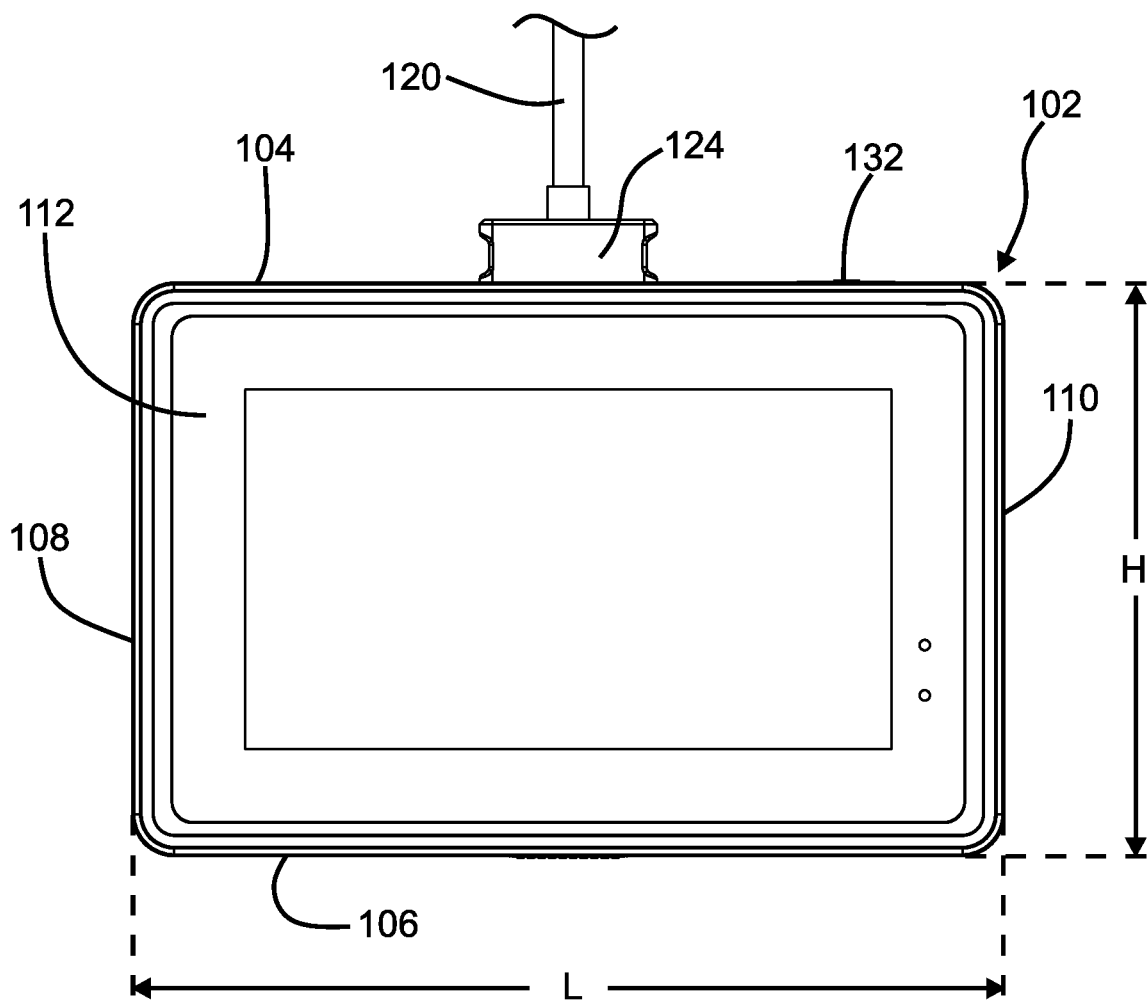
FIG. 4 is a front view of the handheld device of FIG. 1.
Figure 5:
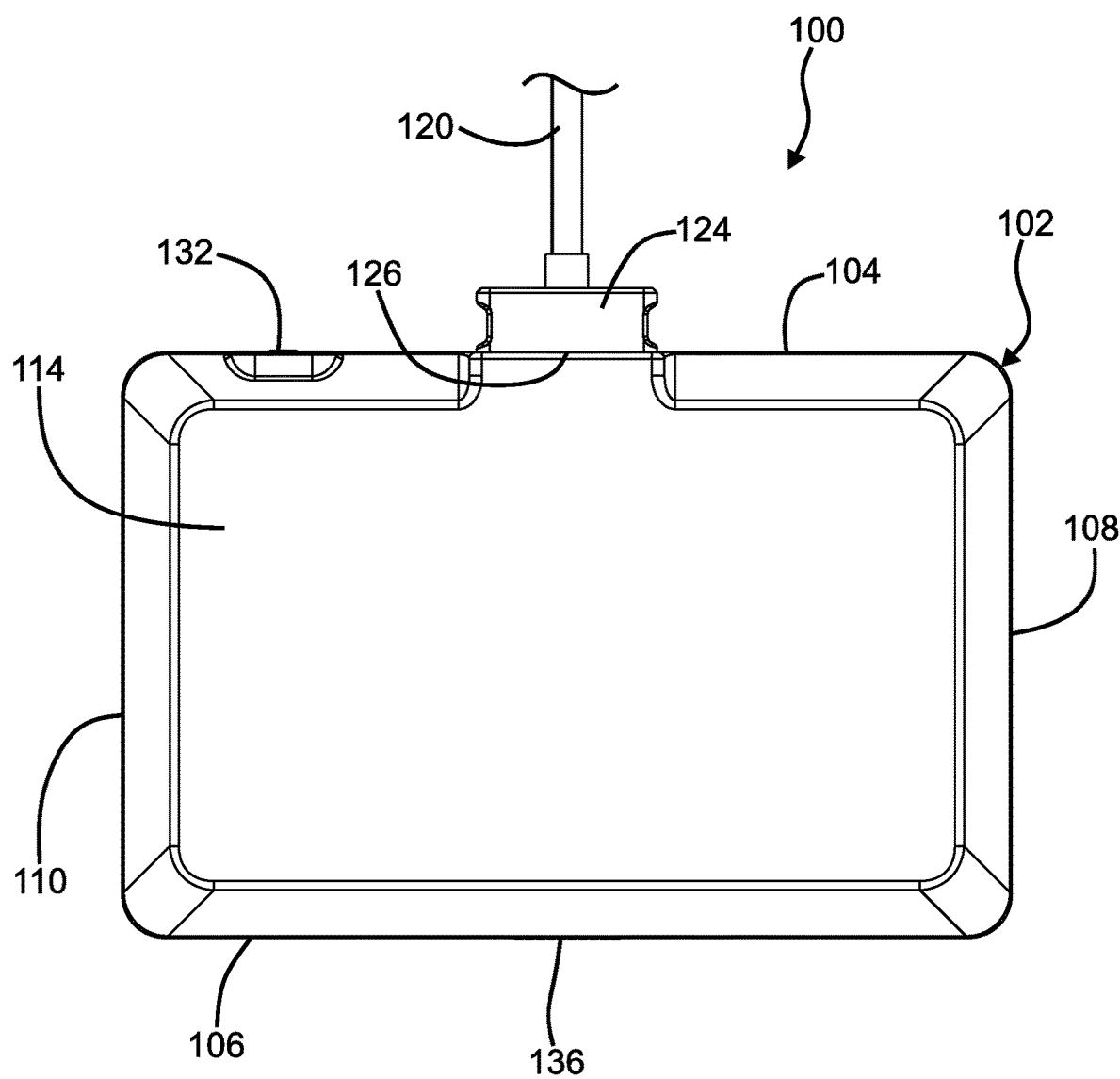
FIG. 5 is a rear view of the handheld device of FIG. 1.
Figure 6:
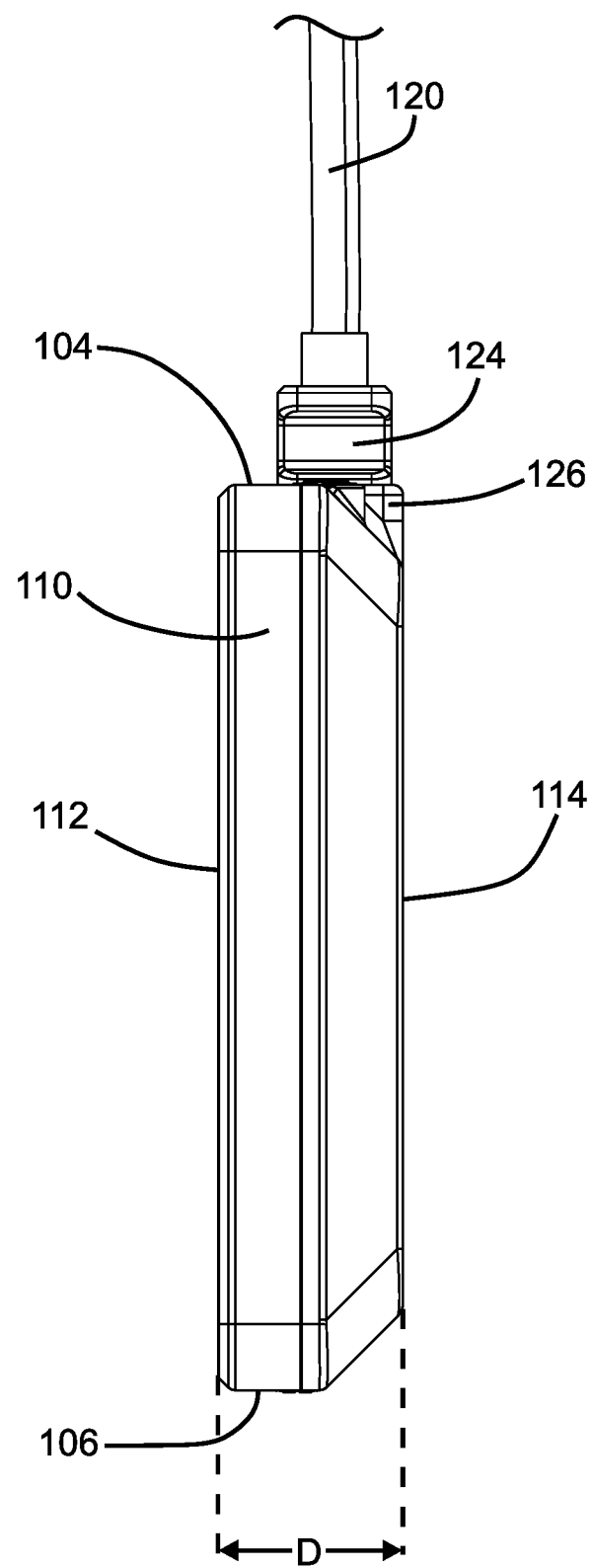
FIG. 6 is a right side view of the handheld device of FIG. 1.
Figure 7:
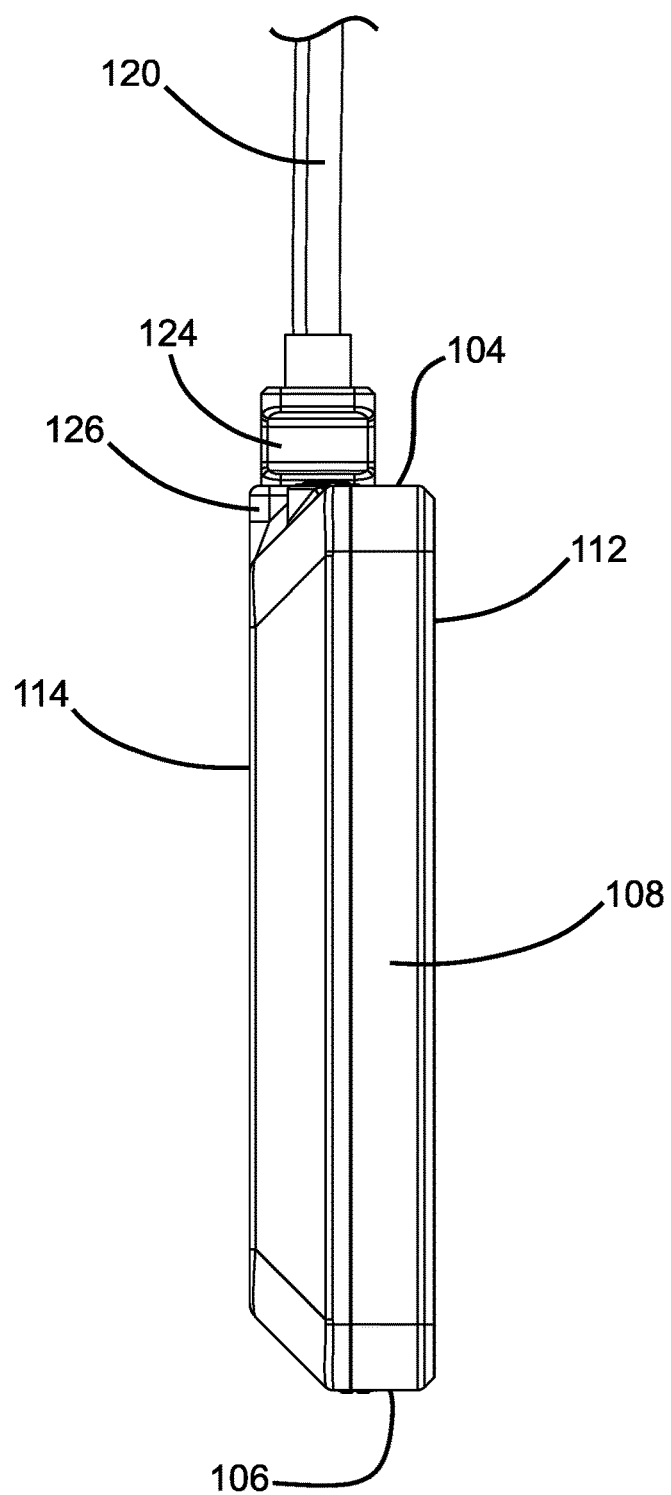
FIG. 7 is a left side view of the handheld device of FIG. 1.
Figure 8:
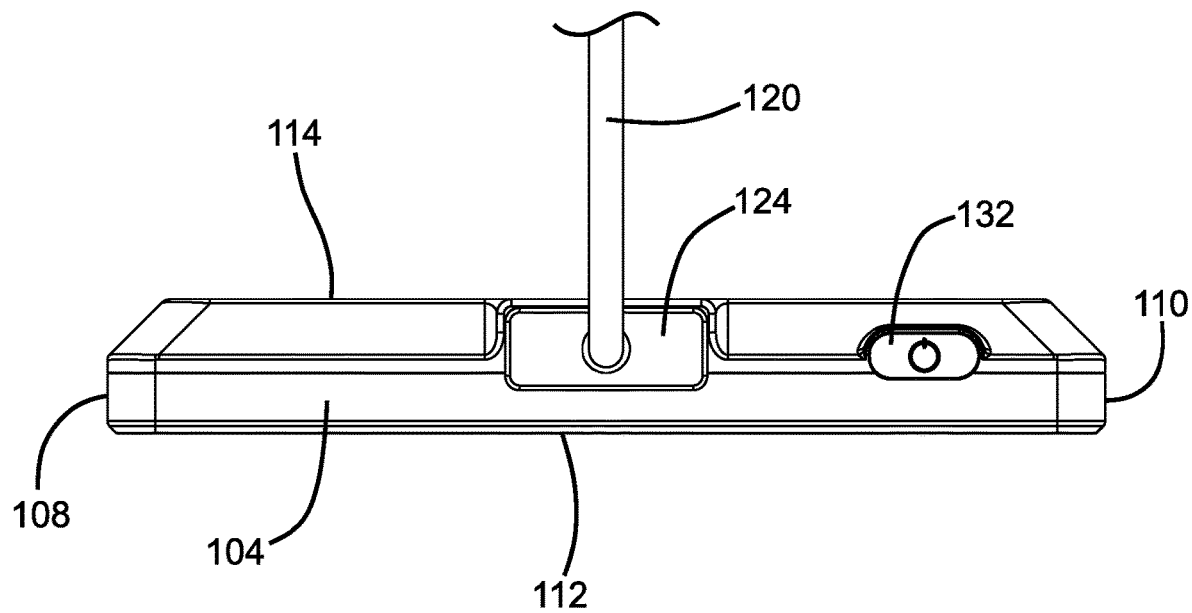
FIG. 8 is a top view of the handheld device of FIG. 1.
Figure 9:
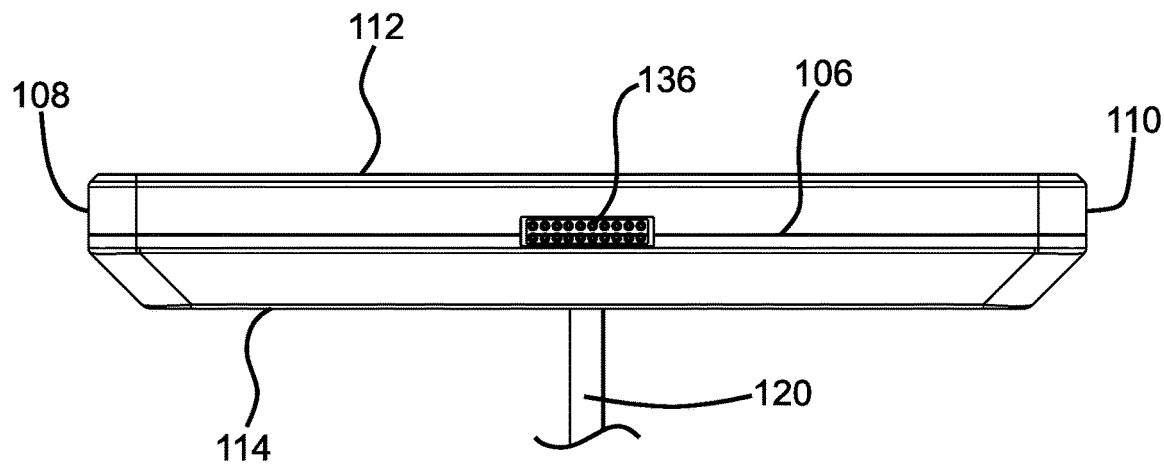
FIG. 9 is a bottom view of the handheld device of FIG. 1.

As shown in FIG. 4, the device housing 102 has a height H and a length L. In some examples, the height H is about 5 inches to about 6 inches. In some examples, the length L is about 8 inches to about 9 inches. As shown in FIG. 6, the device housing 102 has a depth D. In some examples, the depth D is about 1 inch to about 2 inches. These dimensions are provided by way of illustrative example, and not by way of limitation.

Figure 10:
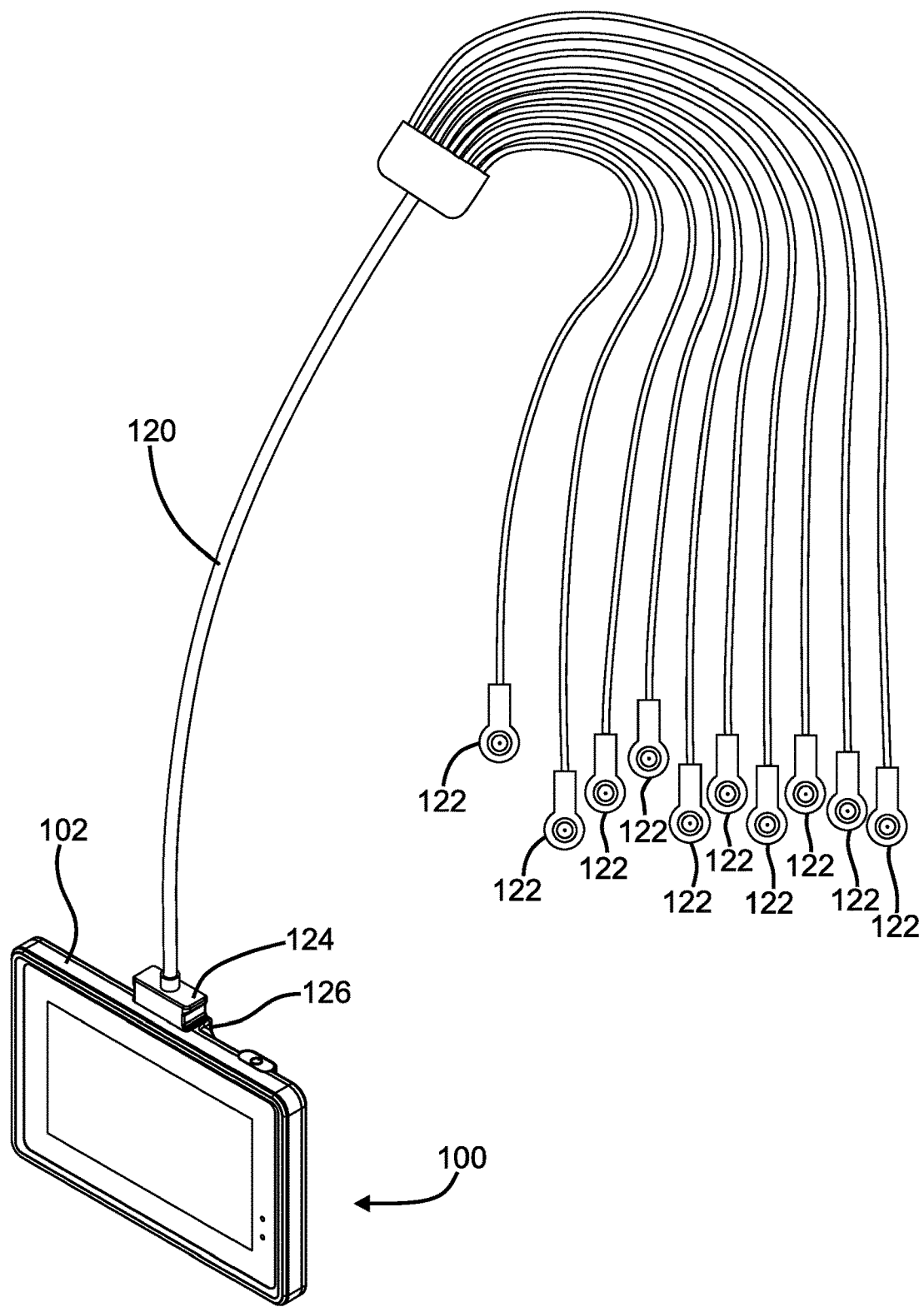
FIG. 10 is an isometric view of the handheld device of FIG. 1 showing leads that break out from a distal end of a patient cable connected to the handheld device of FIG. 1.

FIG. 10 is another isometric view of the handheld device 100. Referring now to FIGS. 2-10, the handheld device 100 includes a patient cable 120 that connects to the device housing 102. In the example shown in the figures, the patient cable 120 is connected to the first longitudinal side 104 of the device housing 102. The patient cable 120 is detachable from the device housing 102. For example, the patient cable 120 includes a plug portion 124 that includes one or more electrical contacts. The plug portion 124 can plug into a receptacle portion 126 on the device housing 102, and can be unplugged from the receptacle portion 126. The receptacle portion 126 can provide a demateable coupling between the patient cable 120 and the handheld device 100. Also, the receptacle portion 126 includes corresponding electrical contacts that mate with the electrical contacts in the plug portion 124 of the patient cable 120 to provide an electrical connection between the patient cable 120 and the handheld device 100.

As shown in FIG. 10, the patient cable 120 includes a proximal end that attaches to the handheld device 100, and a distal end that breaks out into leads 122 that are each configured to attach to a patient and to receive electrical signals from the patient. For example, the distal end of the patient cable 120 can break out into V1, V2, V3, V4, V5, V6, RA, LA, RL, and LL leads. The leads 122 provide a 12 lead diagnostic ECG signal. The leads 122 are housed inside an outer protective jacket of the patient cable 120 before they break out from the distal end of the patient cable 120. This can improve lead management and storage, and reduce lead entanglement.

As will be described in more detail with reference to FIG. 55, the handheld device 100 includes at least one processing unit 1002 housed inside the device housing 102. The at least one processing unit 1002 is configured to receive the electrical signals from the patient cable 120 and to generate an electrocardiogram based on the electrical signals. Also, the handheld device 100 includes a battery 1022 that is configured to power the at least one processing unit 1002.

Still referring to FIGS. 2-10, the handheld device 100 includes a touchscreen 130 on the device housing 102. In the example shown in the figures, the touchscreen 130 is positioned on the front side 112 of the device housing 102. The touchscreen 130 is operable by a user to control the functions of the handheld device 100, and can display the electrocardiogram that is generated from the electrical signals received from the patient cable 120. In some examples, the touchscreen 130 is a capacitive touchscreen. In some examples, the touchscreen 130 has a bezel design that is about 12 cm×19 cm, with rounded corners having a radius of 0.5 cm.

In addition to displaying controls and the electrocardiogram, the touchscreen 130 can further display an alert when at least one of the leads 122 is loose with respect to a desired contact location on the patient. Additionally, the touchscreen 130 can further be used to identify and display one or more leads 122 that are loose with respect to desired contact locations on the patient, and to provide guidance for a user to properly attach the leads 122 to the patient.

The handheld device 100 further includes a power button 132 that can be actuated by a user to turn on and off the handheld device 100. Additionally, the power button 132 can be actuated by a user to put the handheld device 100 in a stand-by mode.

The handheld device 100 can further include one or more status indicators 134 to indicate device power and connectivity. In some examples, the one or more status indicators 134 are light-emitting diodes (LEDs) that illuminate to indicate a status of the handheld device 100 such as whether the handheld device 100 is powered on, connected to a network, and the like.

The network can be a Wi-Fi or Bluetooth network that provides a wireless connection between the handheld device 100 and a docking station 200, 300, 400, 500. In some examples, the handheld device 100 wirelessly transmits data to a docking station or to an external printer that receives the data for printing the electrocardiogram. The wireless transmission of data from the handheld device 100 can be encrypted such that only authorized docking stations or external printers are able to receive and decipher the data to improve data privacy.

The handheld device 100 further includes electrical contacts 136. In the example shown in the figures, the electrical contacts 136 are positioned on the second longitudinal side 106 of the device housing 102. The electrical contacts 136 are configured to connect with corresponding electrical contacts inside the pockets defined by the docking stations 200, 300, 400, 500. The electrical contacts 136 are configured to receive a voltage input from the electrical contacts inside the pockets to recharge the battery 1022 of the handheld device 100. As an illustrative example, the electrical contacts 136 are made from a copper alloy gold material.

Figure 11:
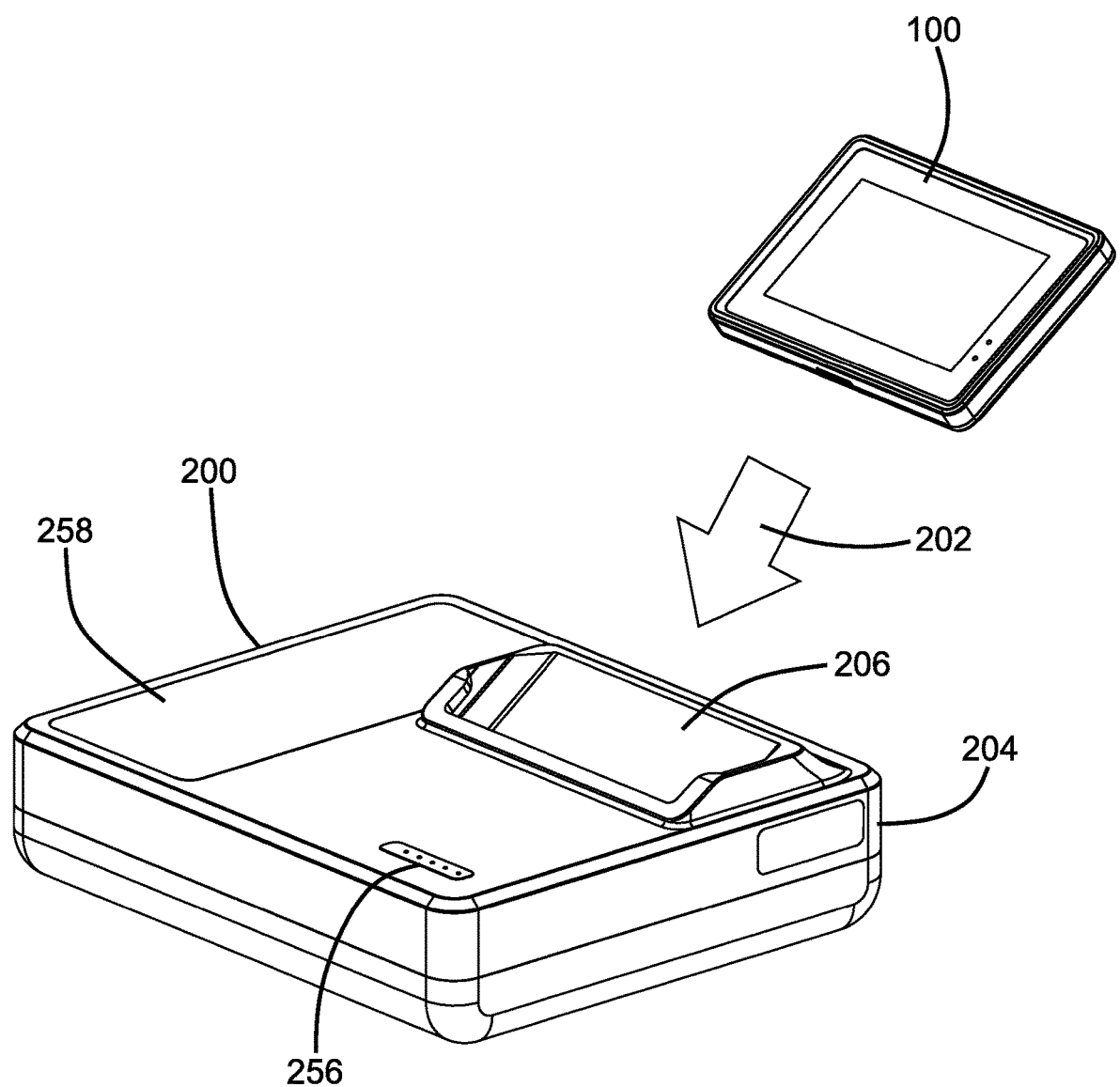
FIG. 11 is an isometric view showing a directional arrow for docking the handheld device of FIG. 1 into a docking station according to a first embodiment.

FIG. 11 is an isometric view showing a directional arrow 202 for docking the handheld device 100 into the docking station 200. In this embodiment, the docking station 200 includes a printer 240 (see FIGS. 15 and 19) to print the electrocardiogram generated from the electrical signals received from the patient cable 120, and the docking station 200 is configured to support the handheld device 100 on a mobile cart or tabletop surface. While the directional arrow 202 is pointed in a first direction for slotting the handheld device 100 into a pocket 206 of the docking station 200, the handheld device 100 can be pulled in an opposite second direction to remove the handheld device 100 from the pocket 206 of the docking station 200.

As shown in FIG. 11, the docking station 200 includes a dock housing 204 that defines the pocket 206 which is configured to receive and support the handheld device 100 in an upright position (see also FIGS. 14-21). As will be described in more detail, the docking station 200 is configured to recharge the battery 1022 (see FIG. 55) of the handheld device 100 when the handheld device 100 is held inside the pocket 206 of the docking station 200.

Figure 12:
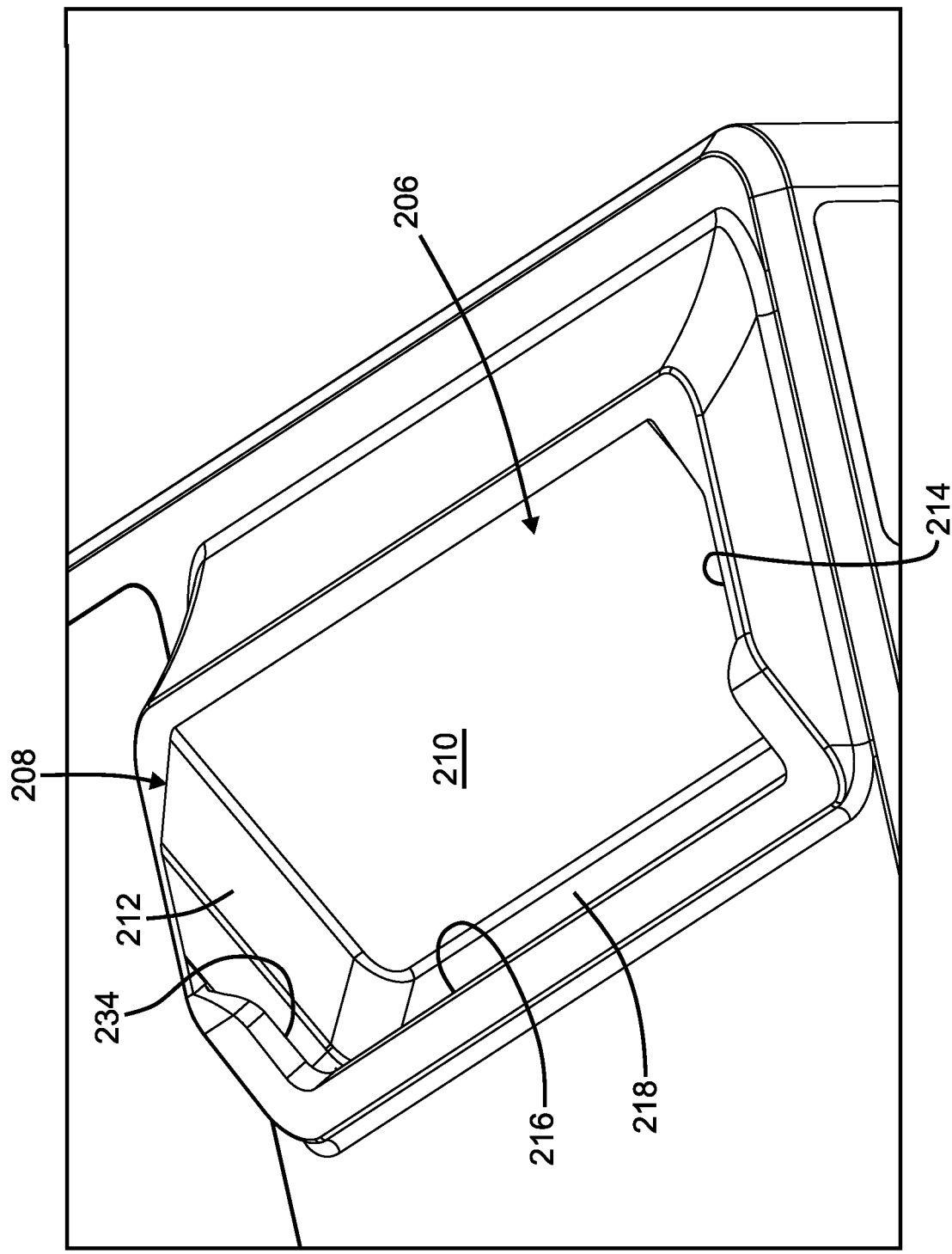
FIG. 12 is a detailed view of a pocket of the docking station of FIG. 11.
Figure 13:
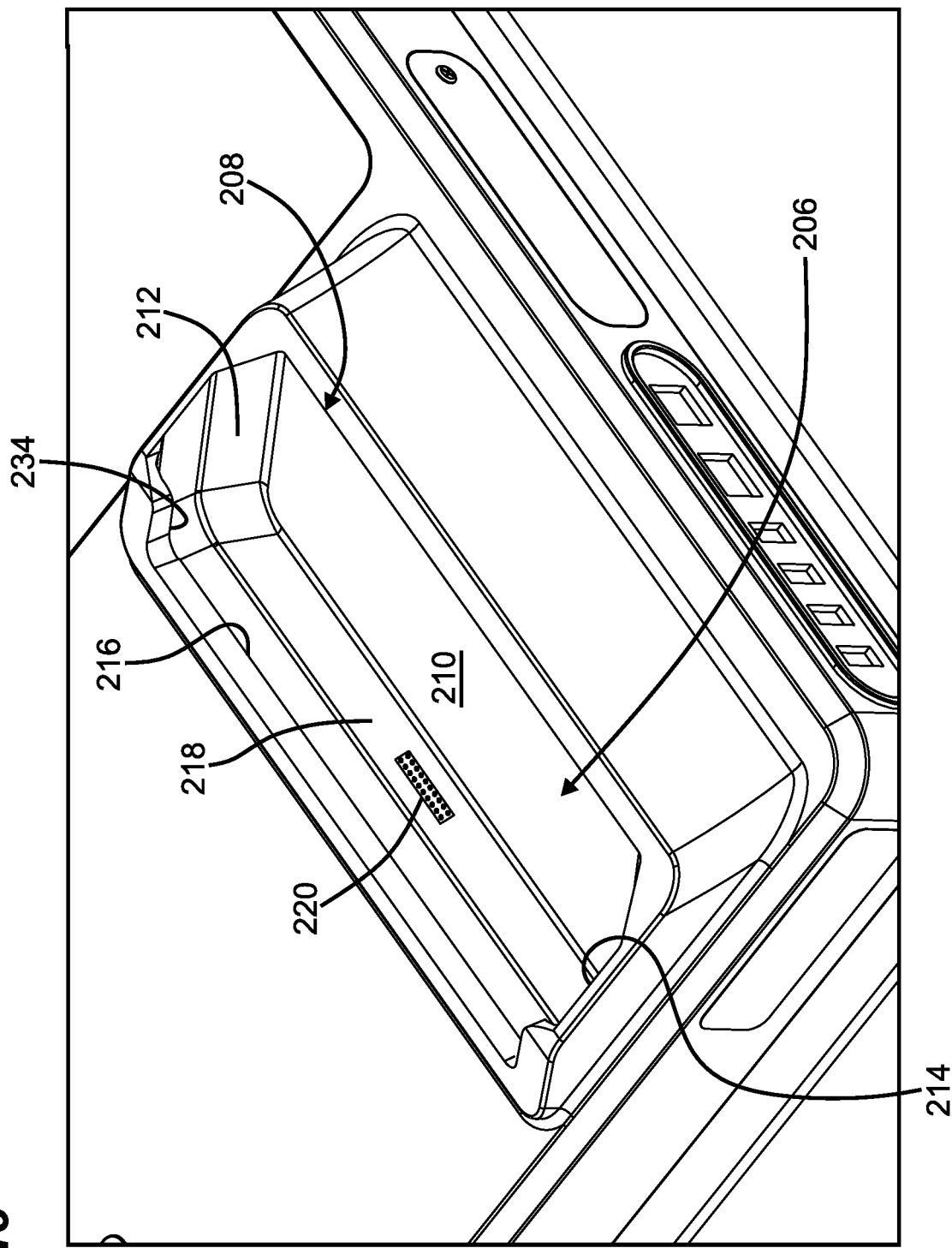
FIG. 13 is another detailed view of the pocket of the docking station of FIG. 11.

FIGS. 12 and 13 are detailed isometric views of the pocket 206. As shown in FIGS. 12 and 13, the pocket 206 includes an open end 208, a rear interior surface 210, first and second lateral interior surfaces 212, 214, a front interior surface 216, and a bottom interior surface 218.

The open end 208 of the pocket 206 allows the handheld device 100 to be slotted into and out of the pocket 206, while the rear interior surface 210, the first and second lateral interior surfaces 212, 214, the front interior surface 216, and the bottom interior surface 218 retain the handheld device 100 inside the pocket 206 of the docking station 200.

For example, when the handheld device 100 is held inside the pocket 206 of the docking station 200, the second longitudinal side 106 of the handheld device 100 at least partially abuts the bottom interior surface 218 of the pocket 206, the rear side 114 of the handheld device 100 at least partially abuts the rear interior surface 210 of the pocket 206, the front side 112 of the handheld device 100 at least partially abuts the front interior surface 216 of the pocket 206, and the first and second lateral sides 108, 110 of the handheld device 100 at least partially abut the first and second lateral interior surfaces 212, 214 of the pocket 206.

Advantageously, the handheld device 100 is not tethered to the docking station 200 or any other device. Thus, the handheld device 100 is portable relative to the docking station 200. For example, a user can remove the handheld device 100 from the pocket 206, and can carry the handheld device 100 into another room or area without also having to move the docking station 200. The docking station remains stationary while the handheld device 100 is carried by the user.

As shown in FIG. 13, the bottom interior surface 218 of the pocket 206 includes electrical contacts 220 that are configured to mate with the electrical contacts 136 on the handheld device 100. When the handheld device 100 is held inside the pocket 206, the electrical contacts 136 receive a voltage input from the electrical contacts 220. The voltage input is used by a charging circuit 1024 to recharge the battery 1022 (see FIG. 55) of the handheld device 100.

In alternative examples, the pocket 206 can be configured to provide wireless charging such as through inductive charging or magnetic resonance charging. In some examples, the rear interior surface 210 is equipped with an inductive or magnetic resonance charger.

In some examples, the connection between the electrical contacts 136 on the handheld device 100 and the electrical contacts 220 on the docking station 200 enable data communication between the docking station 200 and the handheld device 100. For example, the docking station 200 can receive data from the handheld device 100, and the handheld device 100 can receive data from the docking station 200. In some examples, data communication between the handheld device 100 and the docking station 200 is accomplished through a wireless connection such as through a Wi-Fi or Bluetooth wireless connection, or similar type of wireless connection.

FIGS. 14-21 are front isometric, rear isometric, front, rear, right side, left side, top, and bottom views showing the handheld device 100 docked into the docking station 200. The dock housing 204 includes a front surface 222, a rear surface 224, first and second lateral sides 226, 228, a top surface 230, and a base 232. The base 232 is configured to support the dock housing 204 on a support surface such as a tabletop surface or a surface on a mobile cart. In the example shown in the figures, the dock housing 204 has a rectangular prism shape.

Figure 18:
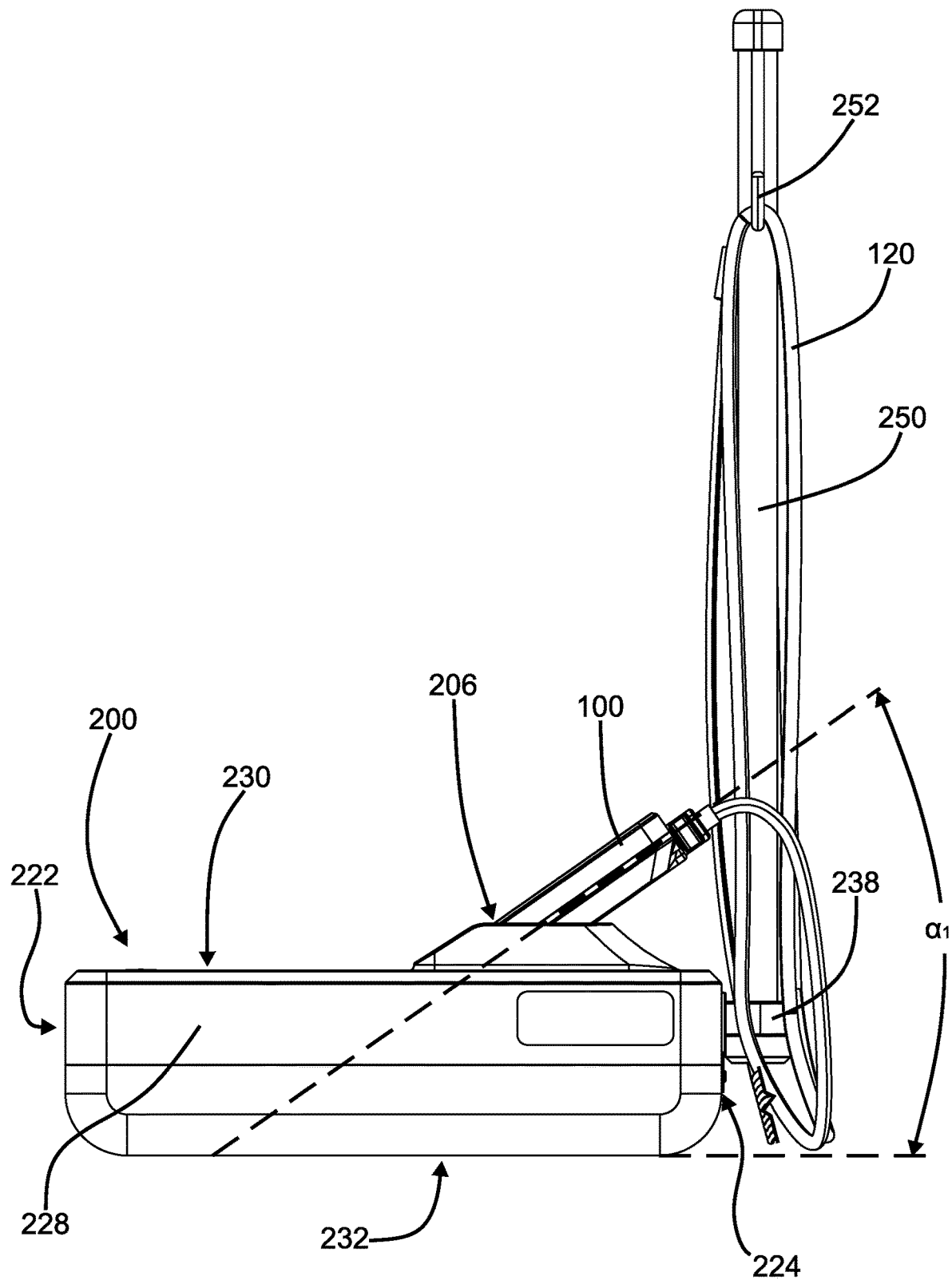
FIG. 18 is a right side view of the handheld device of FIG. 1 docked into the docking station of FIG. 11.

The pocket 206 is configured to receive and support the handheld device 100 in an upright position. As shown in FIG. 18, the pocket 206 is shaped and orientated to support the handheld device 100 at an angle $\alpha_1$ relative to the base 232 (and the support surface). The angle $\alpha_1$ of the pocket 206 relative to the base 232 is an acute angle (i.e., less than 90 degrees).

The front interior surface 216 provides a lip 234 that is configured to partially surround the front side 112 of the handheld device 100 to retain the handheld device 100 inside the pocket 206 between the rear interior surface 210, the first and second lateral interior surfaces 212, 214, the front interior surface 216, and the bottom interior surface 218. The front interior surface 216 is partially open to allow visibility of the touchscreen 130 on the front side 112 of the handheld device 100 when the handheld device 100 is retained inside the pocket 206.

Figure 15:
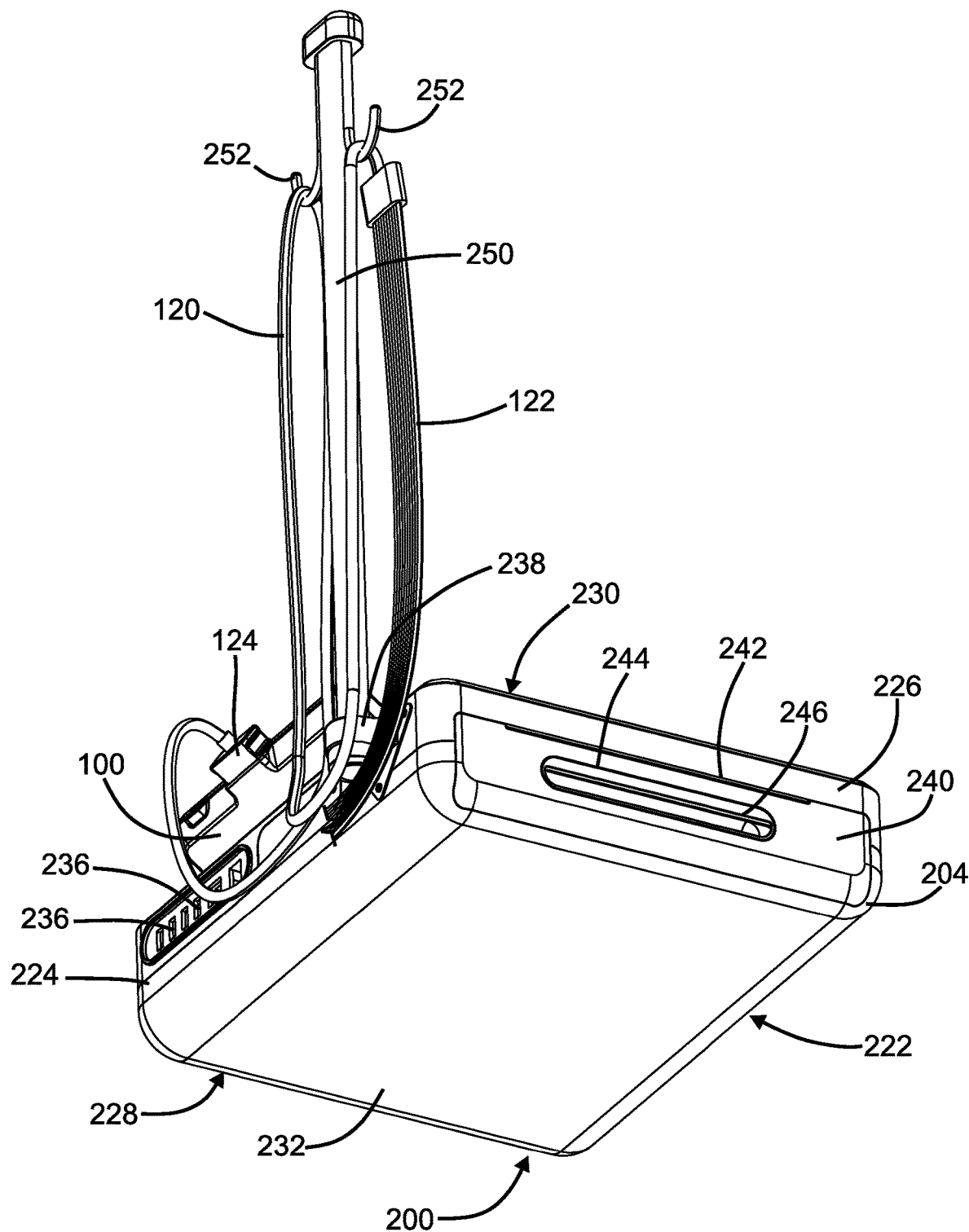
FIG. 15 is a rear isometric view of the handheld device of FIG. 1 docked into the docking station of FIG. 11.
Figure 16:
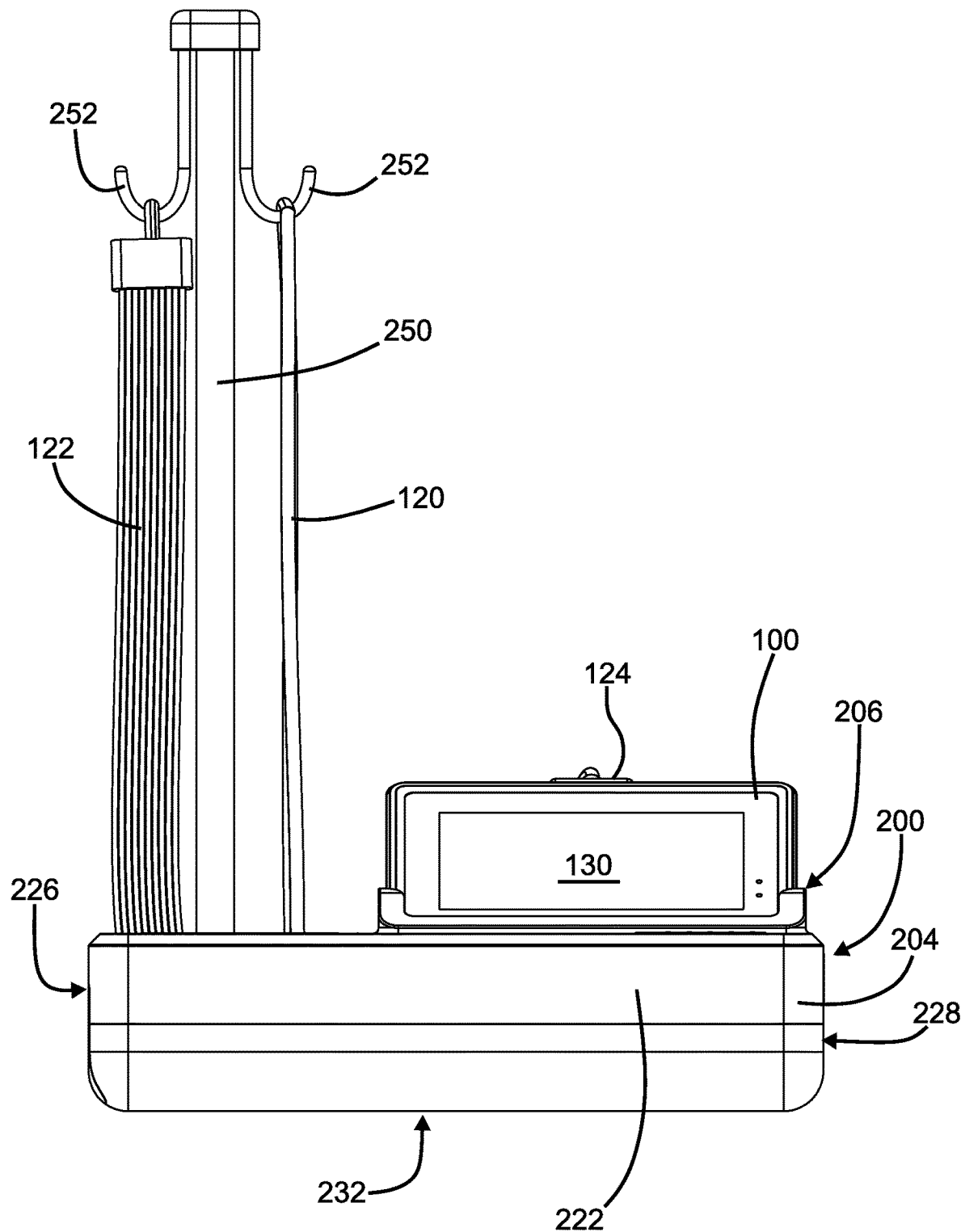
FIG. 16 is a front view of the handheld device of FIG. 1 docked into the docking station of FIG. 11.
Figure 19:
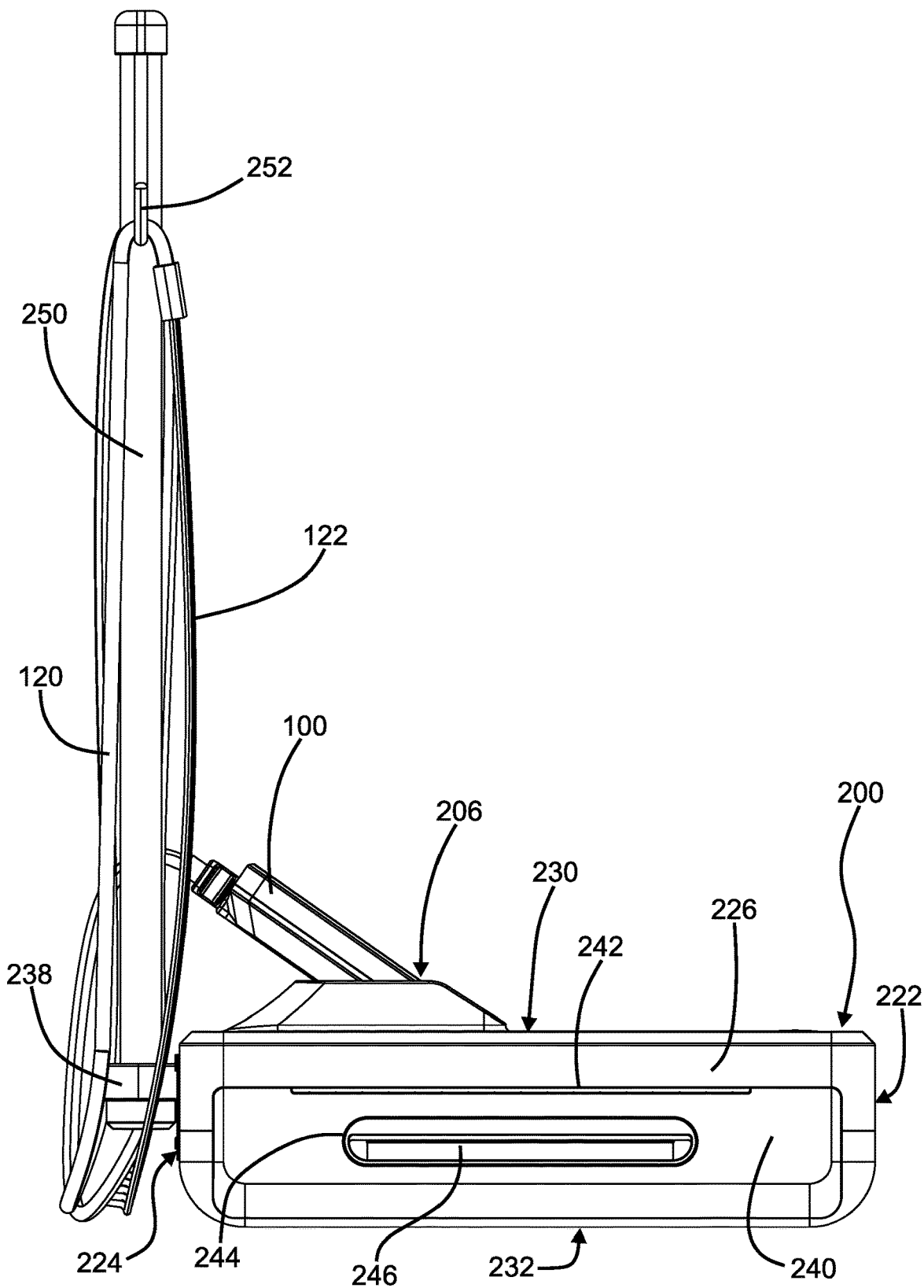
FIG. 19 is a left side view of the handheld device of FIG. 1 docked into the docking station of FIG. 11.

As shown in FIGS. 15 and 19, the printer 240 includes an opening 242 on the first lateral side 226 of the dock housing 204 for printed paper to exit the printer 240. The printer also includes a paper tray access 244 on the first lateral side 226. The paper tray access 244 includes a latch release 246 that can be pushed by the fingers of a user to swing open and provide access to the paper tray of the printer 240. Additionally, the paper tray access 244 when opened by the fingers of the user can also serve as handle for a user to grasp the dock housing 204.

In some examples, the printer 240 is configured to use size A4 paper or smart paper. In some examples, the printer 240 is an A4 thermal writer that prints electrocardiograms.

The printer 240 is configured to print an electrocardiogram based on data that the docking station 200 receives from the handheld device 100. The docking station 200 can receive the data from the handheld device 100 through a connection between the electrical contacts 220 inside the pocket 206 of the docking station 200 and the electrical contacts 136 on the handheld device 100. Alternatively, the docking station 200 can wirelessly receive the data from the handheld device 100 such as through a Wi-Fi or Bluetooth wireless connection.

Figure 17:
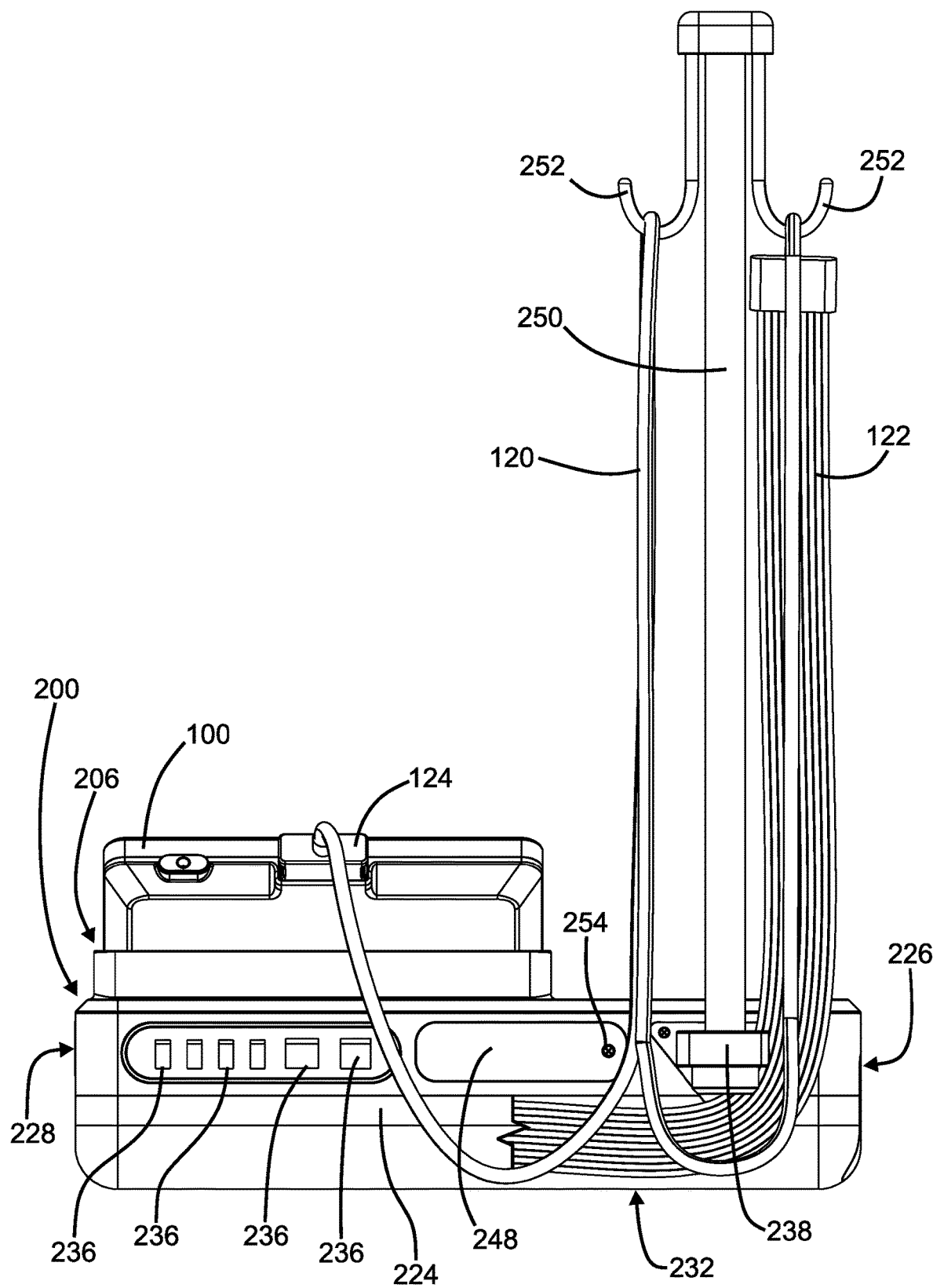
FIG. 17 is a rear view of the handheld device of FIG. 1 docked into the docking station of FIG. 11.

As shown in FIG. 17, the docking station 200 includes input/output connectors 236 on the rear surface 224. The input/output connectors 236 can include one or more USB connectors, an RJ45 jack, an AC power connector, and additional connectors. The AC power connector can receive an electrical power cord to connect the docking station 200 to an external electrical power source such as a wall mounted electrical outlet.

In some examples, the docking station 200 can transfer the data received from the handheld device 100 to another device such as through a wired connection via the input/output connectors 236 such as the one or more USB connectors or RJ45 jack. Alternatively, the docking station 200 can transfer the data received from the handheld device 100 to another device through a wireless network such as cellular, Wi-Fi, Bluetooth, and the like.

In some examples, the handheld device 100 can directly transfer the data acquired from the leads 122 of the patient cable 120 (e.g., the 12 lead diagnostic ECG signal) for storage in an electronic medical record (EMR) of a patient. Alternatively, the docking station 200 can receive the data (e.g., the 12 lead diagnostic ECG signal) from the handheld device 100, and the docking station 200 can store the data in an electronic medical record (EMR) of a patient.

Additionally, the docking station 200 includes a battery door 248 on the rear surface 224. The battery door 248 can be opened to gain access to a battery of the docking station 200. In some examples, the battery door 248 includes a screw 254 that can be unscrewed to open or remove the battery door 248 to allow access to the battery of the docking station 200.

As shown in FIGS. 14-21, the docking station 200 can include a holder 238 that can be used to secure a patient cable storage arm 250 to the docking station 200. The holder 238 is attached to the rear surface 224 of the docking station 200 and has a ring or cup-like structure that surrounds and thereby fixes the patient cable storage arm 250 to the docking station 200.

The patient cable storage arm 250 can be used to manage the patient cable 120 that connects to the handheld device 100, and also the leads 122 that break out from the patient cable 120. For example, the patient cable storage arm 250 can include one or more hooks 252 that can support the patient cable 120 and leads 122. The patient cable storage arm 250 can be made from anodized stainless steel. The patient cable storage arm 250 can be coupled to holder 238, and decoupled from the holder 238, to attach and detach from the docking station 200 as needed or desired. In some examples, the patient cable storage arm 250 is an optional accessory.

Figure 14:
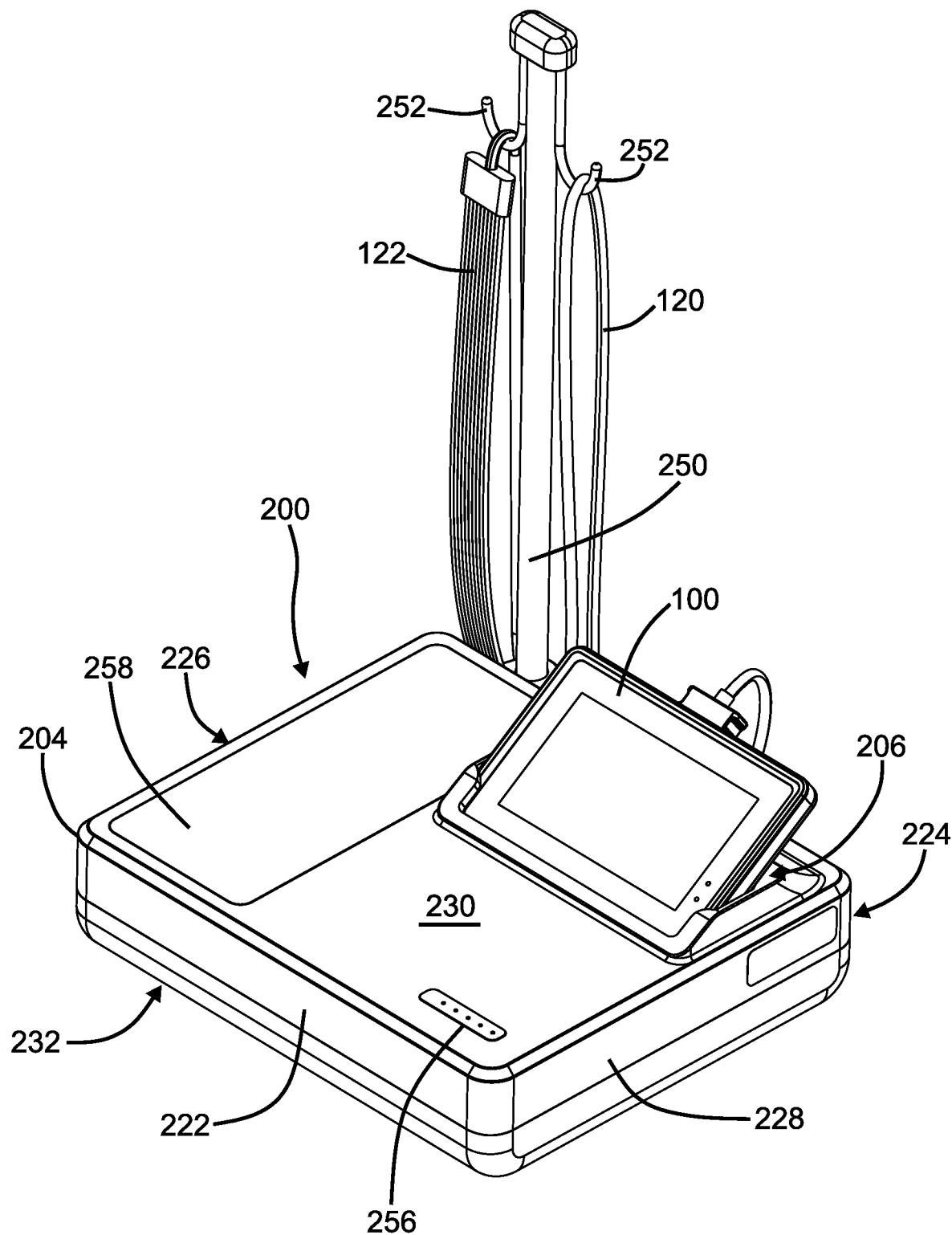
FIG. 14 is a front isometric view of the handheld device of FIG. 1 docked into the docking station of FIG. 11.
Figure 20:
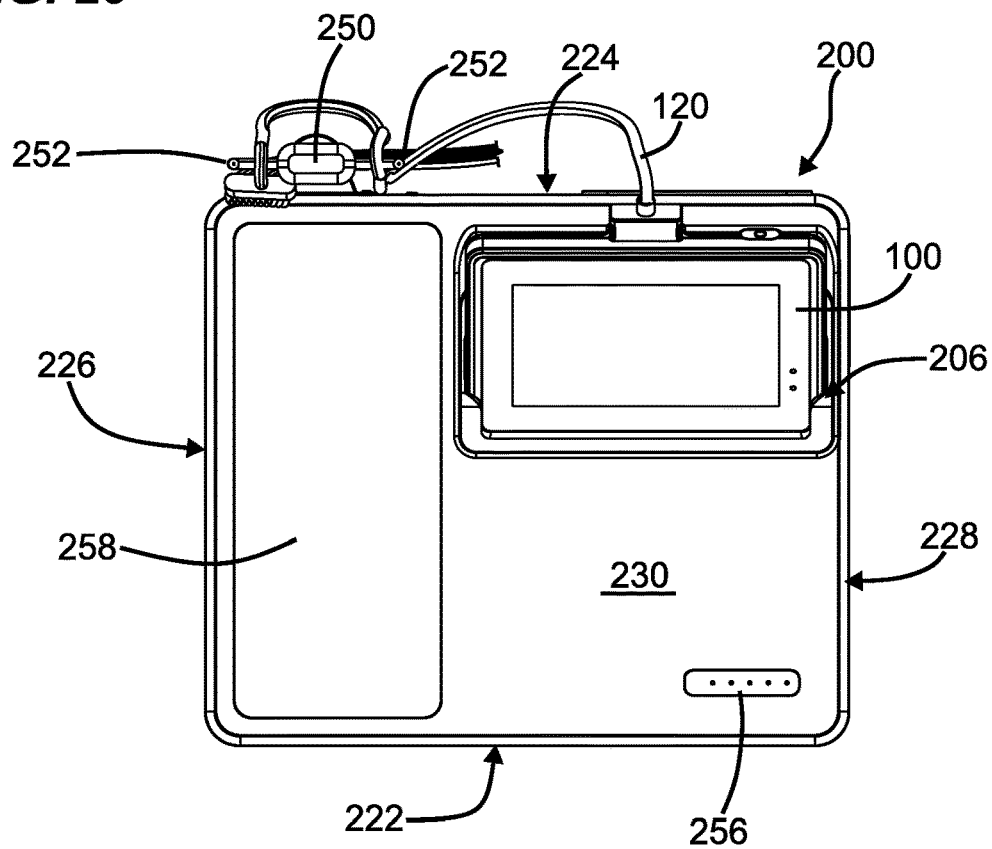
FIG. 20 is a top view of the handheld device of FIG. 1 docked into the docking station of FIG. 11.
Figure 21:
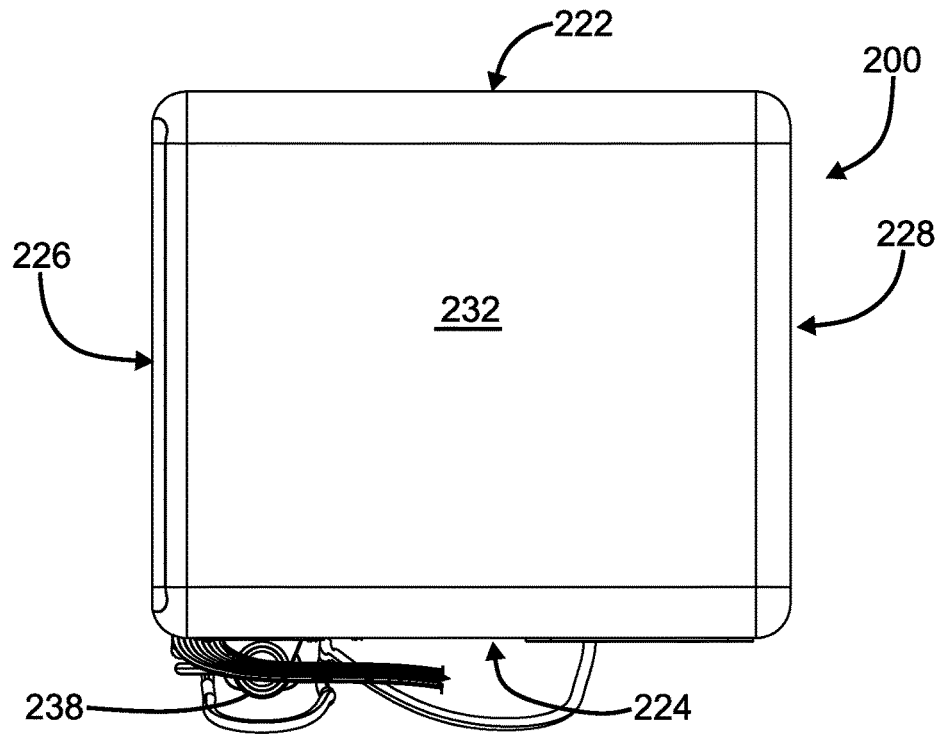
FIG. 21 is a bottom view of the handheld device of FIG. 1 docked into the docking station of FIG. 11.

As shown in FIGS. 11, 14, and 20, the docking station 200 can include LED indicators 256 on the top surface 230 of the dock housing 204. The LED indicators 256 can illuminate to indicate a power and connectivity status of the docking station 200.

The top surface 230 of the dock housing 204 can further include an area 258 for a hook-up graphic that shows the optimal locations for attaching the leads 122 to a patient's body. For example, the hook-up graphic can display the optimal locations for attaching the V1, V2, V3, V4, V5, V6, RA, LA, RL, and LL leads that extend from the patient cable 120. In certain examples, the area 258 (and hook-up graphic) can be about 30 cm×12 cm.

Figure 22:
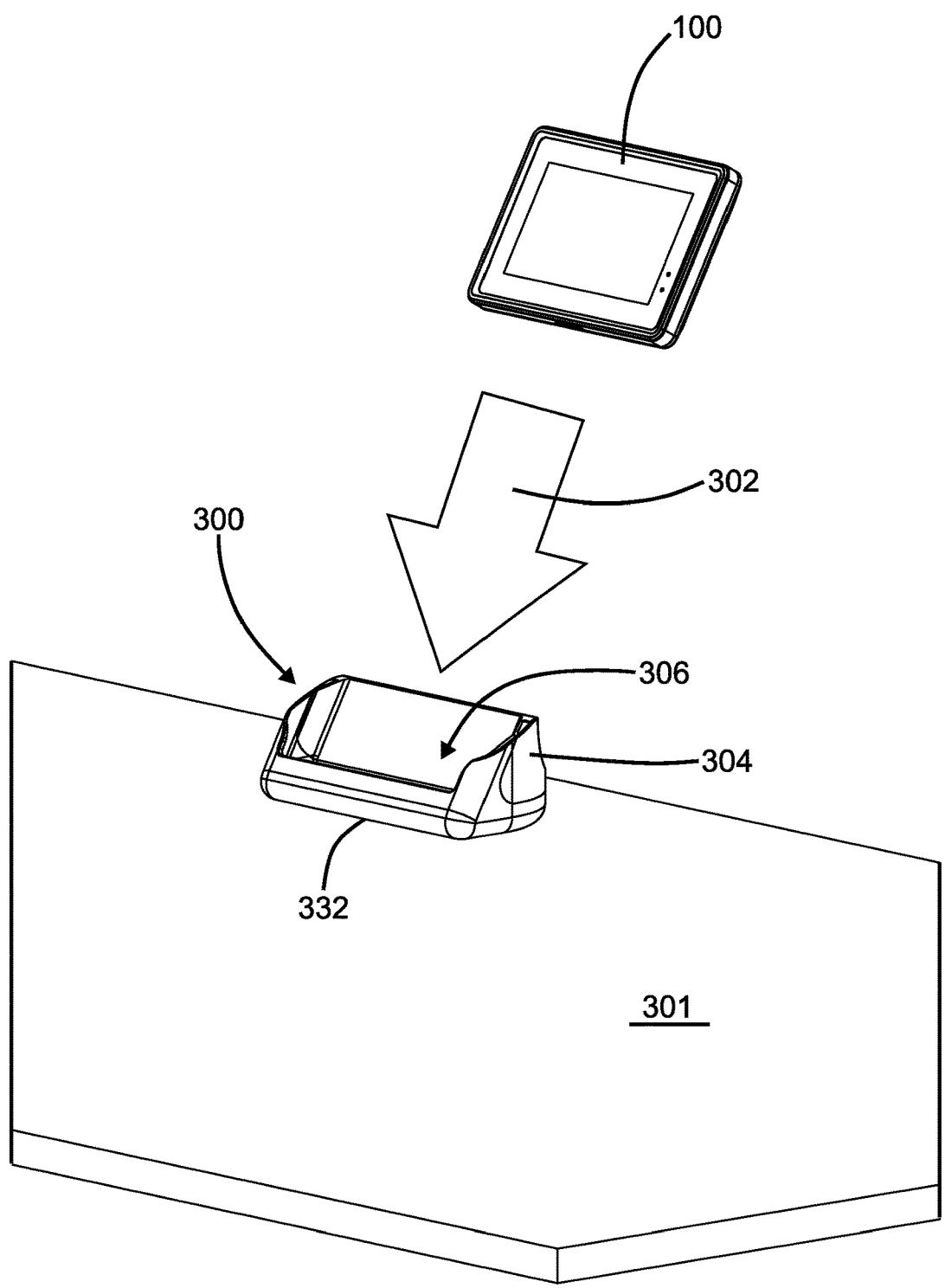
FIG. 22 is an isometric view showing a directional arrow for docking the handheld device of FIG. 1 into a docking station according to a second embodiment.

FIG. 22 is an isometric view showing a directional arrow 302 for docking the handheld device 100 into the docking station 300. In this embodiment, the docking station 300 is configured to support the handheld device 100 on a tabletop surface 301, and does not include a printer. While the directional arrow 302 is pointed in a first direction for slotting the handheld device 100 into a pocket 306 of the docking station 300, the handheld device 100 can be pulled in an opposite second direction to remove the handheld device 100 from the pocket 306.

As shown in FIG. 22, the docking station 300 includes a dock housing 304 that defines the pocket 306 which is configured to receive and support the handheld device 100 in an upright position with respect to the tabletop surface 301 (see also FIGS. 25-31). As will be described in more detail, the docking station 300 is configured to recharge the battery 1022 of the handheld device 100 when the handheld device 100 is held inside the pocket 306.

Figure 23:
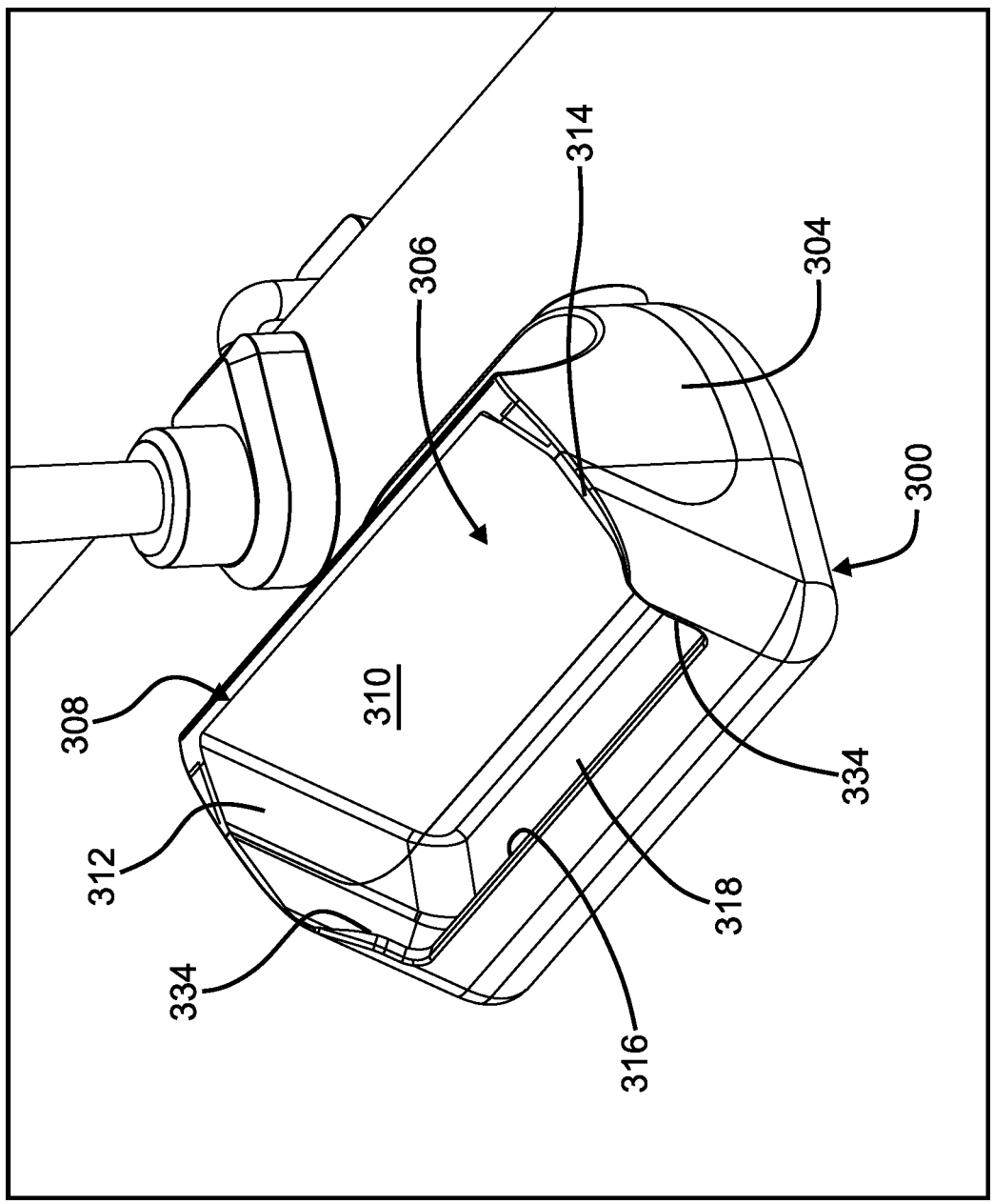
FIG. 23 is a detailed view of a pocket of the docking station of FIG. 22.
Figure 24:
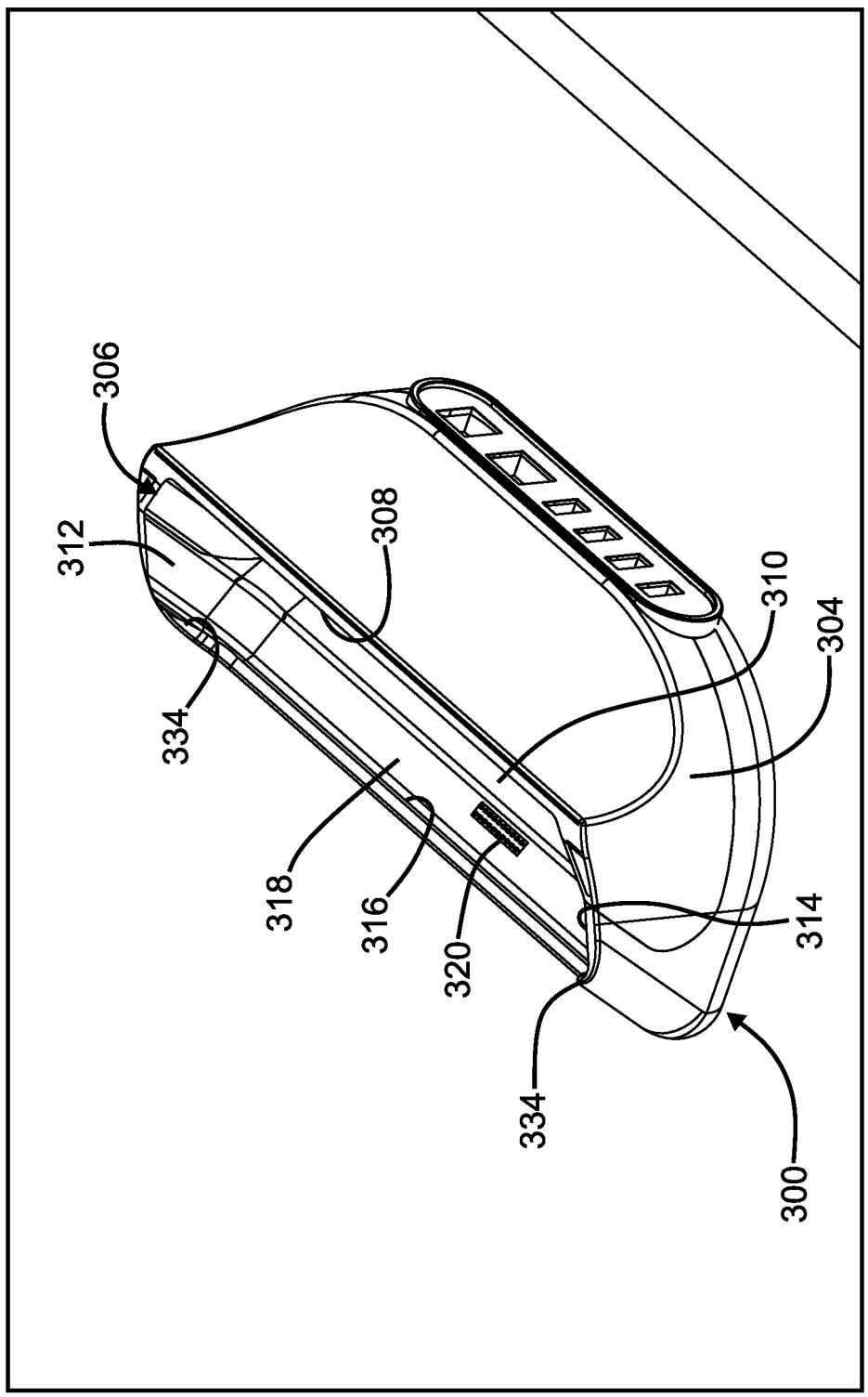
FIG. 24 is another detailed view of the pocket of the docking station of FIG. 22.
Figure 25:
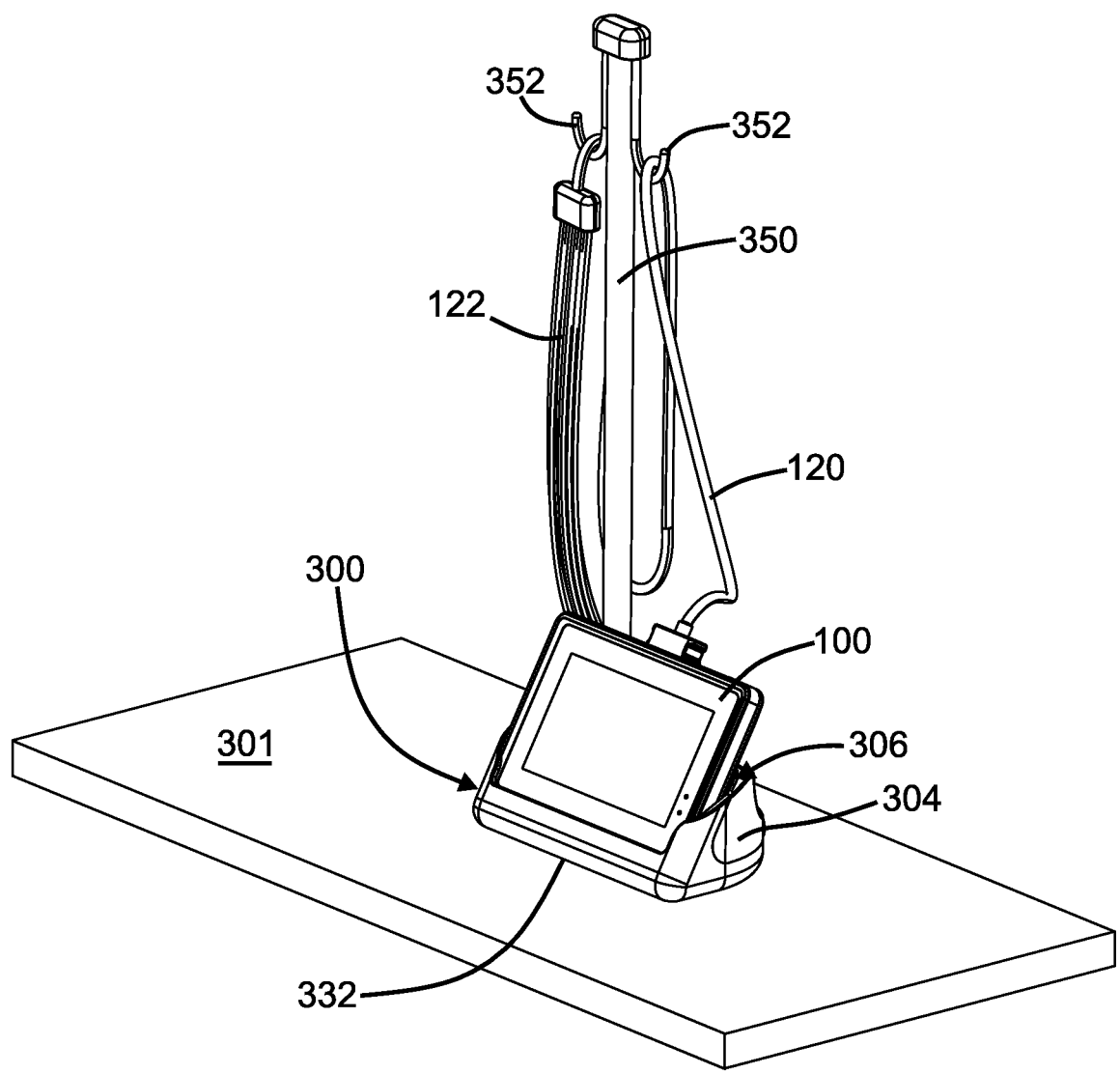
FIG. 25 is a front isometric view of the handheld device of FIG. 1 docked into the docking station of FIG. 22.
Figure 26:
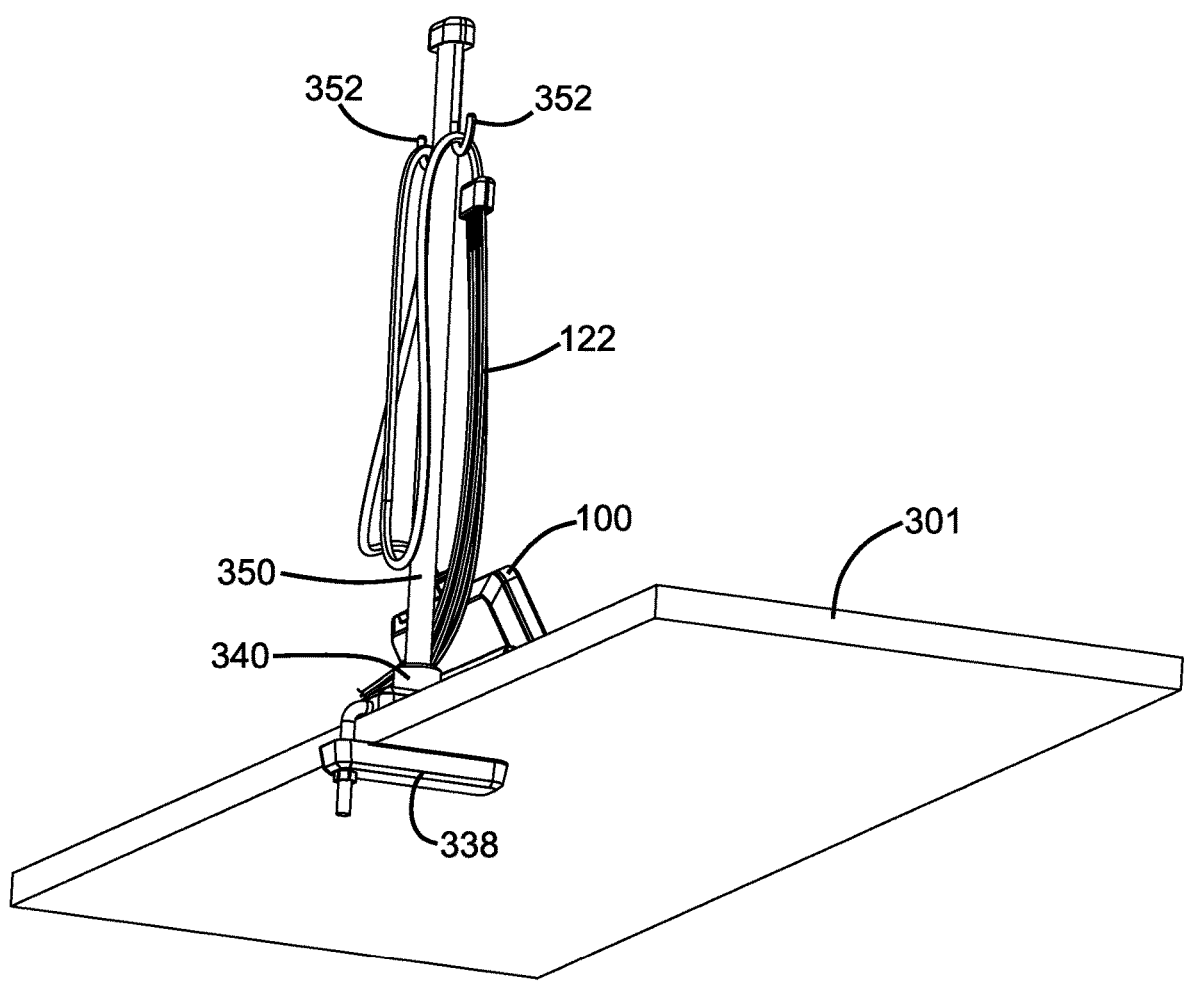
FIG. 26 is a rear isometric view of the handheld device of FIG. 1 docked into the docking station of FIG. 22.
Figure 27:
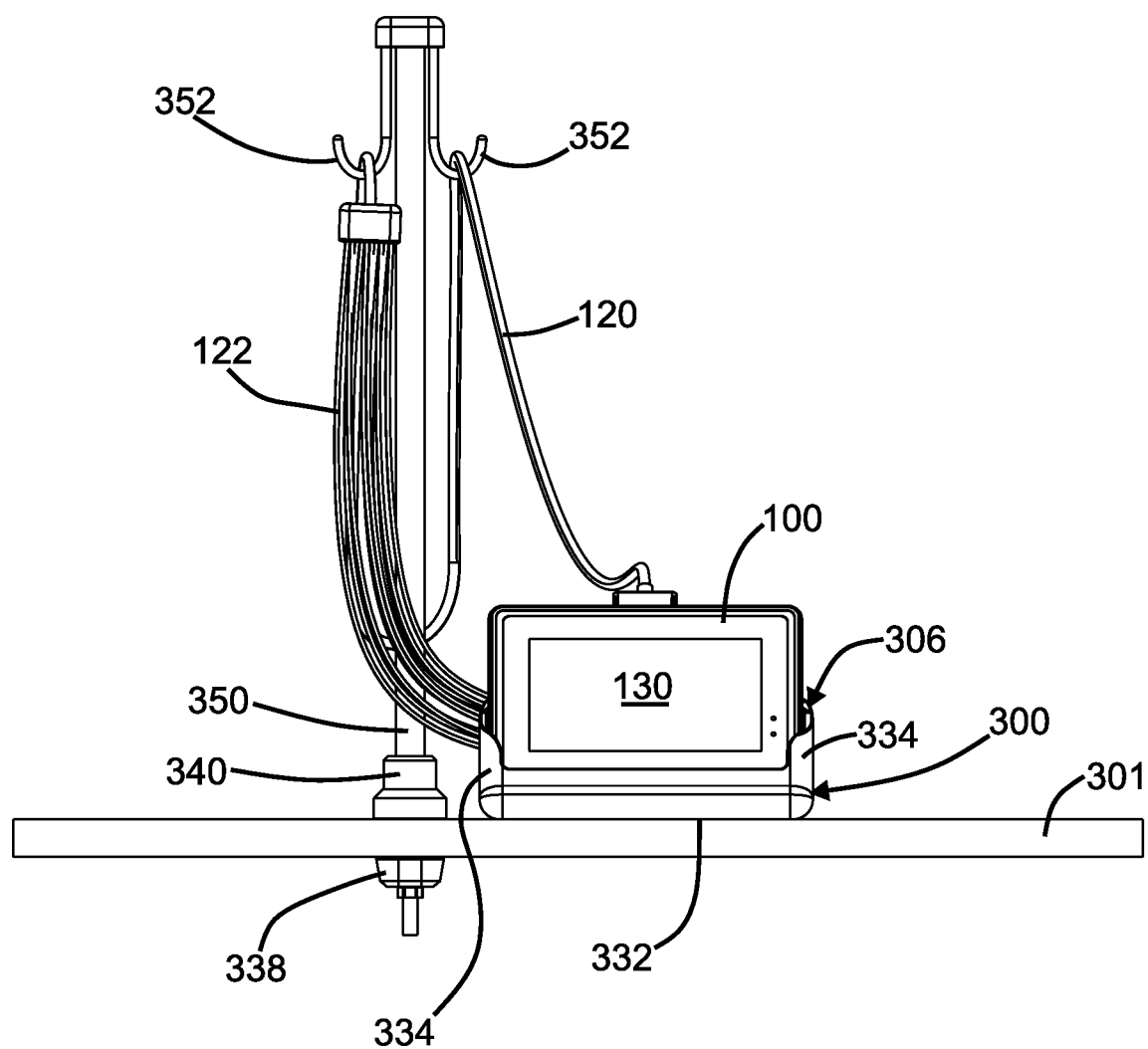
FIG. 27 is a front view of the handheld device of FIG. 1 docked into the docking station of FIG. 22.

FIGS. 23 and 24 are detailed isometric views of the pocket 306. The pocket 306 is similar to the pocket 206 described above with respect to the docking station 200. For example, the pocket 306 includes an open end 308, a rear interior surface 310, first and second lateral interior surfaces 312, 314, a front interior surface 316, and a bottom interior surface 318.

The open end 308 of the pocket 306 allows the handheld device 100 to be slotted into and out of the pocket 306, while the rear interior surface 310, the first and second lateral interior surfaces 312, 314, the front interior surface 316, and the bottom interior surface 318 retain the handheld device 100 inside the pocket 306 of the docking station 300.

For example, when the handheld device 100 is held inside the pocket 306 of the docking station 300, the second longitudinal side 106 of the handheld device 100 at least partially abuts the bottom interior surface 318 of the pocket 306, the rear side 114 of the handheld device 100 at least partially abuts the rear interior surface 310 of the pocket 306, the front side 112 of the handheld device 100 at least partially abuts the front interior surface 316 of the pocket 306, and the first and second lateral sides 108, 110 of the handheld device 100 at least partially abut the first and second lateral interior surfaces 312, 314 of the pocket 306.

Advantageously, the handheld device 100 is not tethered to the docking station 300. Thus, the handheld device 100 is portable relative to the docking station 300. For example, a user can remove the handheld device 100 from the pocket 306, and can carry the handheld device 100 into another room or area without also having to move the docking station 300.

As shown in FIG. 24, the bottom interior surface 318 of the pocket 306 includes electrical contacts 320 that are configured to mate with the electrical contacts 136 on the handheld device 100. When the handheld device 100 is held inside the pocket 306, the electrical contacts 136 receive a voltage input from the electrical contacts 320. The voltage input is used by the charging circuit 1024 to recharge the battery 1022 of the handheld device 100.

In alternative examples, the pocket 306 can be configured to provide wireless charging such as through inductive charging or magnetic resonance charging. In some examples, the rear interior surface 310 is equipped with an inductive or magnetic resonance charger.

In some examples, the connection between the electrical contacts 136 on the handheld device 100 and the electrical contacts 320 on the docking station 300 enable data communication between the docking station 300 and the handheld device 100. For example, the docking station 300 can receive data from the handheld device 100, and the handheld device 100 can receive data from the docking station 300. In some examples, data communication between the handheld device 100 and the docking station 300 is accomplished through a wireless connection such as through a Wi-Fi or Bluetooth wireless connection, or similar type of wireless connection.

FIGS. 25-32 are front isometric, rear isometric, front, rear, right side, left side, top, and bottom views showing the handheld device 100 docked into the docking station 300. The dock housing 304 includes a base 332 that is configured to support the dock housing 304 on a support surface such as the tabletop surface 301 or another surface such as a mobile cart.

The pocket 306 is configured to receive and support the handheld device 100 in an upright position. The pocket 306 is orientated at an angle $\alpha_2$ relative to the base 332 such that the pocket 306 supports the handheld device 100 at an angle relative to the tabletop surface 301. The angle $\alpha_2$ of the pocket 306 relative to the base 332 is an acute angle (i.e., less than 90 degrees).

The front interior surface 316 provides a lip 334 that is configured to partially surround the front side 112 of the handheld device 100 to retain the handheld device 100 inside the pocket 306 between the rear interior surface 310, the first and second lateral interior surfaces 312, 314, the front interior surface 316, and the bottom interior surface 318. The front interior surface 316 is partially open to allow visibility of the touchscreen 130 on the front side 112 of the handheld device 100 when the handheld device 100 is retained inside the pocket 306.

Figure 28:
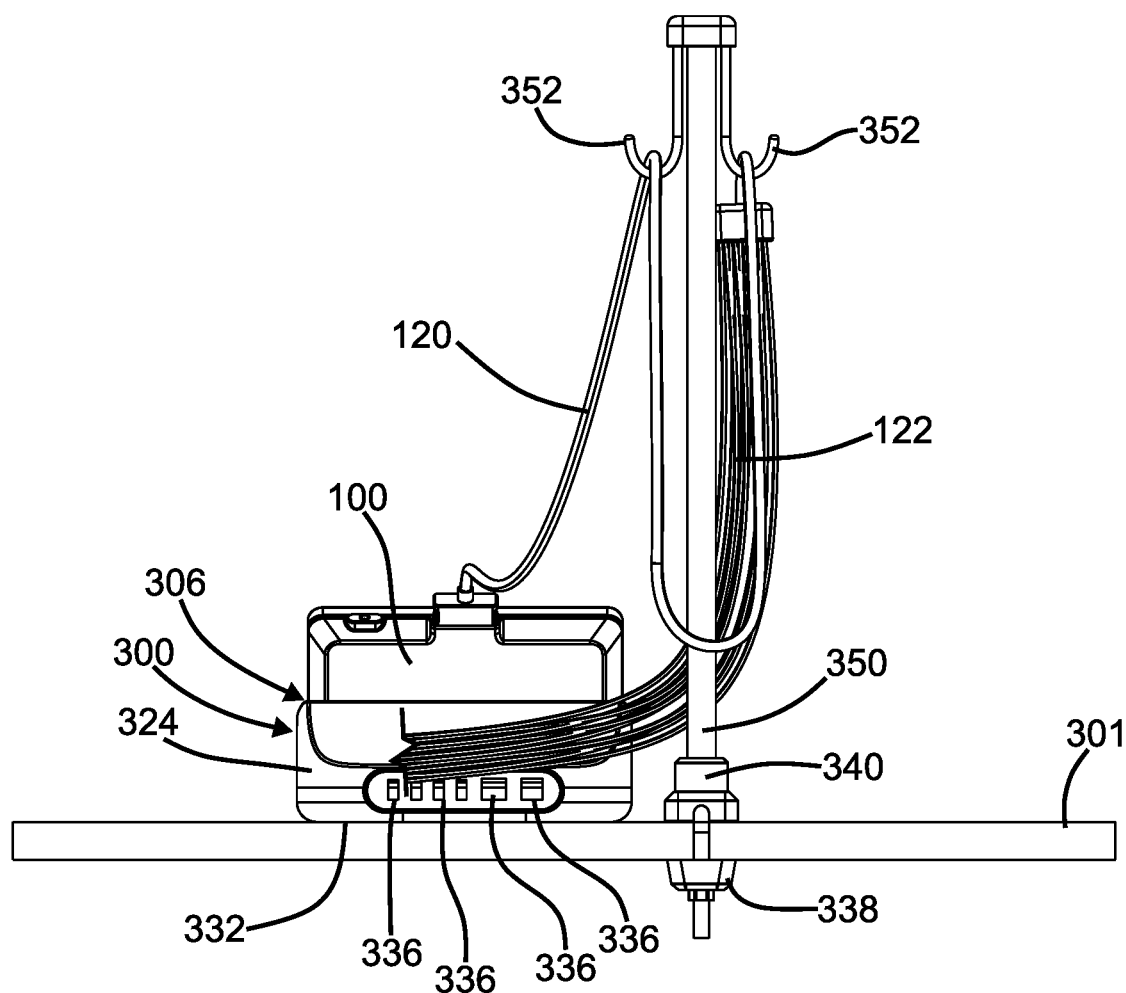
FIG. 28 is a rear view of the handheld device of FIG. 1 docked into the docking station of FIG. 22.
Figure 29:
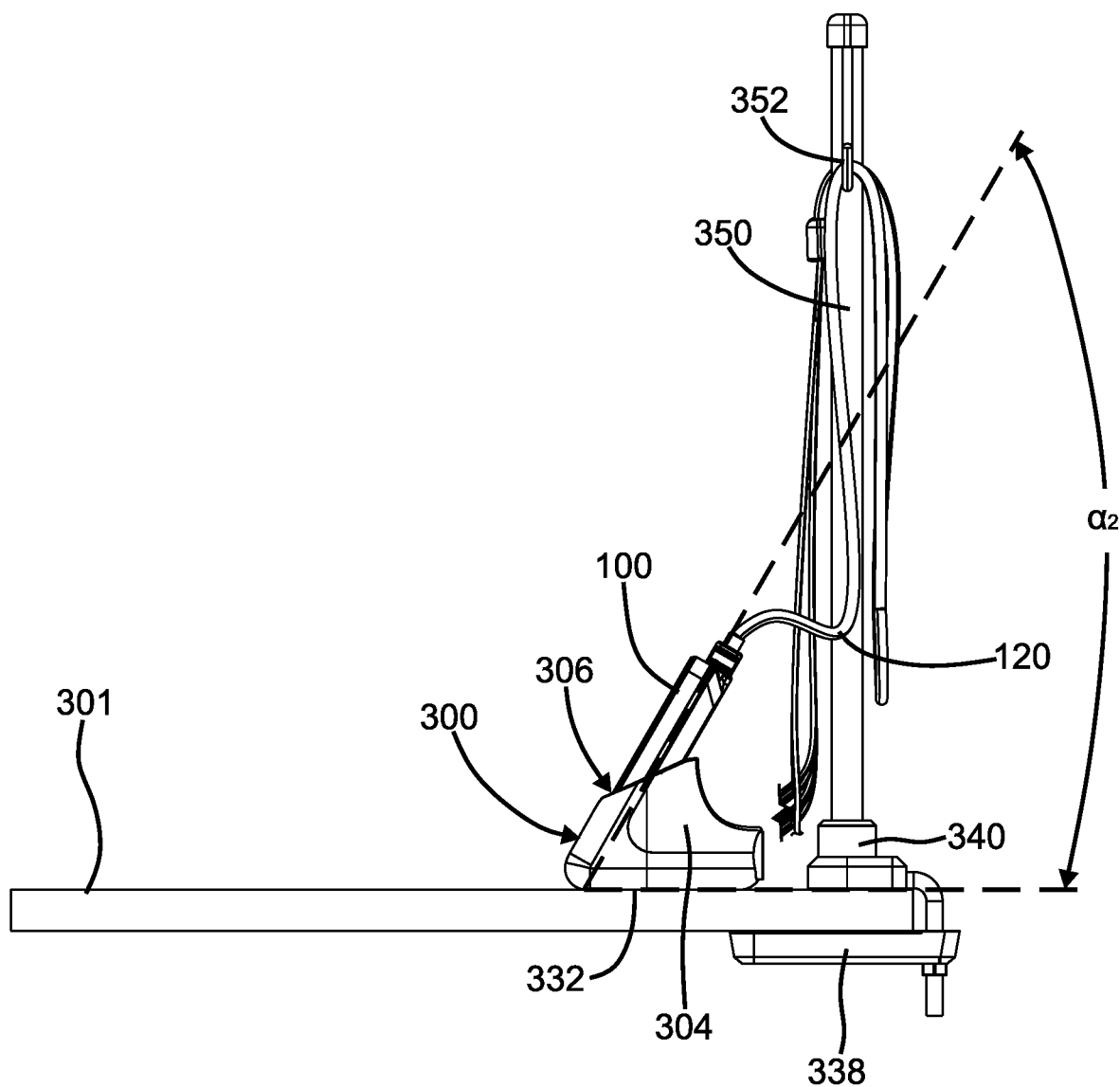
FIG. 29 is a right side view of the handheld device of FIG. 1 docked into the docking station of FIG. 22.
Figure 30:
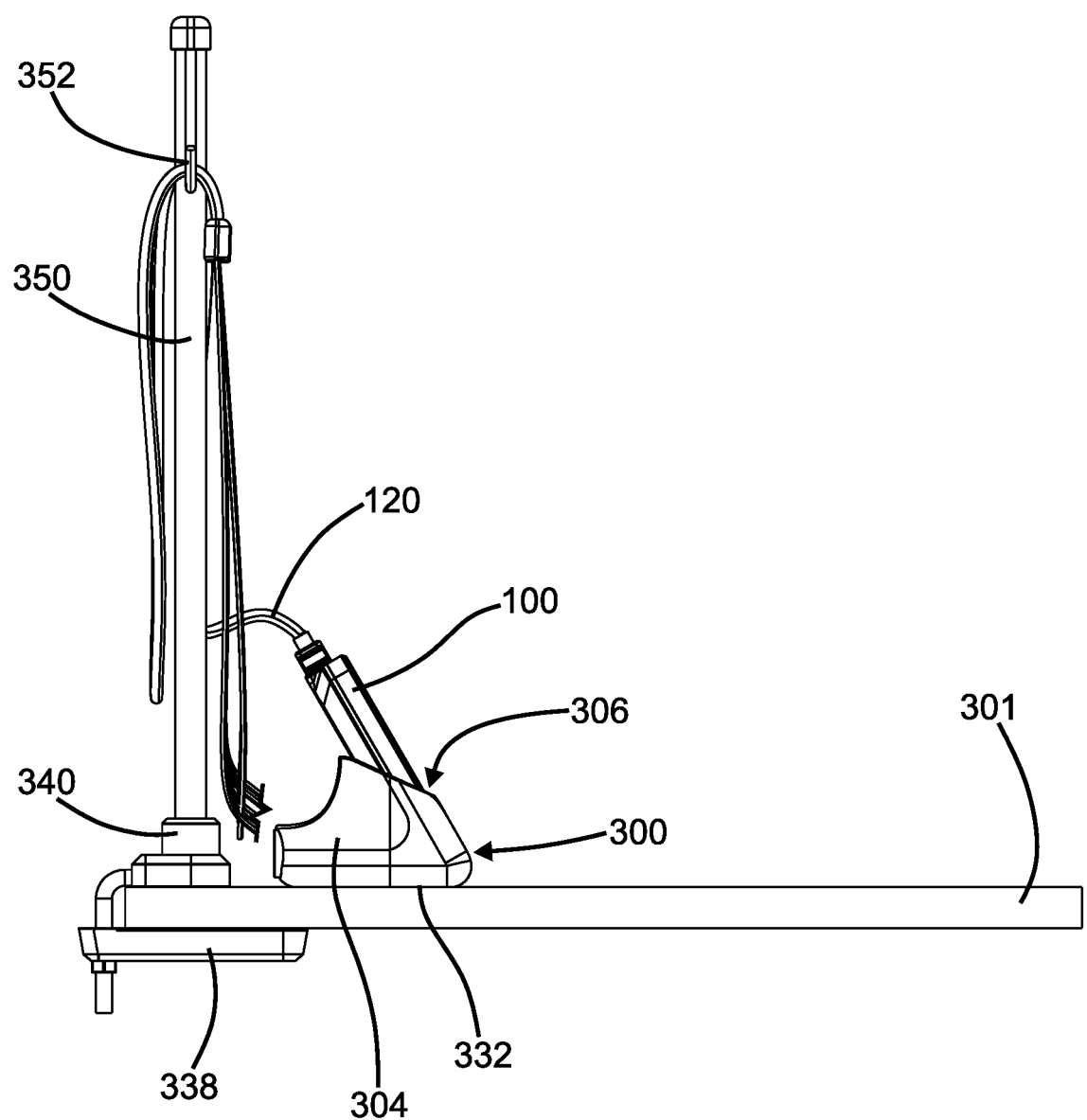
FIG. 30 is a left side view of the handheld device of FIG. 1 docked into the docking station of FIG. 22.
Figure 31:
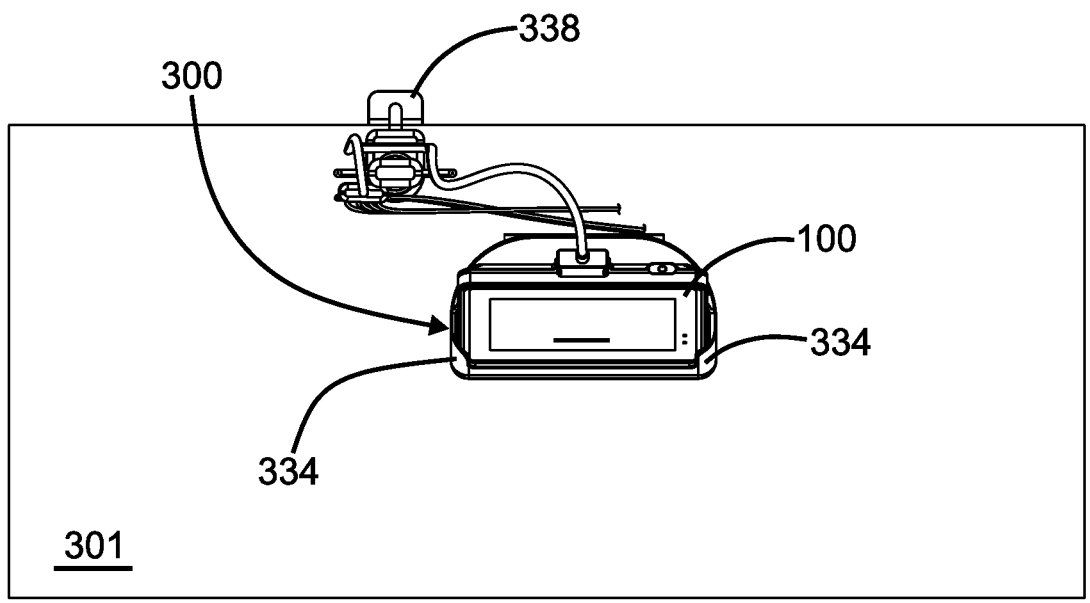
FIG. 31 is a top view of the handheld device of FIG. 1 docked into the docking station of FIG. 22.
Figure 32:
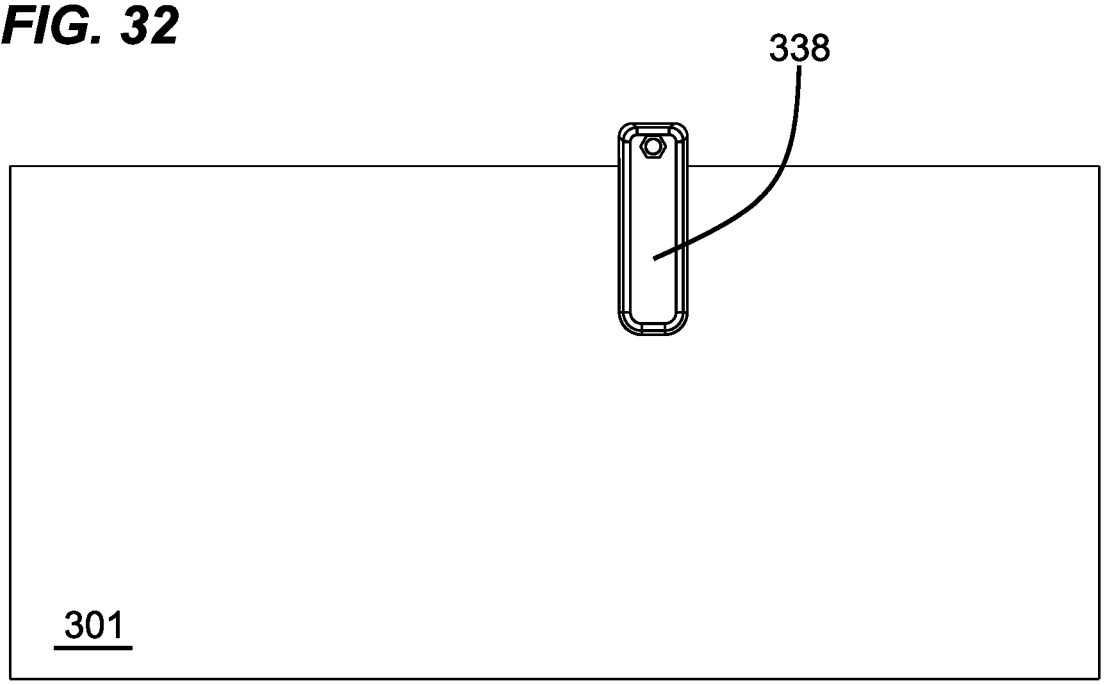
FIG. 32 is a bottom view of the handheld device of FIG. 1 docked into the docking station of FIG. 22.

As shown in FIG. 28, the docking station 300 includes input/output connectors 336 on a rear surface 324. The input/output connectors 336 can include one or more USB connectors, an RJ45 jack, an AC power connector, and additional types of connectors. The AC power connector can receive an electrical power cord to connect the docking station 300 to an external electrical power source such as a wall mounted electrical outlet.

In some examples, the docking station 300 transfers the data received from the handheld device 100 to another device such as through a wired connection via the input/output connectors 336. Alternatively, the docking station 300 can transfer the data received from the handheld device 100 to another device through a wireless network such as cellular, Wi-Fi, Bluetooth, and the like. In some examples, the docking station 300 can receive the data (e.g., the 12 lead diagnostic ECG signal) from the handheld device 100, and the docking station 300 can transmit the data for storage in an electronic medical record (EMR) of a patient.

As shown in FIGS. 25-32, a patient cable storage arm 350 can be separately attached to the tabletop surface 301 (i.e., without attaching to the dock housing 304 of the docking station 300). For example, a clamp 338 can be used to attach the patient cable storage arm 350 to the tabletop surface 301. The clamp 338 includes a ring or cup-like structure 340 that surrounds and thereby fixes the patient cable storage arm 350 to the tabletop surface 301. The clamp 338 can clamp around top and bottom surfaces of the tabletop surface 301.

The patient cable storage arm 350 can be used to manage the patient cable 120 that connects to the handheld device 100, and is substantially similar to the patient cable storage arm 250 described above with respect to the docking station 200. For example, the patient cable storage arm 350 can include one or more hooks 352 that can support the patient cable 120 and the leads 122. The patient cable storage arm 350 can be an optional accessory that can be attached and detached from the tabletop surface 301 as may be needed or desired.

Figure 33:
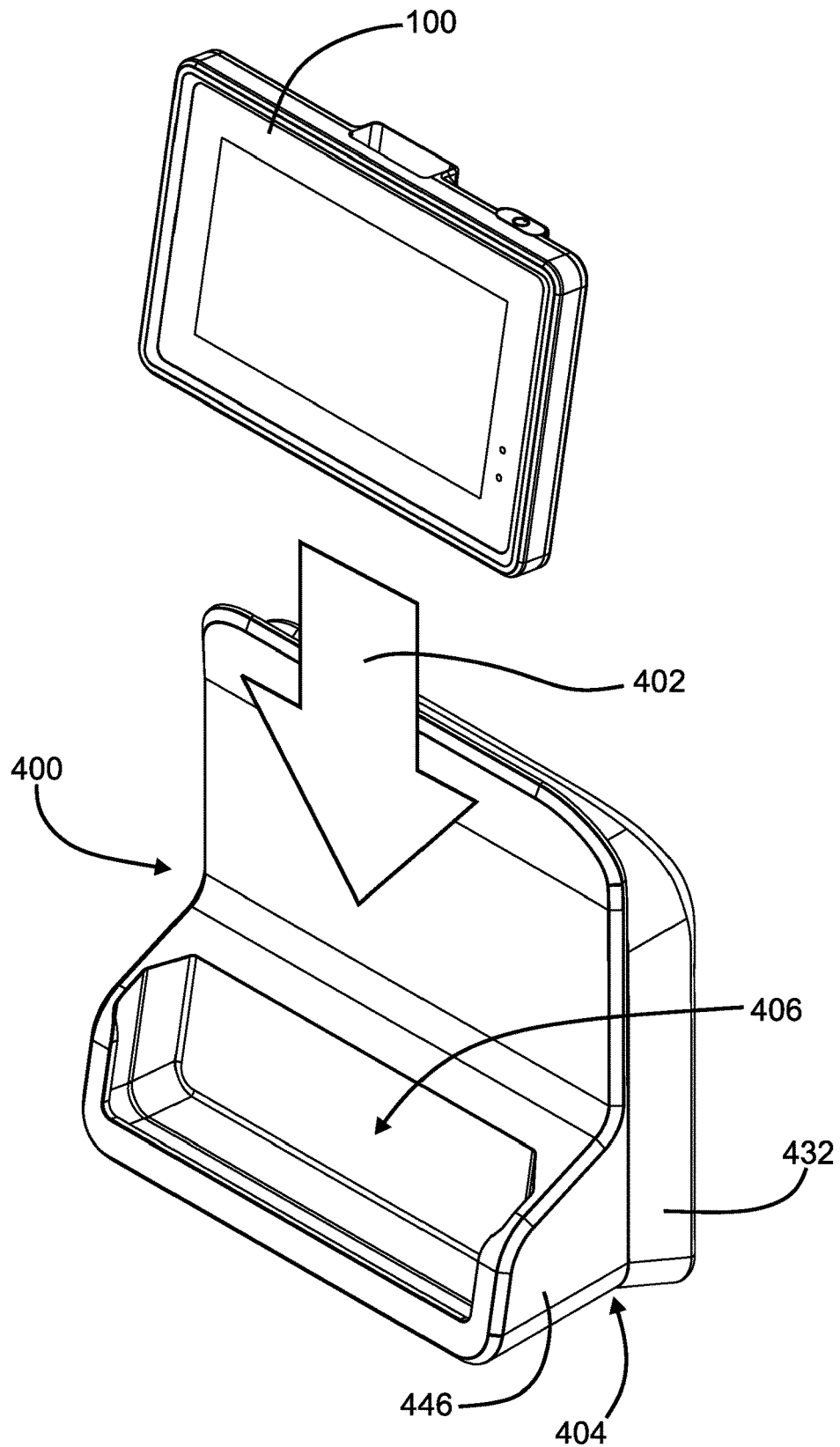
FIG. 33 is an isometric view showing a directional arrow for docking the handheld device of FIG. 1 into a docking station according to a third embodiment.

FIG. 33 is an isometric view showing a directional arrow 402 for docking the handheld device 100 into the docking station 400. In this embodiment, the docking station 400 is configured to support the handheld device 100 on a vertical wall surface, and does not include a printer. While the directional arrow 402 is pointed in a first direction for slotting the handheld device 100 into a pocket 406 of the docking station 400, the handheld device 100 can be pulled in an opposite second direction to remove the handheld device 100 from the pocket 406.

As shown in FIG. 33, the docking station 400 includes a dock housing 404 that includes a base 432 and a front housing 446 that attaches to the base 432. The front housing 446 defines the pocket 406 which is configured to receive and support the handheld device 100 in an upright position (see also FIGS. 36-43). As will be described in more detail, the docking station 400 is configured to recharge the battery of the handheld device 100 when the handheld device 100 is placed inside the pocket 406 for storage when not being used.

Figure 34:
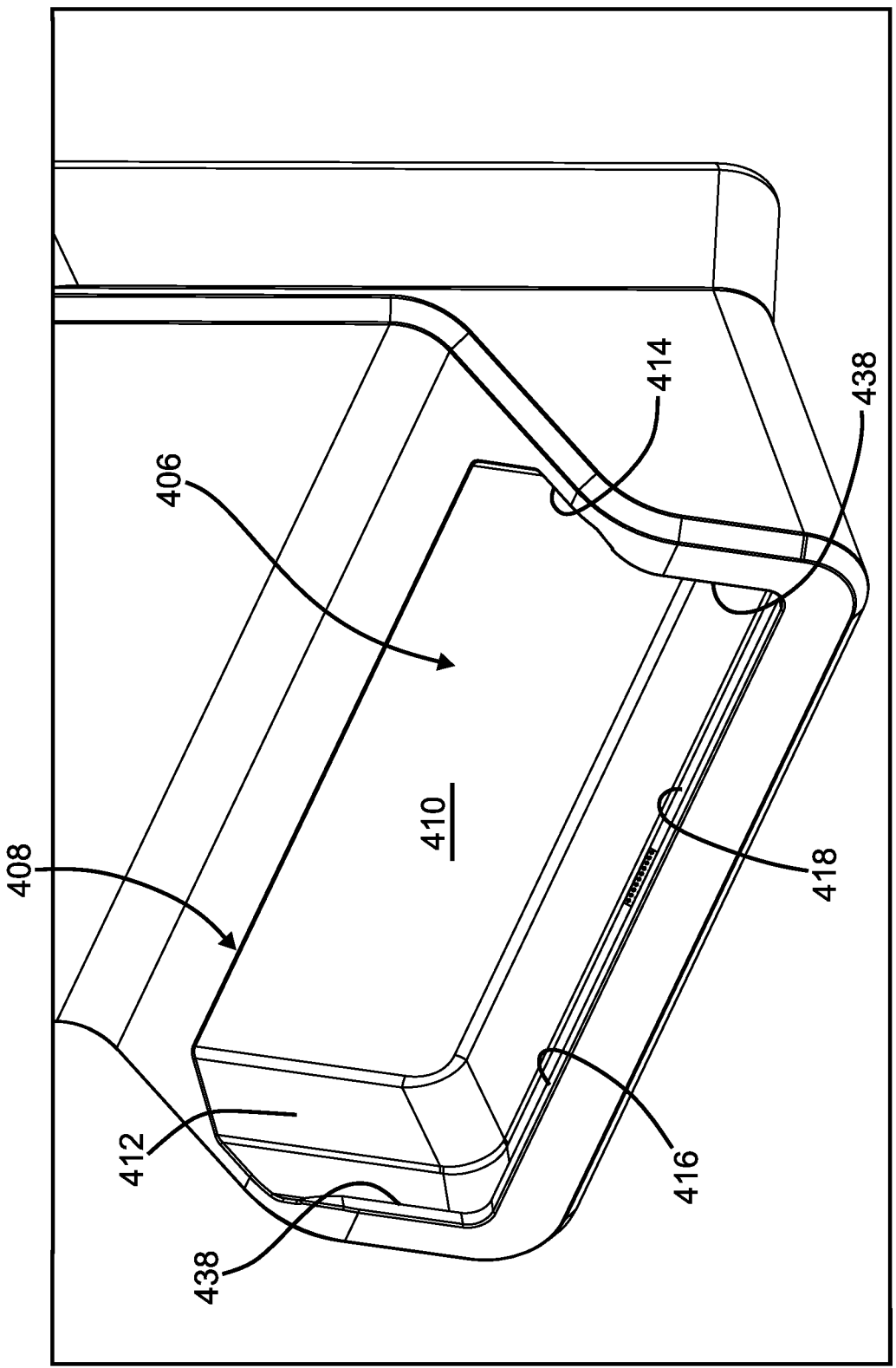
FIG. 34 is a detailed view of a pocket of the docking station of FIG. 33.
Figure 35:
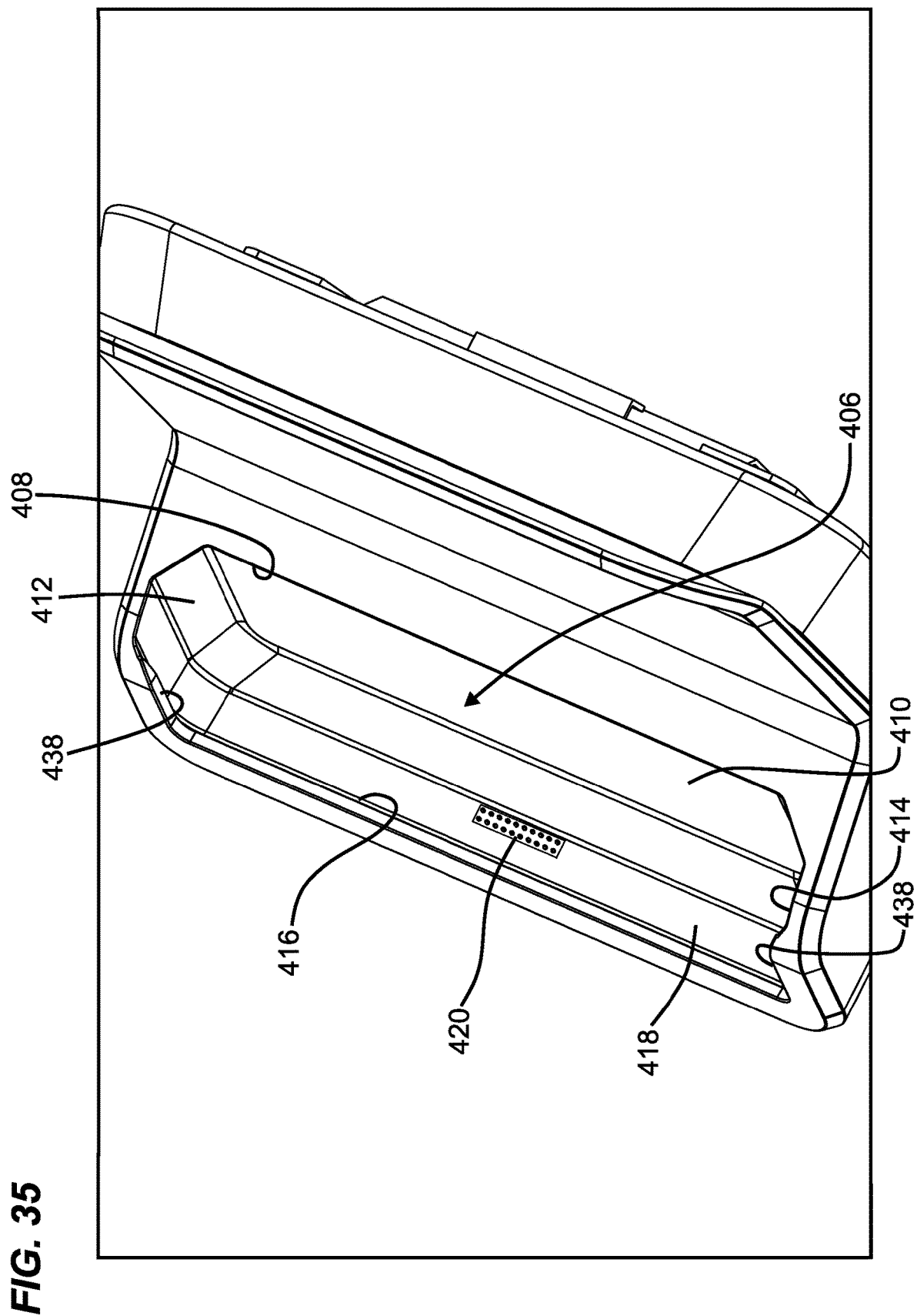
FIG. 35 is another detailed view of the pocket of the docking station of FIG. 33.
Figure 36:
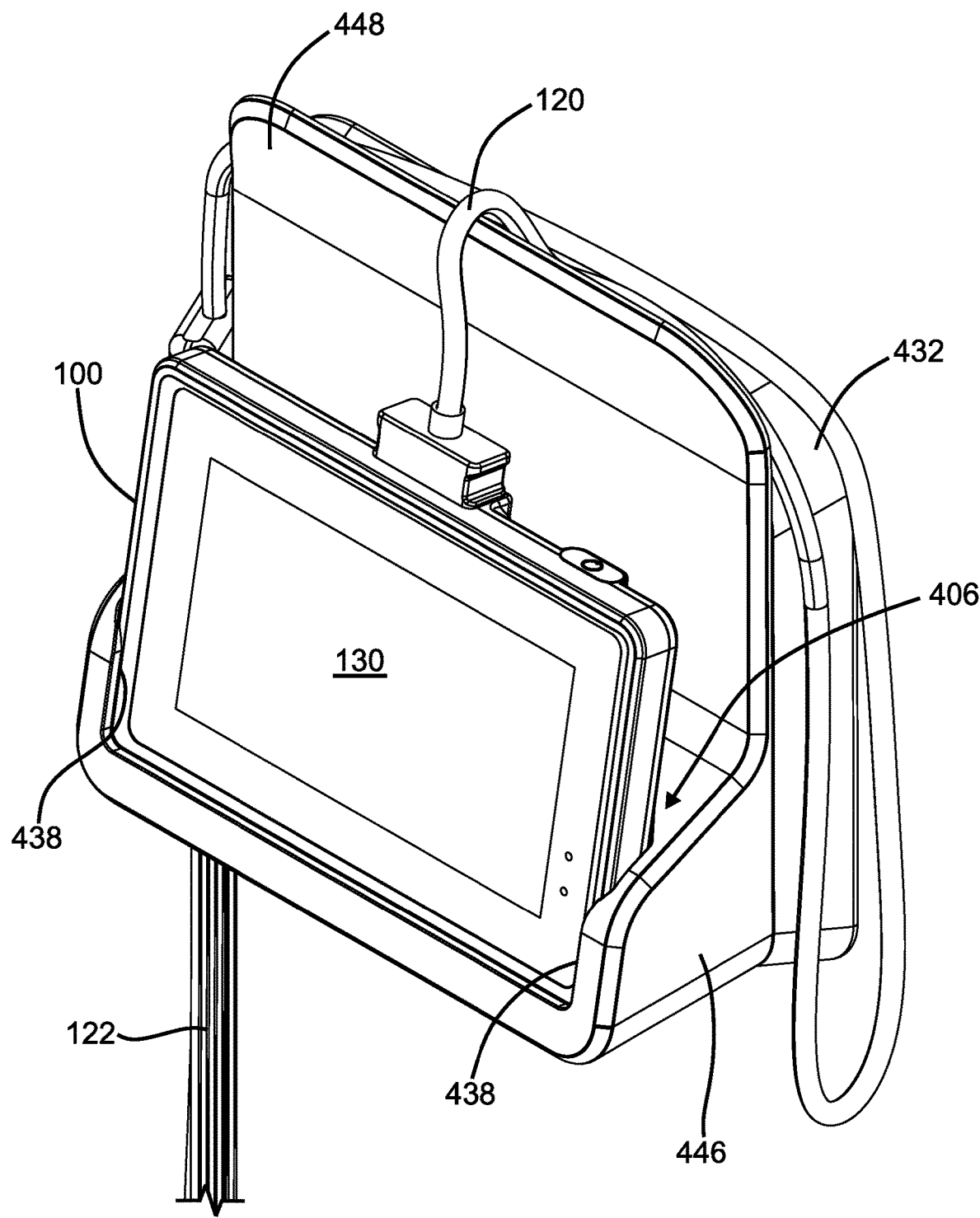
FIG. 36 is a front isometric view of the handheld device of FIG. 1 docked into the docking station of FIG. 33.

FIGS. 34 and 35 are detailed isometric views of the pocket 406. The pocket 406 is similar to the pockets 206, 306 described above with respect to the docking stations 200, 300. The pocket 406 includes an open end 408, a rear interior surface 410, first and second lateral interior surfaces 412, 414, a front interior surface 416, and a bottom interior surface 418.

The open end 408 of the pocket 406 allows the handheld device 100 to be slotted into and out of the pocket 406, while the rear interior surface 410, the first and second lateral interior surfaces 412, 414, the front interior surface 416, and the bottom interior surface 418 retain the handheld device 100 inside the pocket 406 of the docking station 400.

For example, when the handheld device 100 is held inside the pocket 406 of the docking station 400, the second longitudinal side 106 of the handheld device 100 at least partially abuts the bottom interior surface 418 of the pocket 406, the rear side 114 of the handheld device 100 at least partially abuts the rear interior surface 410 of the pocket 406, the front side 112 of the handheld device 100 at least partially abuts the front interior surface 416 of the pocket 406, and the first and second lateral sides 108, 110 of the handheld device 100 at least partially abut the first and second lateral interior surfaces 412, 414 of the pocket 406.

Advantageously, the handheld device 100 is not tethered to the docking station 400. Thus, the handheld device 100 is portable relative to the docking station 400. For example, a user can remove the handheld device 100 from the pocket 406, and can carry the handheld device 100 into another room or area without also having to move the docking station 400.

As shown in FIG. 35, the bottom interior surface 418 of the pocket 406 includes electrical contacts 420 that are configured to mate with the electrical contacts 136 on the handheld device 100. When the handheld device 100 is held inside the pocket 406, the electrical contacts 136 receive a voltage input from the electrical contacts 420. The voltage input is used by the charging circuit 1024 to recharge the battery 1022 of the handheld device 100.

In alternative examples, the pocket 406 can be configured to provide wireless charging such as through inductive charging or magnetic resonance charging. In some examples, the rear interior surface 410 is equipped with an inductive or magnetic resonance charger.

In some examples, the connection between the electrical contacts 136 on the handheld device 100 and the electrical contacts 420 on the docking station 400 enable data communication between the docking station 400 and the handheld device 100. For example, the docking station 400 can receive data from the handheld device 100, and the handheld device 100 can receive data from the docking station 400. In some examples, data communication between the handheld device 100 and the docking station 400 is accomplished through a wireless connection such as through a Wi-Fi or Bluetooth wireless connection, or similar type of wireless connection.

FIGS. 36-43 are front isometric, rear isometric, front, rear, right side, left side, top, and bottom views showing the handheld device 100 docked into the docking station 400. The base 432 is configured to support the front housing 446 on a support surface such as a vertical wall surface. For example, a mounting bracket 440 can be secured to the base 432, and the mounting bracket 440 can be used to secure the base 432 to a corresponding bracket 442 that can be fixed to a vertical wall surface using one or more fasteners 444 such as screws.

The pocket 406 is configured to receive and support the handheld device 100 in an upright position. The pocket 406 is orientated at an angle $\alpha_3$ relative to the base 432 such that the pocket 406 supports the handheld device 100 at an angle relative to the vertical wall surface. The angle $\alpha_3$ of the pocket 406 relative to the base 432 is an acute angle (i.e., less than 90 degrees).

The front interior surface 416 provides a lip 438 that is configured to partially surround the front side 112 of the handheld device 100 to retain the handheld device 100 inside the pocket 406 between the rear interior surface 410, the first and second lateral interior surfaces 412, 414, the front interior surface 416, and the bottom interior surface 418. The front interior surface 416 is partially open to allow visibility of the touchscreen 130 on the front side 112 when the handheld device 100 is retained inside the pocket 406.

Figure 37:
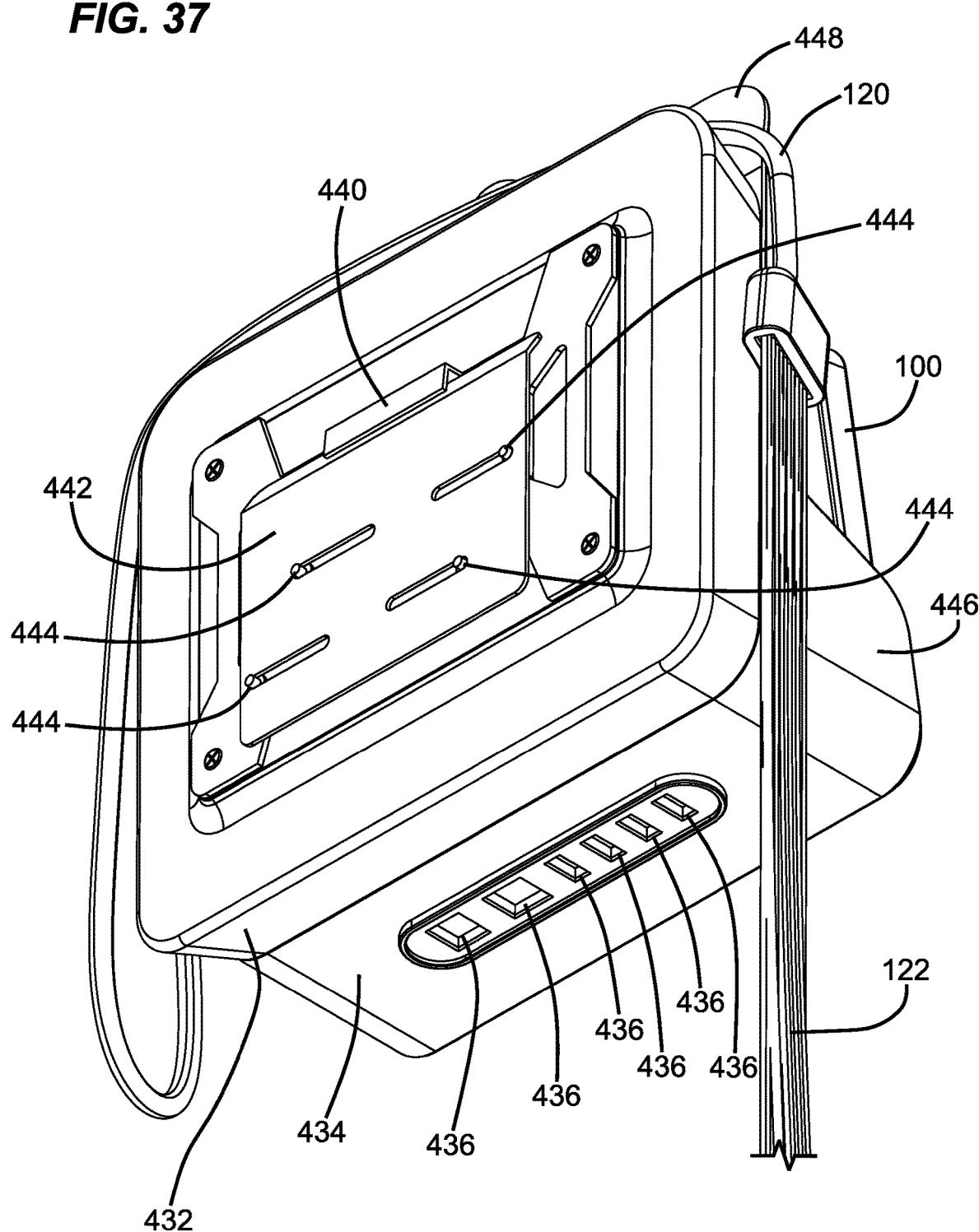
FIG. 37 is a rear isometric view of the handheld device of FIG. 1 docked into the docking station of FIG. 33.
Figure 38:
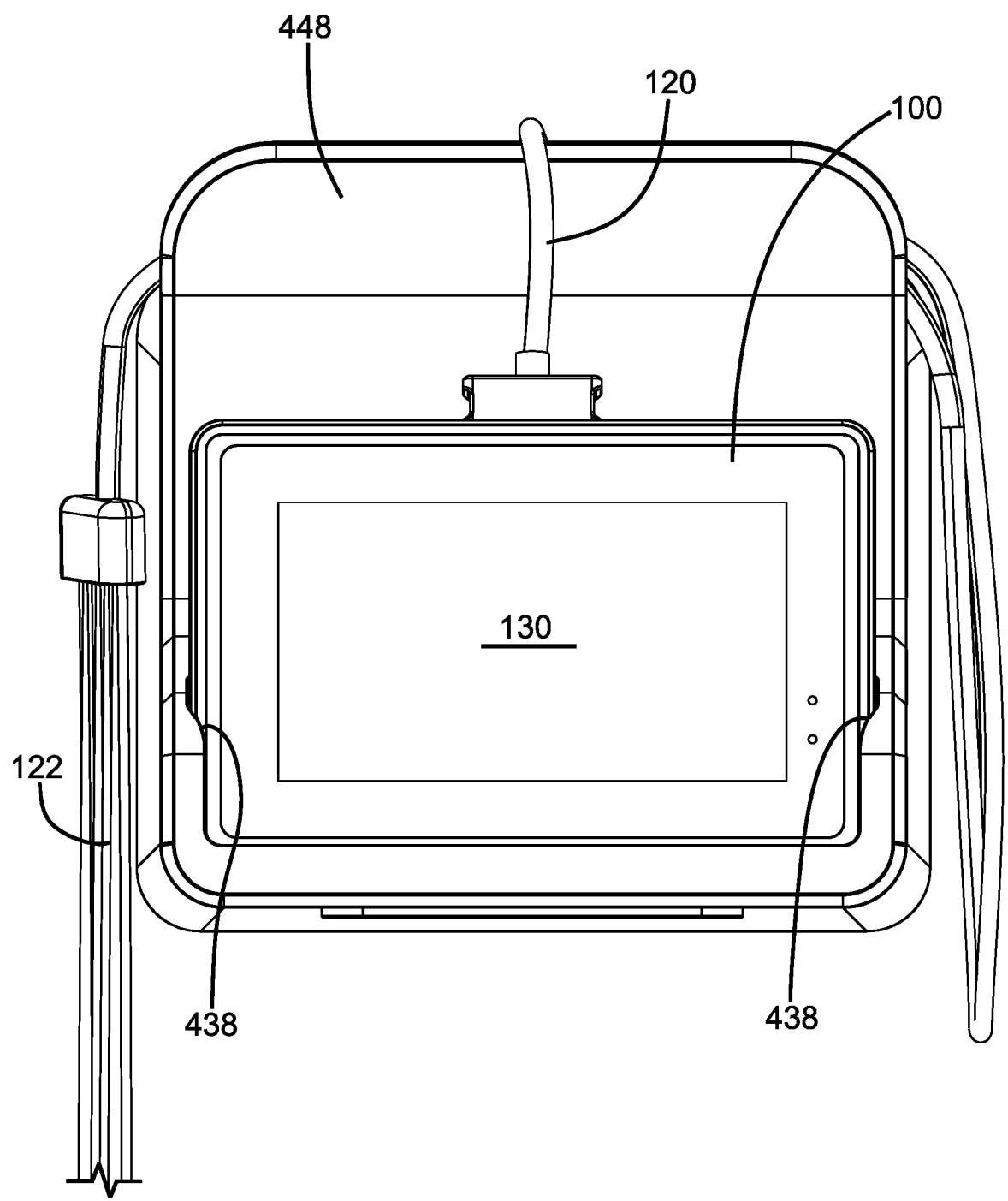
FIG. 38 is a front view of the handheld device of FIG. 1 docked into the docking station of FIG. 33.
Figure 39:
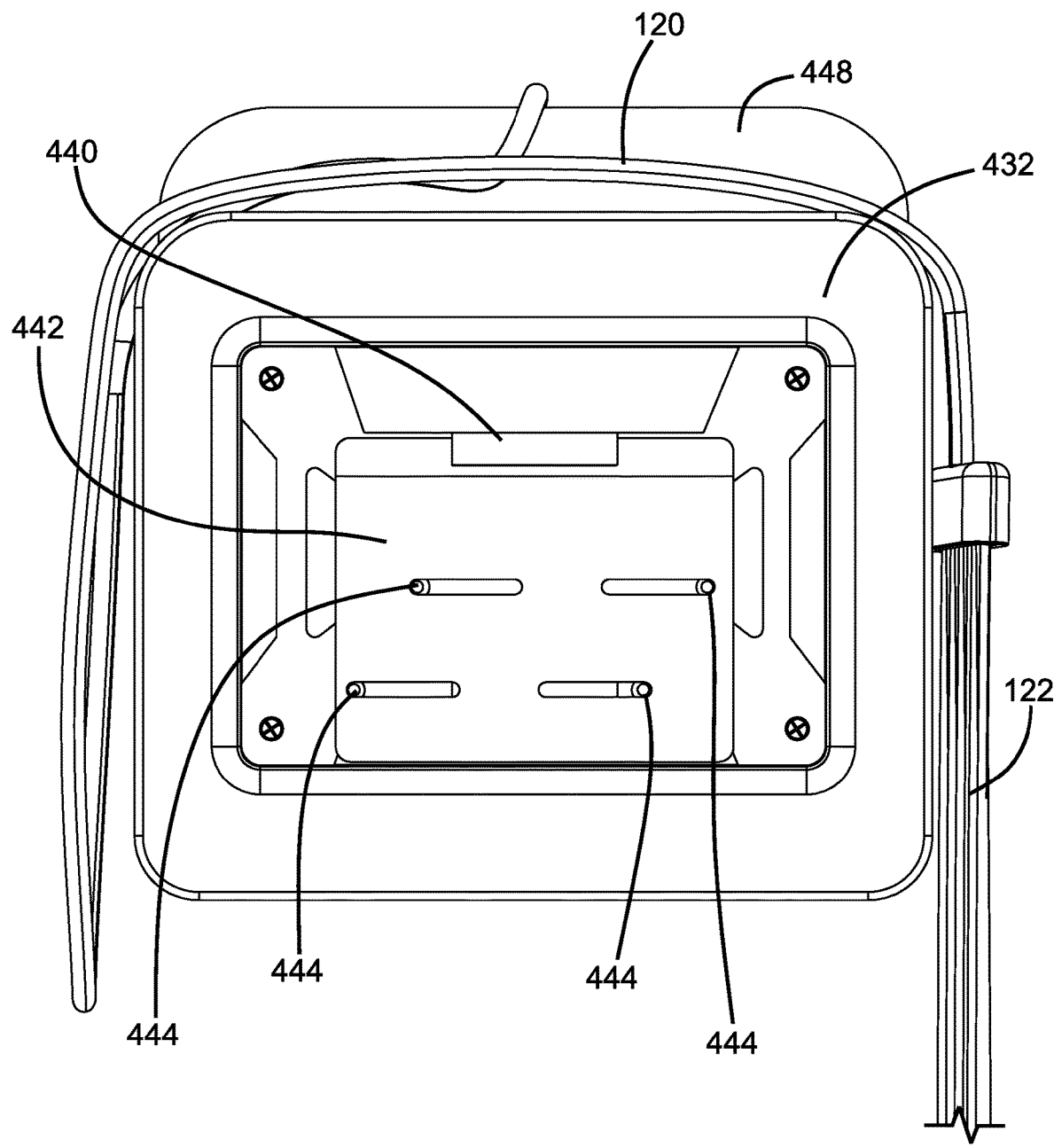
FIG. 39 is a rear view of the handheld device of FIG. 1 docked into the docking station of FIG. 33.
Figure 40:
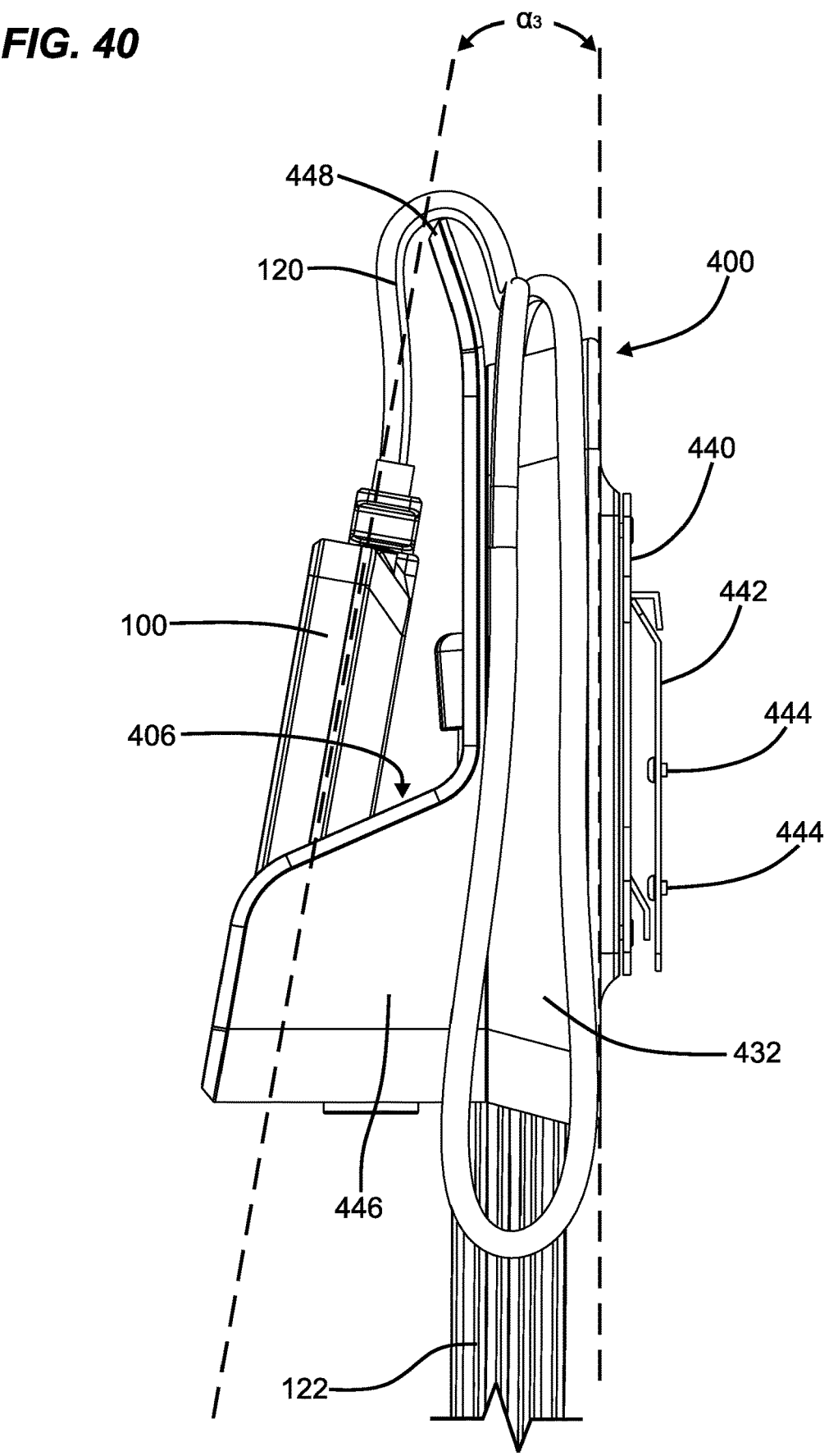
FIG. 40 is a right side view of the handheld device of FIG. 1 docked into the docking station of FIG. 33.
Figure 41:
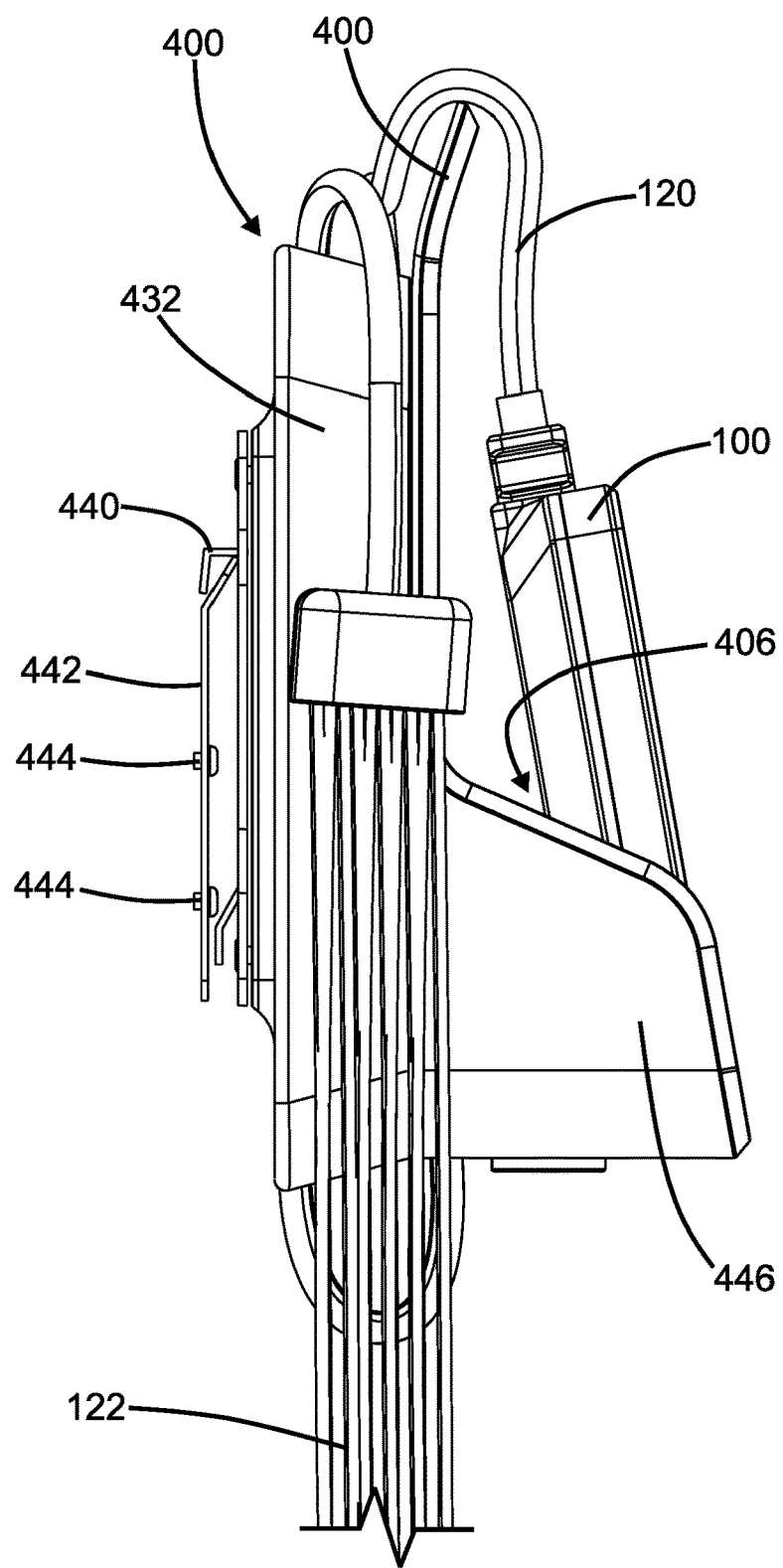
FIG. 41 is a left side view of the handheld device of FIG. 1 docked into the docking station of FIG. 33.
Figure 42:
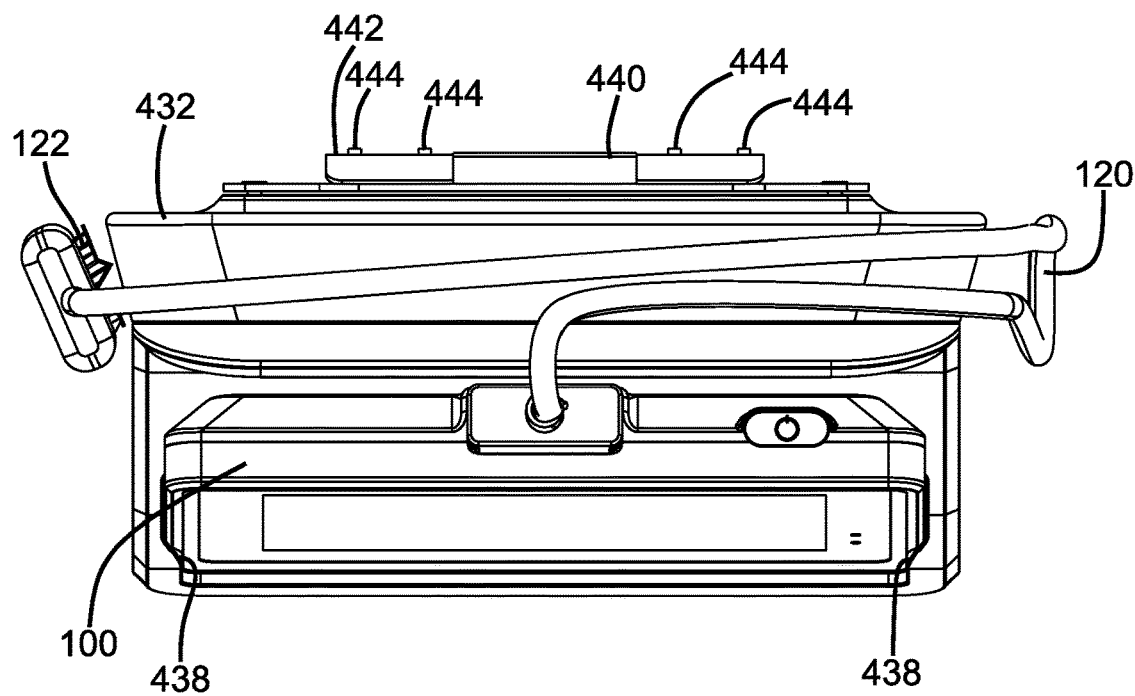
FIG. 42 is a top view of the handheld device of FIG. 1 docked into the docking station of FIG. 33.
Figure 43:
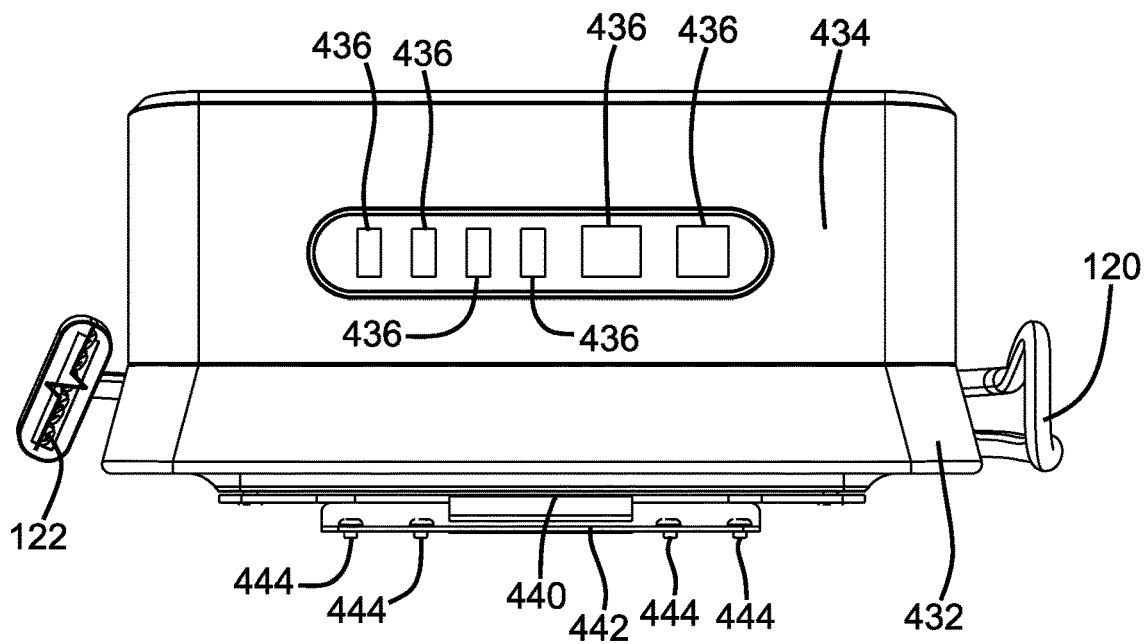
FIG. 43 is a bottom view of the handheld device of FIG. 1 docked into the docking station of FIG. 33.

As shown in FIGS. 37 and 43, the docking station 400 includes input/output connectors 436 on a bottom surface 434. The input/output connectors 436 can include one or more USB connectors, an RJ45 jack, an AC power connector, and additional types of connectors. The AC power connector can receive an electrical power cord to connect the docking station 400 to an external electrical power source such as a wall mounted electrical outlet.

In some examples, the docking station 400 transfers the data received from the handheld device 100 to another device such as through a wired connection via the input/output connectors 436. Alternatively, the docking station 400 can transfer the data received from the handheld device 100 to another device through a wireless network such as cellular, Wi-Fi, Bluetooth, and the like. In some examples, the docking station 400 can receive the data (e.g., the 12 lead diagnostic ECG signal) from the handheld device 100, and the docking station 400 can transmit the data for storage in an electronic medical record (EMR) of a patient.

The base 432 and front housing 446 provide a storage space for storing and managing the patient cable 120 and leads 122. The front housing 446 includes an extension 448, and the storage space is defined between a vertical wall, the base 432, and the extension 448 for storing and managing the patient cable 120 and leads 122. For example, the patient cable 120 can be positioned to rest on top of the base 432 and between the extension 448 and the vertical wall for storage. In some examples, the extension 448 is curved in a direction away from the base 432, and the base 432 is inclined at an angle relative to the front housing 446 to define a channel within the storage space for storing and managing the patient cable 120.

Figure 44:
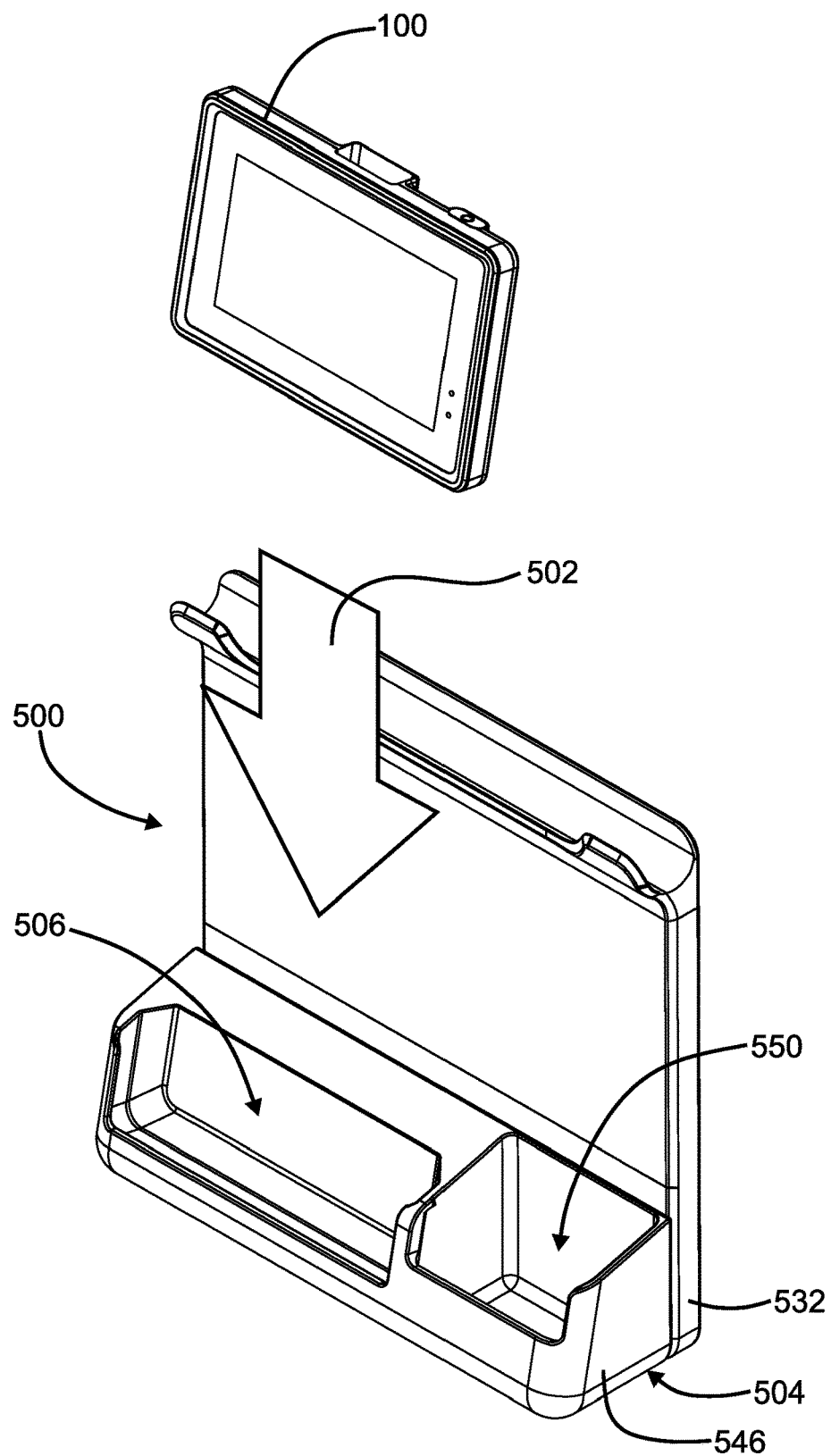
FIG. 44 is an isometric view showing a directional arrow for docking the handheld device of FIG. 1 into a docking station according to a fourth embodiment.

FIG. 44 is an isometric view showing a directional arrow 502 for docking the handheld device 100 into the docking station 500. In this embodiment, the docking station 500 is configured to support the handheld device 100 on a vertical wall surface, and does not include a printer. The docking station 500 is similar to the docking station 400 described above with respect to FIGS. 33-43, and may share similar components.

The directional arrow 502 is pointed in a first direction for slotting the handheld device 100 into a pocket 506 of the docking station 500. The handheld device 100 can be pulled in an opposite second direction to remove the handheld device 100 from the pocket 506.

As shown in FIG. 44, the docking station 500 includes a dock housing 504 that includes a front housing 546 attached to a base 532. The pocket 506 is configured to receive and support the handheld device 100 in an upright position (see also FIGS. 36-43). As will be described in more detail, the docking station 500 is configured to recharge the battery of the handheld device 100 when the handheld device 100 is held inside the pocket 506.

Figure 45:
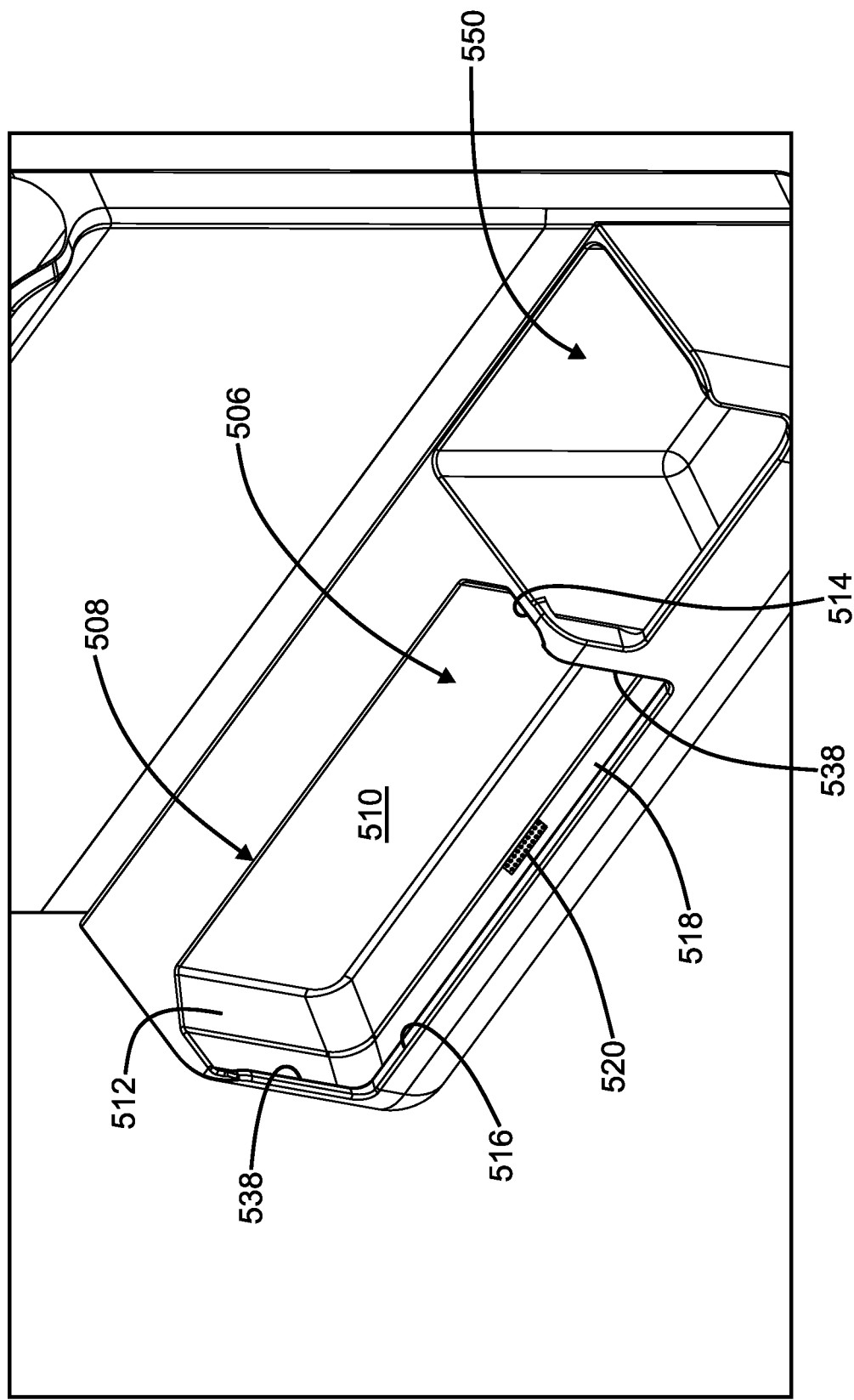
FIG. 45 is a detailed view of a pocket of the docking station of FIG. 44.
Figure 46:
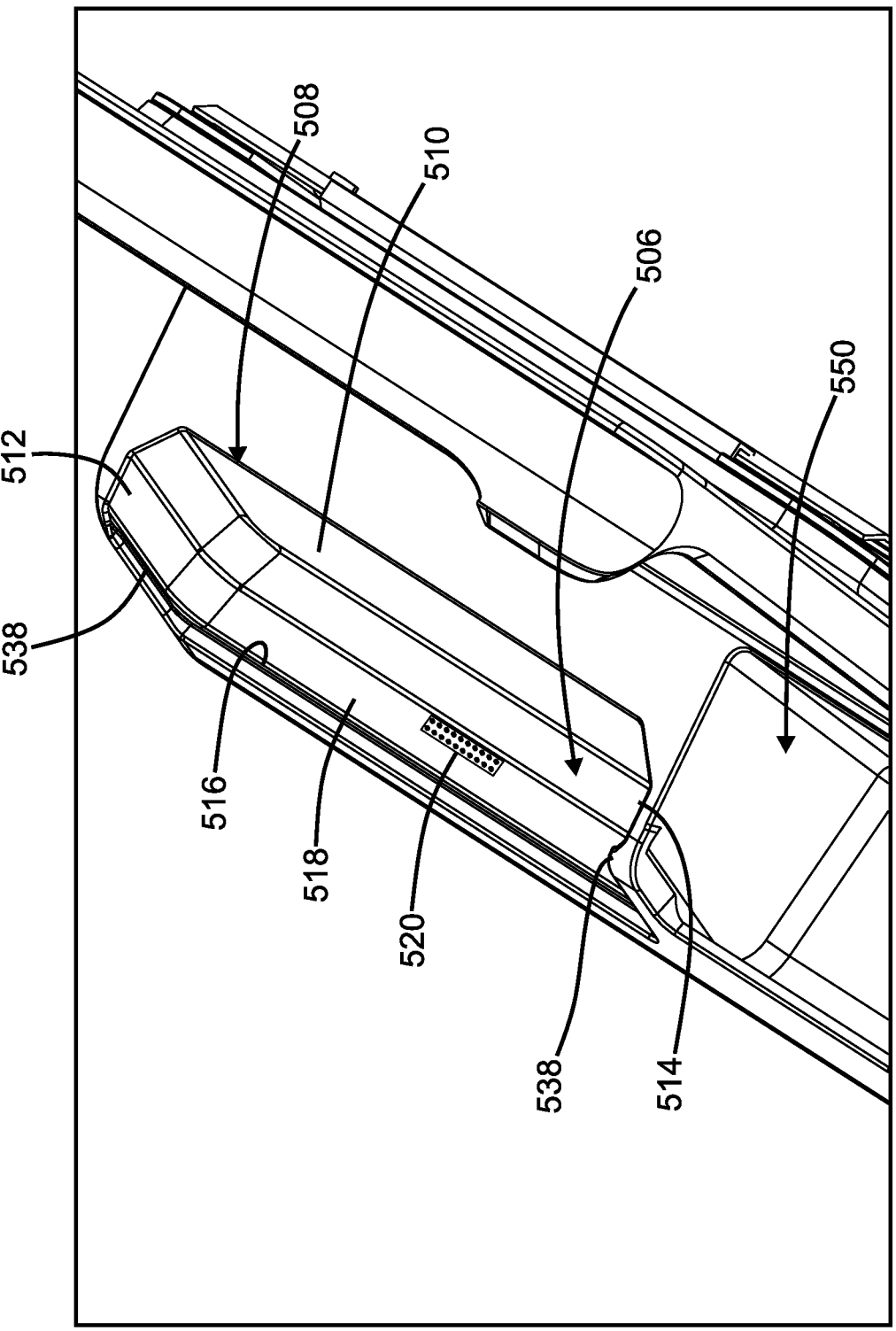
FIG. 46 is another detailed view of the pocket of the docking station of FIG. 44.
Figure 47:
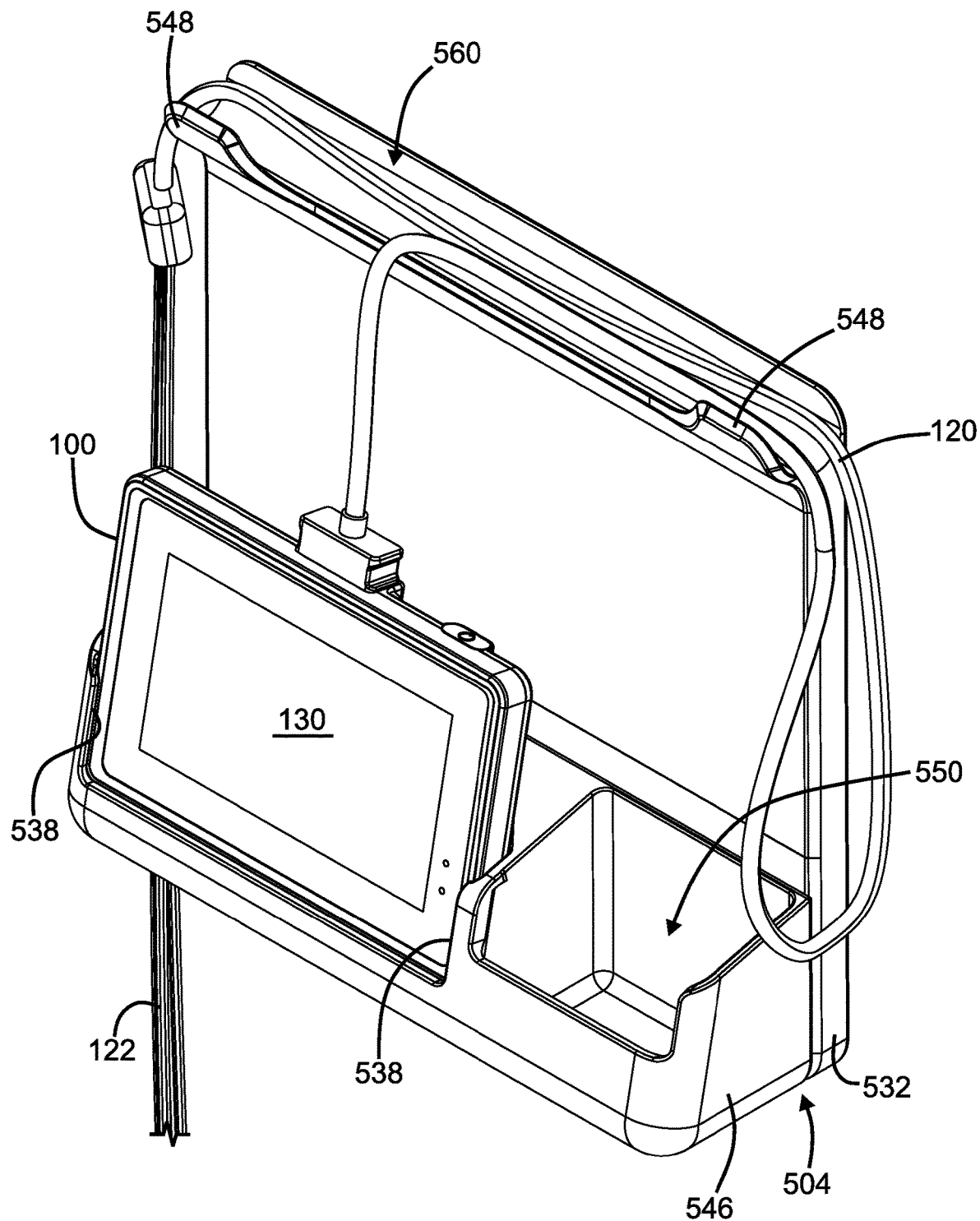
FIG. 47 is a front isometric view of the handheld device of FIG. 1 docked into the docking station of FIG. 44.

FIGS. 45 and 46 are detailed isometric views of the pocket 506. The pocket 506 is similar to the pockets 206, 306, 406 described above with respect to the docking stations 200, 300, 400. The pocket 506 includes an open end 508, a rear interior surface 510, first and second lateral interior surfaces 512, 514, a front interior surface 516, and a bottom interior surface 518.

The open end 508 of the pocket 506 allows the handheld device 100 to be slotted into and out of the pocket 506, while the rear interior surface 510, the first and second lateral interior surfaces 512, 514, the front interior surface 516, and the bottom interior surface 518 retain the handheld device 100 inside the pocket 506 of the docking station 500.

For example, when the handheld device 100 is held inside the pocket 506 of the docking station 500, the second longitudinal side 106 of the handheld device 100 at least partially abuts the bottom interior surface 518 of the pocket 506, the rear side 114 of the handheld device 100 at least partially abuts the rear interior surface 510 of the pocket 506, the front side 112 of the handheld device 100 at least partially abuts the front interior surface 516 of the pocket 506, and the first and second lateral sides 108, 110 of the handheld device 100 at least partially abut the first and second lateral interior surfaces 512, 514 of the pocket 506.

Advantageously, the handheld device 100 is not tethered to the docking station 500. Thus, the handheld device 100 is portable relative to the docking station 500. For example, a user can remove the handheld device 100 from the pocket 506, and can carry the handheld device 100 into another room or area without also having to move the docking station 500.

The bottom interior surface 518 of the pocket 506 includes electrical contacts 520 that are configured to mate with the electrical contacts 136 on the handheld device 100. When the handheld device 100 is held inside the pocket 506, the electrical contacts 136 receive a voltage input from the electrical contacts 520. The voltage input is used by the charging circuit 1024 (see FIG. 55) to recharge the battery 1022 of the handheld device 100.

In alternative examples, the pocket 506 can be configured to provide wireless charging such as through inductive charging or magnetic resonance charging. In some examples, the rear interior surface 510 is equipped with an inductive or magnetic resonance charger.

In some examples, the connection between the electrical contacts 136 on the handheld device 100 and the electrical contacts 520 on the docking station 500 enable data communication between the docking station 500 and the handheld device 100. For example, the docking station 500 can receive data from the handheld device 100, and the handheld device 100 can receive data from the docking station 500. In some examples, data communication between the handheld device 100 and the docking station 500 is accomplished through a wireless connection such as through a Wi-Fi or Bluetooth wireless connection, or similar type of wireless connections.

FIGS. 47-54 are front isometric, rear isometric, front, rear, right side, left side, top, and bottom views showing the handheld device 100 docked into the docking station 500. The base 532 is configured to support the front housing 546 on a support surface such as a vertical wall surface. For example, a mounting bracket 540 can be secured to the base 532, and the mounting bracket 540 can be used to secure the base 532 to a corresponding bracket 542 that can be fixed to a vertical wall surface using one or more fasteners 544 such as screws.

The pocket 506 is configured to receive and support the handheld device 100 in an upright position. The pocket 506 is orientated at an angle $\alpha_4$ relative to the base 532 such that the pocket 506 supports the handheld device 100 at an angle relative to the vertical wall surface. The angle $\alpha_4$ of the pocket 506 relative to the base 532 is an acute angle (i.e., less than 90 degrees).

The front interior surface 516 provides a lip 538 that is configured to partially surround the front side 112 of the handheld device 100 to retain the handheld device 100 inside the pocket 506 between the rear interior surface 510, the first and second lateral interior surfaces 512, 514, the front interior surface 516, and the bottom interior surface 518. The front interior surface 516 is partially open to allow visibility of the touchscreen 130 on the front side 112 when the handheld device 100 is retained inside the pocket 506.

Figure 48:
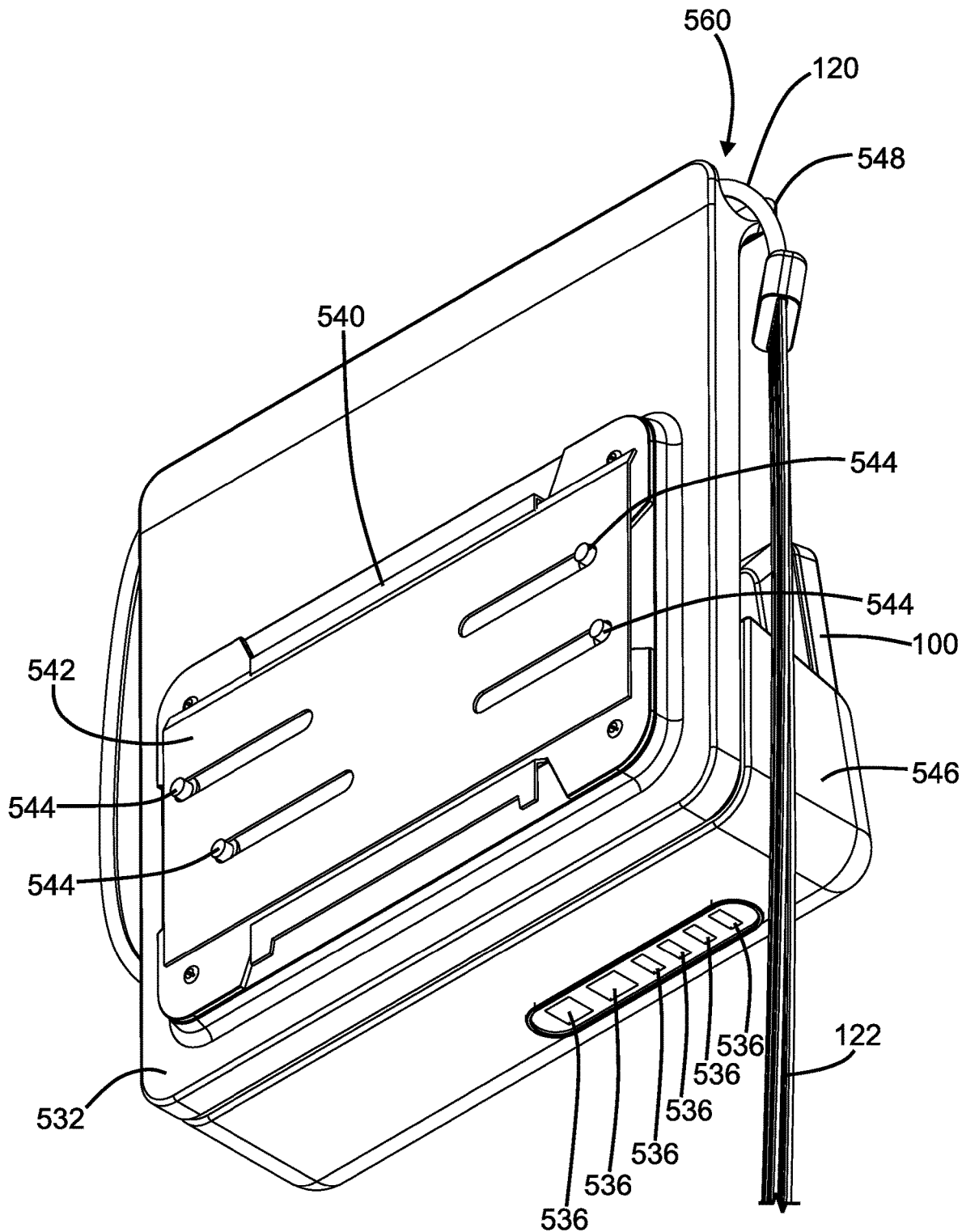
FIG. 48 is a rear isometric view of the handheld device of FIG. 1 docked into the docking station of FIG. 44.
Figure 49:
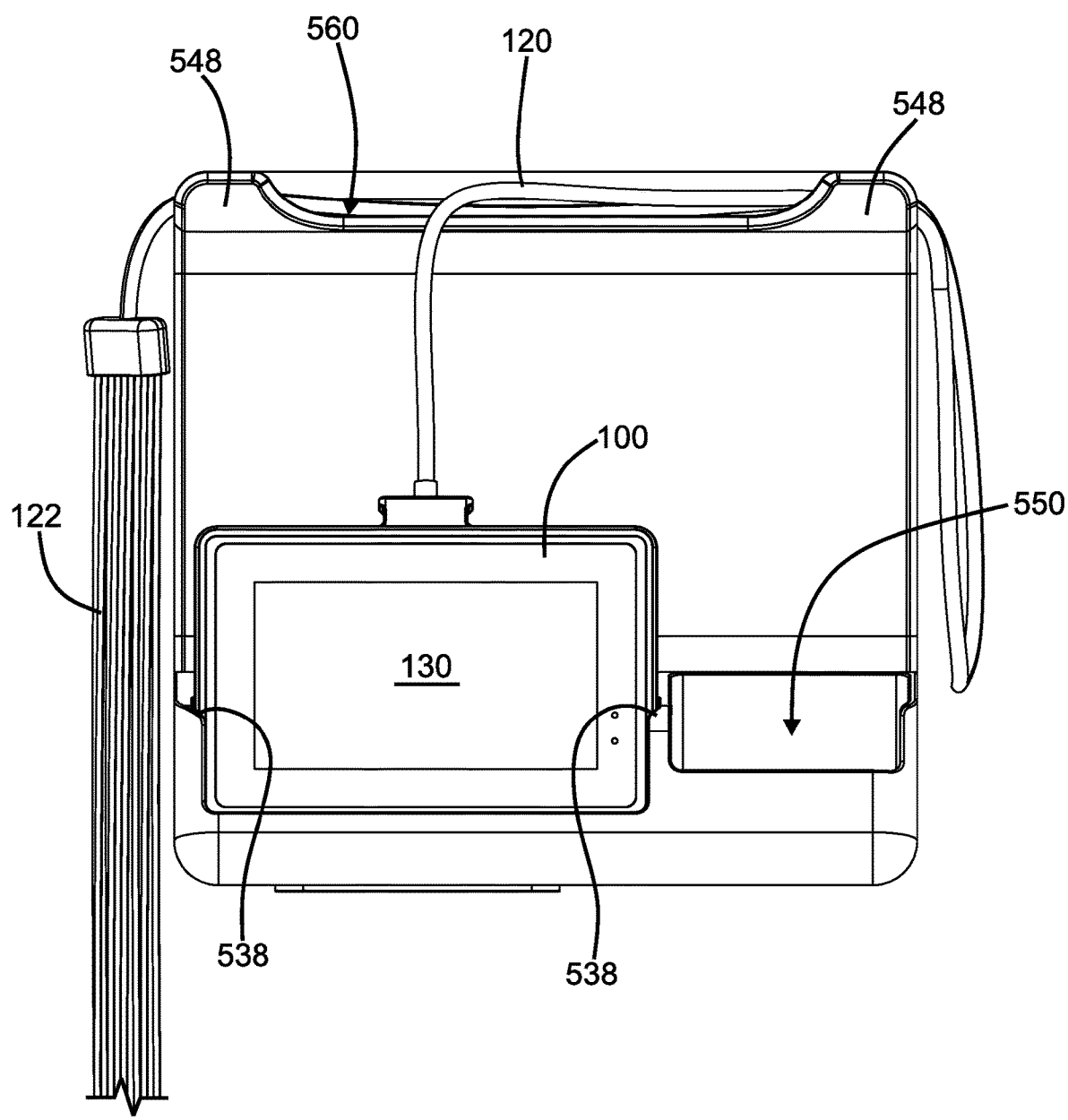
FIG. 49 is a front view of the handheld device of FIG. 1 docked into the docking station of FIG. 44.
Figure 50:
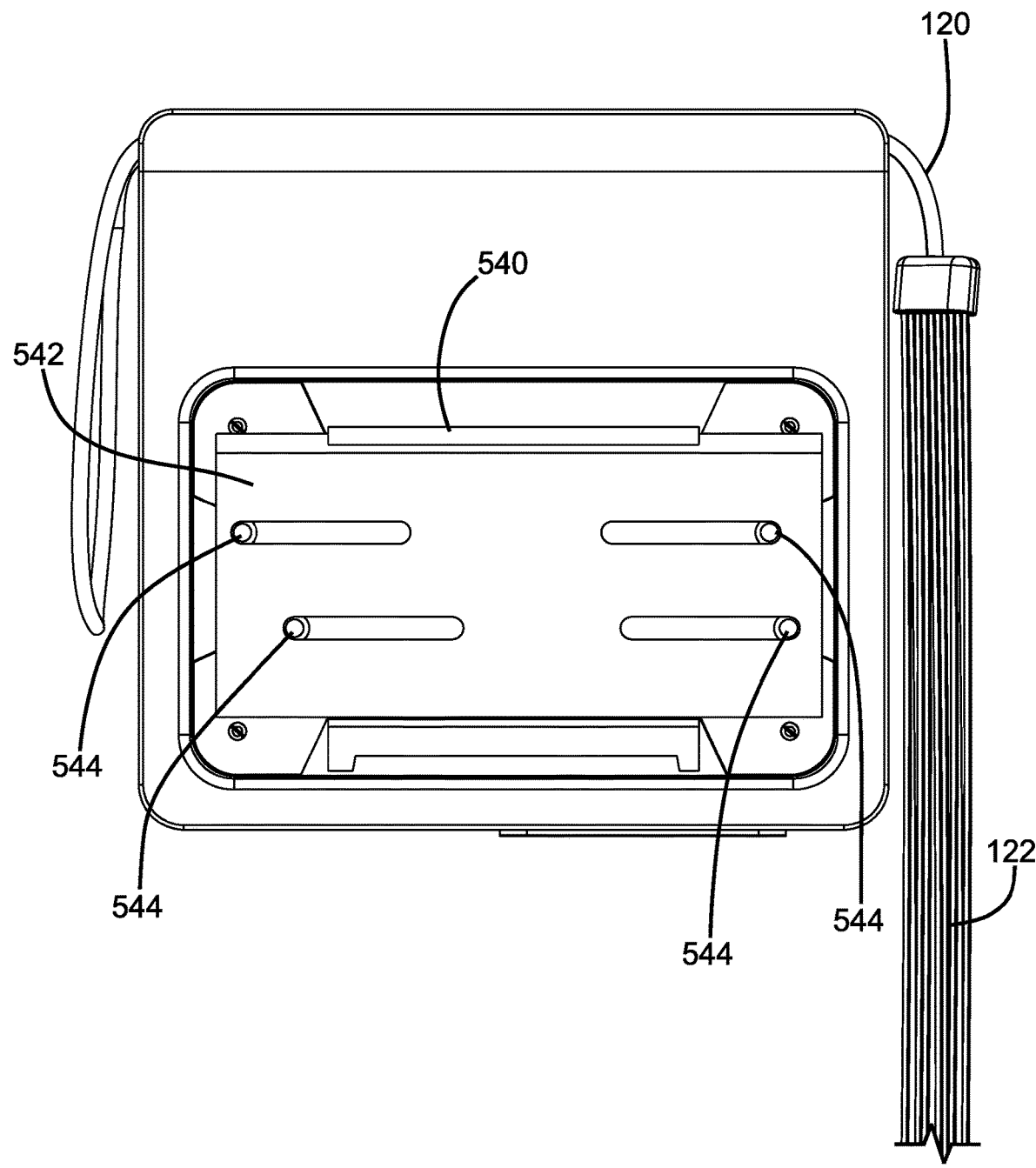
FIG. 50 is a rear view of the handheld device of FIG. 1 docked into the docking station of FIG. 44.
Figure 51:
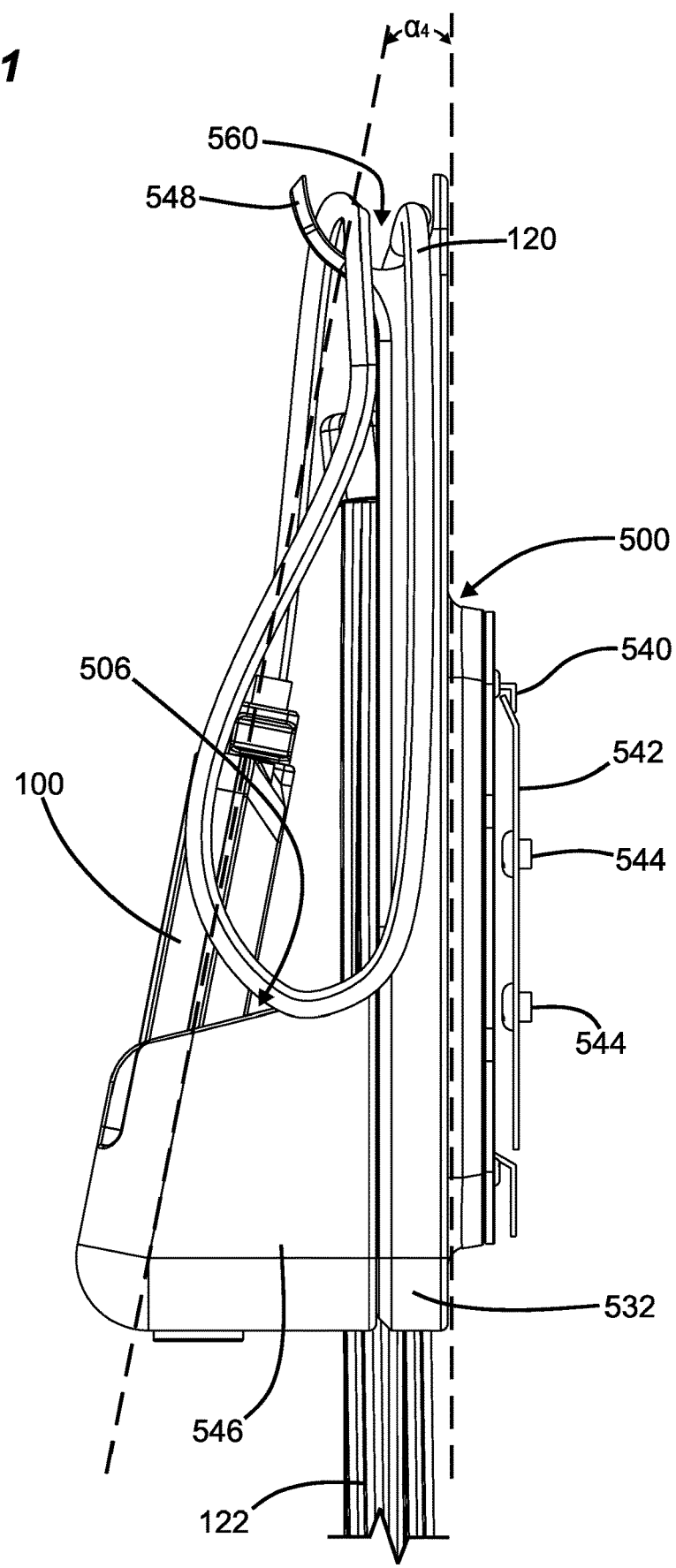
FIG. 51 is a right side view of the handheld device of FIG. 1 docked into the docking station of FIG. 44.
Figure 52:
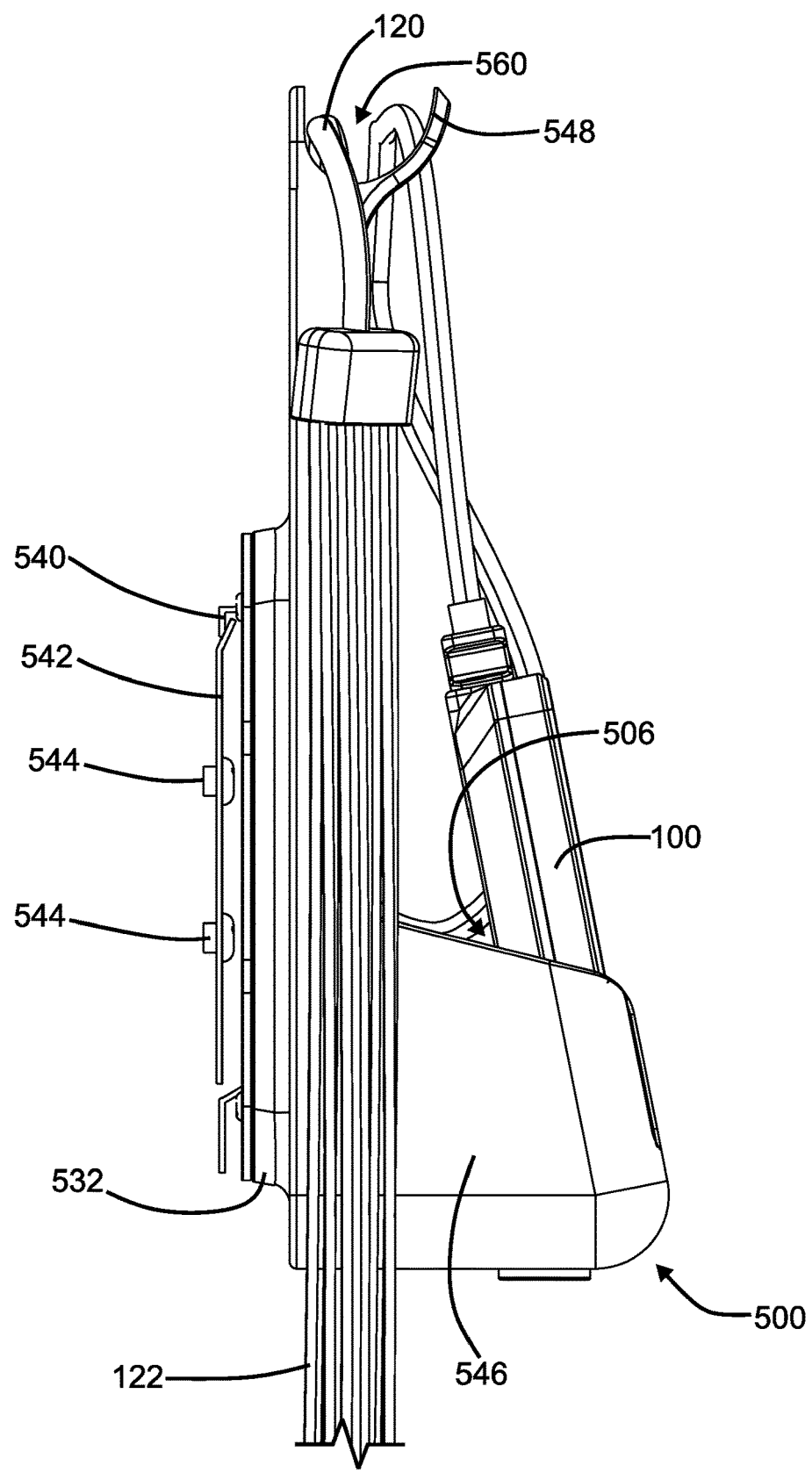
FIG. 52 is a left side view of the handheld device of FIG. 1 docked into the docking station of FIG. 44.
Figure 53:
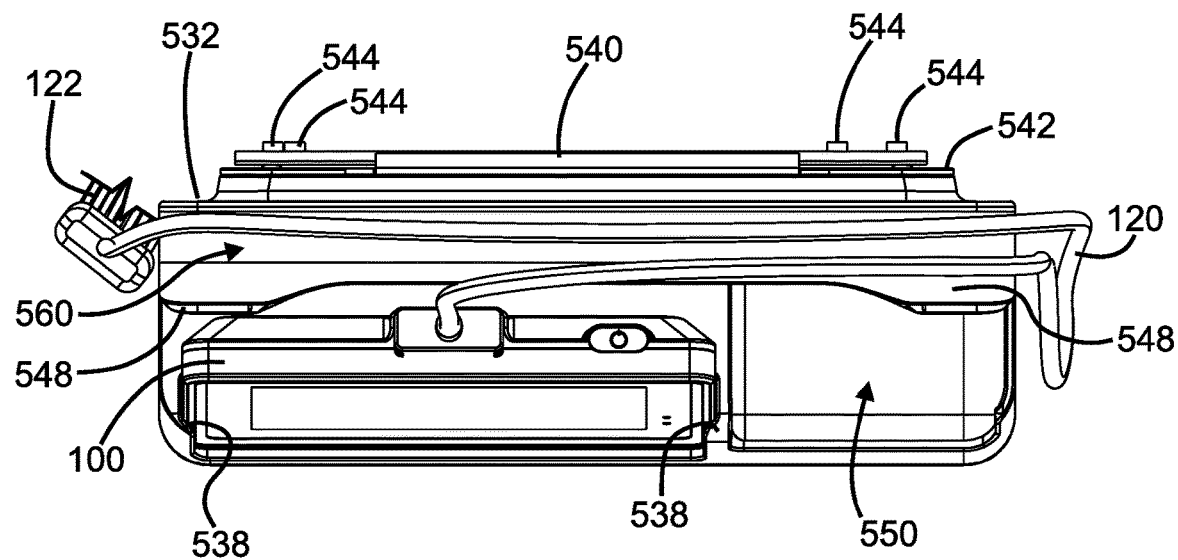
FIG. 53 is a top view of the handheld device of FIG. 1 docked into the docking station of FIG. 44.
Figure 54:
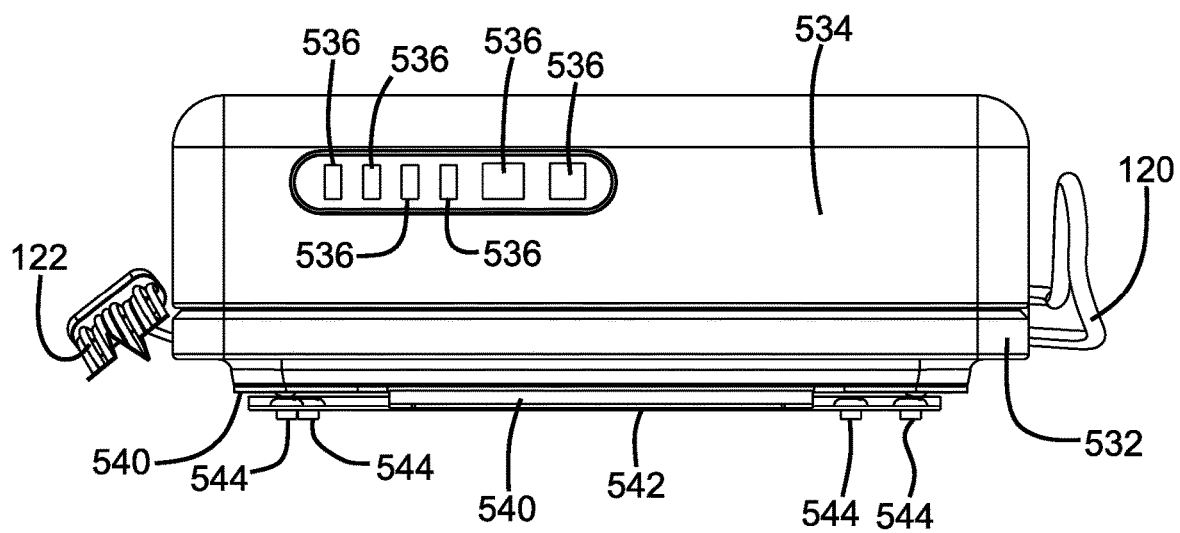
FIG. 54 is a bottom view of the handheld device of FIG. 1 docked into the docking station of FIG. 44.

As shown in FIGS. 48 and 54, the docking station 500 includes input/output connectors 536 on a bottom surface 534. The input/output connectors 536 can include one or more USB connectors, an RJ45 jack, an AC power connector, and additional types of connectors. The AC power connector can receive an electrical power cord to connect the docking station 500 to an external electrical power source such as a wall mounted electrical outlet.

In some examples, the docking station 500 transfers the data received from the handheld device 100 to another device such as through a wired connection via the input/output connectors 536. Alternatively, the docking station 500 can transfer the data received from the handheld device 100 to another device through a wireless network such as cellular, Wi-Fi, Bluetooth, and the like. In some examples, the docking station 500 can receive the data (e.g., the 12 lead diagnostic ECG signal) from the handheld device 100, and the docking station 500 can transmit the data for storage in an electronic medical record (EMR) of a patient.

The dock housing 504 provides a storage space for storing and managing the patient cable 120 and leads 122. For example, the base 532 defines a channel 560 for storing and managing the patient cable 120 and leads 122. The channel 560 is defined above the pocket 506 such that the patient cable 120 can be positioned to rest on top of the base 532 along the channel 560. The base 532 can define one or more hooks 548 that can facilitate holding the patient cable 120 inside the channel 560. In some examples, the one or more hooks 548 are curved to provide the channel 560 with a concave surface for managing the patient cable 120 and leads 122.

The base 532 can further define a secondary pocket 550 that provides a storage space for storing additional items such as electrode packets, disposable adhesives, gel, gloves, and the like. The secondary pocket 550 is provided on the front housing 546 adjacent to the pocket 506.

Figure 55:
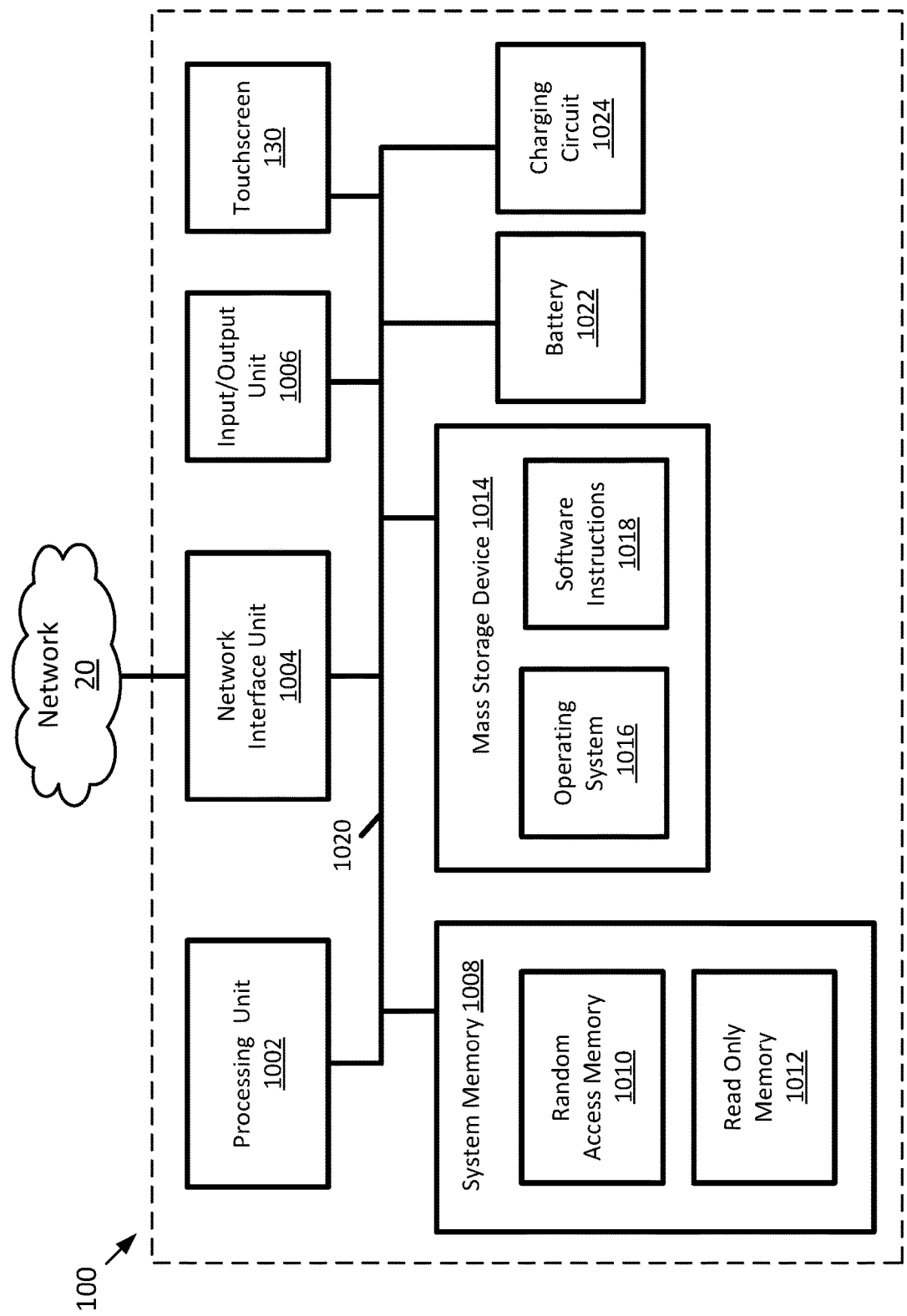
FIG. 55 schematically illustrates example computing components of the handheld device of FIG. 1.

FIG. 55 schematically illustrates in more detail the components of the handheld device 100 that can be used to generate an electrocardiogram. As shown in FIG. 55, the handheld device 100 includes at least one processing unit 1002, a system memory 1008, and a system bus 1020 that couples the system memory 1008 to the at least one processing unit 1002.

The at least one processing unit 1002 is an example of a processing device. For example, the at least one processing unit 1002 can be a central processing unit (CPU). In further examples, the at least one processing unit 1002 is a microcontroller or a microprocessor.

The system memory 1008 includes a random-access memory ("RAM") 1010 and a read-only memory ("ROM") 1012. A basic input/output logic that has basic routines to transfer information between elements within the handheld device 100 is stored in the ROM 1012.

The handheld device 100 can include a mass storage device 1014 that stores software instructions and data. The mass storage device 1014 and its associated computer-readable data storage media provide non-volatile, non-transitory storage for the handheld device 100.

Although the description of computer-readable data storage media contained herein refers to a mass storage device, it should be appreciated by those skilled in the art that computer-readable data storage media can be any available non-transitory, physical device or article of manufacture from which the device can read data and/or instructions. In certain embodiments, the computer-readable storage media comprises entirely non-transitory media. The mass storage device 1014 is an example of a computer-readable storage device.

Computer-readable data storage media include volatile and non-volatile, removable, and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid-state memory technology, or any other medium which can be used to store information, and which can be accessed by the device.

The handheld device 100 can operate in a networked environment using logical connections through the communications network 20. The handheld device 100 connects to the communications network 20 through a network interface unit 1004 connected to the system bus 1020. The network interface unit 1004 can also connect to additional types of communications networks and devices, including through Bluetooth, Wi-Fi, and cellular. In some examples, the handheld device 100 can operate in an environment without network communications.

The network interface unit 1004 may also connect the handheld device 100 to additional networks, systems, and devices such as a digital health gateway, electronic medical record (EMR) system, vital signs monitoring devices, and clinical resource centers.

The handheld device 100 can also include an input/output unit 1006 for receiving inputs and processing outputs. Additionally, the handheld device 100 can include a touchscreen 130 that allows a user to enter commands and view data.

The handheld device 100 further includes a battery 1022. In some examples, the battery 1022 is a rechargeable battery such as a lithium-ion rechargeable battery. In such examples, the handheld device 100 includes a charging circuit 1024 that is configured to receive a voltage input for charging the rechargeable battery. The voltage input can be received from an external charger that connects to or otherwise comes into contact with the handheld device 100.

In some examples, the charging circuit 1024 receives the voltage input to recharge the battery 1022 from an electrical coupling between the electrical contacts 136 on the handheld device 100 and corresponding electrical contacts 220, 320, 420, 520 inside the pockets 206, 306, 406, 506 of the docking stations 200, 300, 400, 500, respectively. In some examples, the charging circuit 1024 can be configured to receive wireless charging such as through inductive charging or magnetic resonance charging when placed inside the pockets 206, 306, 406, 506 of the docking stations 200, 300, 400, 500, respectively.

The mass storage device 1014 and/or the RAM 1010 can store software instructions and data. The software instructions can include an operating system 1016 suitable for controlling the operation of the handheld device 100. The mass storage device 1014 and/or the RAM 1010 can also store software instructions 1018, that when executed by the at least one processing unit 1002, cause the handheld device 100 to provide the functionality discussed herein.

The various embodiments described above are provided by way of illustration only and should not be construed to be limiting in any way. Various modifications can be made to the embodiments described above without departing from the true spirit and scope of the disclosure.

What is claimed is:

1. A system for electrocardiogram comprising:
a handheld device configured for interchangeable use between a plurality of docking stations, the handheld device including:
a device housing;
a patient cable having a proximal end that connects to the device housing, and a distal end that breaks out into leads for attachment to a patient, the leads configured to receive electrical signals from the patient;
at least one processing unit housed inside the device housing, the at least one processing unit configured to generate an electrocardiogram based on the electrical signals received from the patient cable; and
a battery configured to power the at least one processing unit; and
the system further comprising: the plurality of docking stations, wherein the plurality of docking stations includes at least a first type of docking station configured for support on horizontal surfaces and a second type of docking station configured for support on vertical surfaces, wherein the vertical surfaces include a vertical wall surface, the first and second types of docking stations each including a dock housing configured to support the device housing and to recharge the battery of the handheld device, wherein the dock housing defines a pocket that is configured to receive and support the device housing in an upright position, the pocket including:
an open end;
first and second lateral interior surfaces;
a bottom interior surface; and
a front interior surface and a rear interior surface, the front interior surface including a lip shaped to partially surround a bezel of the device housing to retain the handheld device inside the pocket in the upright position;

wherein the dock housing of the second type of docking station includes a base, and a front housing attached to the base, wherein the front housing defines the pocket that is configured to receive and support the handheld device in the upright position, wherein the base includes a mounting bracket that is configured to secure the front housing to the vertical wall surface, wherein the front housing includes an extension, and wherein the extension and the base define a channel that provides a storage space for storing and managing the patient cable and the leads between the vertical wall surface, the base, and the extension.

2. The system of claim 1, wherein the handheld device includes a touchscreen on the device housing, the touchscreen being configured to display the electrocardiogram.

3. The system of claim 1, further comprising a patient cable storage arm for managing the patient cable and the leads.

4. The system of claim 1, wherein the handheld device is configured to transmit data to the first type of docking station, and the first type of docking station includes a printer for printing the electrocardiogram based on the data received from the handheld device.

5. The system of claim 1, wherein the first type of docking station transfers data received from the handheld device to another device.

6. The system of claim 1, wherein the second type of docking station includes a secondary pocket that provides a storage space for storing one or more of electrode packets, disposable adhesives, gel, and gloves.

7. The system of claim 1, wherein the handheld device directly transfers data acquired from the leads of the patient cable for storage in an electronic medical record (EMR).

8. The system of claim 1, wherein the handheld device wirelessly communicates data to one or more of the plurality of docking stations.

9. The system of claim 1, wherein the patient cable provides a 12 lead diagnostic ECG signal that is used to generate the electrocardiogram.

10. The system of claim 1, wherein the extension is curved in a direction away from the base, and the base is inclined at an angle relative to the front housing to define the channel within the storage space for storing and managing the patient cable and the leads.

11. The system of claim 1, wherein a bottom surface of the front housing of the second type of docking station includes one or more input/output connectors.

12. The system of claim 1, wherein the pocket is orientated at an angle relative to the base such that the pocket supports the handheld device at an angle relative to the vertical wall surface.

* * * * *